US010551206B2

(12) United States Patent
Suzuki

(10) Patent No.: US 10,551,206 B2
(45) Date of Patent: Feb. 4, 2020

(54) NAVIGATION SYSTEM INCLUDING NAVIGATION SERVER, MOBILE TERMINALS, AND BEACON SIGNAL GENERATING DEVICES

(71) Applicant: TOSHIBA TEC KABUSHIKI KAISHA, Tokyo (JP)

(72) Inventor: Akitoshi Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 15/687,531

(22) Filed: Aug. 27, 2017

(65) Prior Publication Data

US 2018/0087921 A1 Mar. 29, 2018

(30) Foreign Application Priority Data

Sep. 23, 2016 (JP) ................................ 2016-186157

(51) Int. Cl.

*G01C 21/36* (2006.01)
*G06F 15/173* (2006.01)
*G01S 5/10* (2006.01)
*G01C 21/00* (2006.01)
*G06Q 10/00* (2012.01)

(Continued)

(52) U.S. Cl.

CPC ....... *G01C 21/3617* (2013.01); *G06Q 20/202* (2013.01); *G06Q 20/325* (2013.01); *G06Q 20/3224* (2013.01); *H04W 4/023* (2013.01); *H04W 4/029* (2018.02); *H04W 4/80* (2018.02); *G01C 21/3676* (2013.01); *G01C 21/3679* (2013.01)

(58) Field of Classification Search

CPC ........... G01C 21/36; G01C 21/00; G01S 5/00; G06Q 10/00; G06F 15/173

See application file for complete search history.

(56) References Cited

U.S. PATENT DOCUMENTS

2009/0171562 A1* 7/2009 Shimada ............ G01C 21/3415 701/533
2013/0219082 A1* 8/2013 Mitomi ................. H04W 8/082 709/244

FOREIGN PATENT DOCUMENTS

CN 103617449 A * 3/2014 ............. G06Q 10/00
CN 205643691 U * 10/2016 ............... G01S 5/10

(Continued)

*Primary Examiner* — Yuri Kan

(74) *Attorney, Agent, or Firm* — Kim & Stewart LLP

(57) ABSTRACT

A navigation server includes a network interface controller through which identification information and movement line information of a mobile terminal are received from the mobile terminal, the movement line information including location information and a timestamp, a storage device in which movement line data of the mobile terminal and location data of different places are stored, and a processor configured to extract the movement line data from the movement line information and record the extracted movement line data in the storage device. The processor, in response to a search criteria received from the mobile terminal through the network interface controller, generates using the movement line data and the location data of the different places, a navigation map that shows a place that is located along a route defined by the movement line data and meets the search criteria, and transmits the navigation map to the mobile terminal for display.

17 Claims, 44 Drawing Sheets

(51) Int. Cl.

| | |
|---|---|
| ***H04W 4/029*** | (2018.01) |
| ***H04W 4/80*** | (2018.01) |
| ***G06Q 20/20*** | (2012.01) |
| ***G06Q 20/32*** | (2012.01) |
| ***H04W 4/02*** | (2018.01) |

(56) References Cited

FOREIGN PATENT DOCUMENTS

| | | | | | |
|---|---|---|---|---|---|
| JP | 2006300867 A | * | 11/2006 | ............. | G01C 21/00 |
| JP | 2009198409 A | | 9/2009 | | |

* cited by examiner

TERMINAL IDENTIFICATION INFORMATION

| DATE AND TIME INFORMATION (501) | ESTIMATED POSITION INFORMATION (502) |
|---|---|
| ⋮ | ⋮ |
| 2015/11/11 5:00 PM | (X1,Y1) |
| 2015/11/11 5:01 PM | (X2,Y2) |
| ⋮ | ⋮ |
| 2015/11/11 6:00 PM | (X30,Y30) |
| 2016/1/11 2:00 PM | (X101,Y101) |
| 2016/1/11 2:01 PM | (X102,Y102) |
| 2016/1/11 2:02 PM | (X103,Y103) |
| ⋮ | ⋮ |
| 2016/1/11 2:51 PM | (X115,Y115) |
| 2016/1/11 2:51 PM | (X115,Y115) |
| 2016/1/11 2:51 PM | (X115,Y115) |

| BEACON ID (601) | BEACON POSITION INFORMATION (602) |
|---|---|
| 1 | (X1,Y1) |
| 2 | (X2,Y2) |
| 3 | (X3,Y3) |

COMMERCIAL FACILITY ID

| | AREA SELECTION INFORMATION (701) | MAP INFORMATION (702) |
|---|---|---|
| 7011 | (X0,Y0)、(X5,Y5) | PATH 1 |
| | (X5,Y0)、(X10,Y5) | PATH 2 |
| | (X10,Y0)、(X15,Y5) | PATH 3 |
| | ⋮ | ⋮ |
| | (X0,Y5)、(X5,Y10) | PATH k |
| | (X5,Y5)、(X10,Y10) | PATH k+1 |
| | (X10,Y5)、(X15,Y10) | PATH k+2 |
| | ⋮ | ⋮ |
| 7012 | (X0,Y0)、(X10,Y10) | PATH m+1 |
| | (X10,Y0)、(X20,Y10) | PATH m+2 |
| | (X20,Y0)、(X30,Y10) | PATH m+3 |

| STORE ID (801) | STORE POSITION INFORMATION (802) | STORE INTRODUCTION INFORMATION A (803) | STORE INTRODUCTION INFORMATION B (804) | ... |
|---|---|---|---|---|
| 1 | (X1,Y2) | ... | ... | ... |
| 2 | (X5,Y2) | ... | ... | ... |
| 3 | (X10,Y4) | ... | ... | ... |

STORE ID

| MERCHANDISE CODE (901) | CLASSIFICATION (902) | MERCHANDISE NAME (903) | UNIT PRICE (904) | ... |
|---|---|---|---|---|
| nnnnnn1 | CLOTHES > HATS | HAT | ... | ... |
| nnnnnn2 | CLOTHES > HATS | HAT BY BRAND L | ... | ... |
| nnnnnn3 | FOOTWEAR > LEATHER SHOES | LEATHER SHOES BY BRAND L | ... | ... |

T6

DT (marks last row)

| FOUND DATE INFORMATION (1001) | FOUND ARTICLE NAME (1002) | FOUND ARTICLE FEATURE (1003) | STORAGE PLACE (1004) |
|---|---|---|---|
| ⋮ | ⋮ | ⋮ | ⋮ |
| 2015/11/11 5:00 PM | HANDKERCHIEF | WHITE | MANAGEMENT OFFICE (X10, Y15) |
| 2015/12/20 2:00 PM | UMBRELLA | FLORAL PATTERN FOLDING TYPE | MANAGEMENT OFFICE (X10, Y15) |
| 2016/1/11 1:00 PM | UMBRELLA | BLACK LONG UMBRELLA | STORE (X5, Y2) |
| 2016/1/11 2:00 PM | BAG | BEIGE SHOULDER TYPE | STORE (X1, Y2) |

NAVIGATION SYSTEM INCLUDING NAVIGATION SERVER, MOBILE TERMINALS, AND BEACON SIGNAL GENERATING DEVICES

This application is based upon and claims the benefit of priority from Japanese Patent Application No. 2016-186157, filed Sep. 23, 2016, the entire contents of which are incorporated herein by reference.

FIELD

Embodiments described herein relate generally to an information processing apparatus, a system, a mobile terminal, and a program.

BACKGROUND

A person may recall and want to return to a park that the person has seen while on the move, to visit a facility that the person has seen while on the move, or to purchase a merchandise displayed at a storefront that the person has seen while on the move. For example, a birthday present for a family member may come to mind during shopping, and the person may recall merchandise displayed at the storefront that the person has seen while on the move. In addition, when the person thinks about buying food and drink to go to an outdoor place to rest, during a drive on a sunny day, the person may recall a beautiful park that the person has seen for a brief moment, e.g., through a space between buildings. In such cases, the person recalls clearly seeing the locations while on the move and wants to return there. In addition, when the person is on the move, the person acquires feelings about the street, the atmosphere, the level of security, and the like regarding his traveled path. Thus, the person feels more comfortable on the familiar path than paths that the person has not yet traveled. For example, when searching for a karaoke studio, women, students, and the like feel more comfortable with searching for a karaoke studio that is on a familiar path than that not previously traveled.

A system exists that generates movement line data indicating a movement of a user. In this system, GPS position information is accumulated in a mobile phone carried by the user. The user inputs the accumulated data into a multifunction peripheral installed on the path toward his or her destination and prints the movement line data based on the accumulated data. With the printed movement line data, the user can notice whether his or her movement is out of the way, or confirm a positional relationship between the user's current position and a famous place or the like that is registered in a location near the destination.

However, a system that provides the user with guidance and information regarding the path that the user has traveled has been slow to develop. Even if the user tries to return to a place that the user recalls as being attractive or a store where the user recalls seeing a displayed merchandise that the user is interested in buying, the user ends up wandering aimlessly until he or she finds the place or eventually giving up if he or she cannot find the place.

DESCRIPTION OF THE DRAWINGS

FIG. 5 is a diagram illustrating one example of a table configuration of a movement line data management table.

FIG. 6 is a diagram illustrating one example of a table configuration of a position information conversion table.

FIG. 7 is a diagram illustrating one example of a table configuration of a map information table.

FIG. 8 is a diagram illustrating one example of a table configuration of a store information table.

FIG. 9 is a diagram illustrating one example of a table configuration of a merchandise information table.

DETAILED DESCRIPTION

Embodiments provide an information processing apparatus, a system, a mobile terminal, and a program, that enable a user to search for a target place along a path.

In general, according to one embodiment, a navigation server includes a network interface controller through which identification information and movement line information of a mobile terminal are received from the mobile terminal, the movement line information including location information and a timestamp associated with the location information, a storage device in which movement line data of the mobile terminal and location data of different public places are stored, and a processor configured to extract the movement line data from the movement line information and record the extracted movement line data in the storage device. The processor, in response to a search criteria received from the mobile terminal through the network interface controller, generates using the movement line data and the location data of the different public places, a navigation map that shows a public place that is located along a route defined by the movement line data and meets the search criteria, and transmits the navigation map to the mobile terminal for display by the mobile terminal.

Hereinafter, embodiments of an information processing apparatus, a system, a mobile terminal, and a program will be described in detail with reference to the appended drawings.

First Embodiment

The present embodiment illustrates an application example to a guidance system that can be introduced into a plurality of commercial facilities, such as a shopping center or the like.

Figure 1:
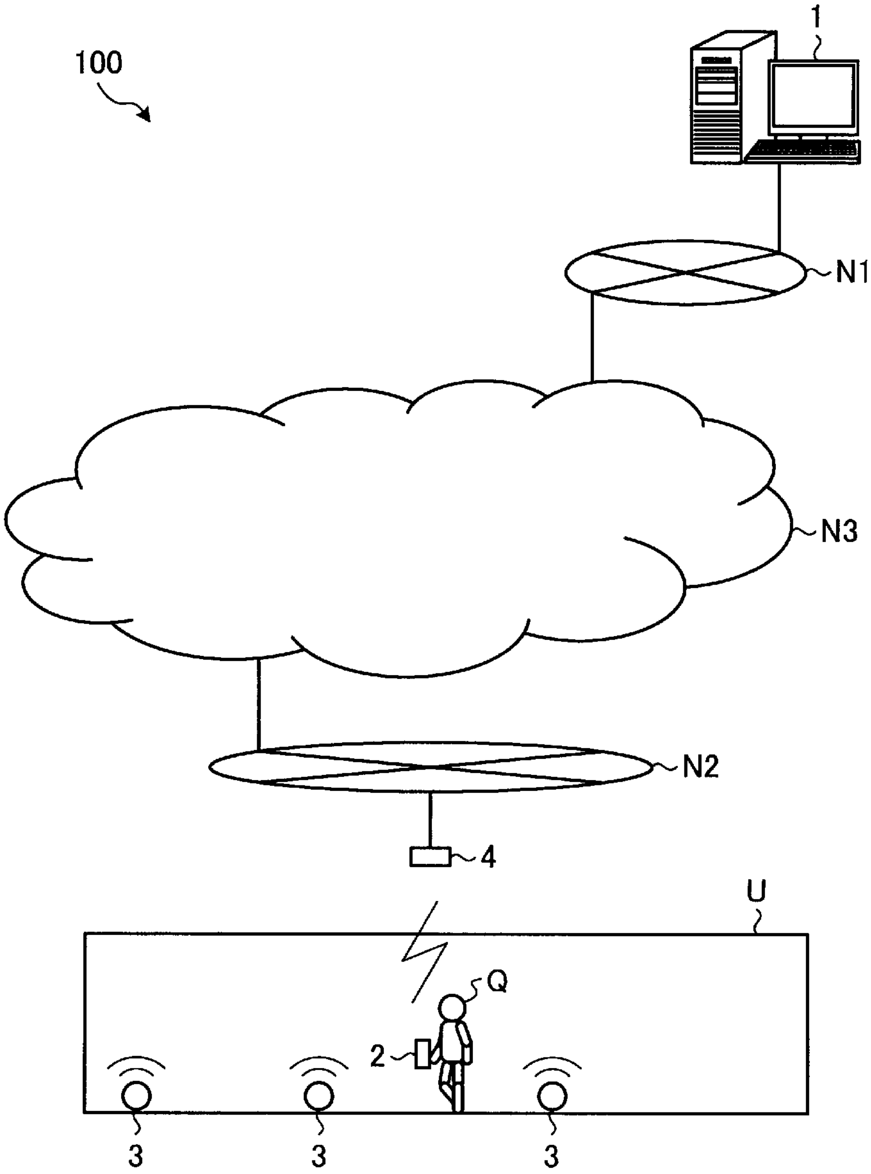
FIG. 1 is a diagram illustrating one example of a network configuration of a guidance system according to a first embodiment.

FIG. 1 is a diagram illustrating one example of a network configuration of a guidance system according to a first embodiment. A guidance system 100 illustrated in FIG. 1 has a server apparatus 1, a mobile terminal 2, and a beacon device 3. The server apparatus 1 is disposed in an intracompany local area network (LAN) N1 of an operating company or the like. The mobile terminal 2 is a mobile terminal device such as a smartphone or a wearable terminal that is carried by a user of service provided by the operating company. The wearable terminal may be a wristwatch type, a glass type, or the like. The beacon device 3 is disposed at each place such as passages and stores in each commercial facility U. In the network configuration, the mobile terminal 2, while in a transmission area of the beacon device 3, receives a beacon signal that is transmitted by the beacon device 3. In addition, the mobile terminal 2 communicably connects to a wireless base station 4 such as a mobile phone base station of 3G, 4G, or the like or a Wi-Fi spot and accesses the server apparatus 1 through a mobile communication network N2 and the Internet N3.

In the guidance system 100, the server apparatus 1, the mobile terminal 2, and the beacon device 3 operate as follows.

The server apparatus 1 stores information indicating each position along a moving path of the mobile terminal 2 and provides various types of service based on the stored position information. In the present embodiment, the server apparatus 1 provides search service for a store (hereinafter, referred to as "store search service") along a path passed by a service user Q by communication with the mobile terminal 2 carried by the service user Q. The position of the mobile terminal 2 is a position estimated using the beacon signal or the like. Thus, hereinafter, the position information of the mobile terminal 2 stored in the server apparatus 1 will be referred to as "estimated position information".

At each place along the path passed by the service user Q, the mobile terminal 2 receives the beacon signal of the beacon device 3, each beacon signal that is transmitted to the mobile terminal 2 including the position of the place. The mobile terminal 2 transmits the position information of each place indicated by the received beacon signal to the server apparatus 1. In addition, the mobile terminal 2 transmits information such as a keyword indicating a search condition for a target store to the server apparatus 1 and acquires, from the server apparatus 1, the position information of a store along the path passed by the service user Q or the position information of a store further narrowed with the search information.

The beacon device 3 provides a notification indicating the position thereof to the position thereof to the mobile terminal 2 in its surrounding area. In the present embodiment, the beacon device 3 transmits unique identification information (for example, a terminal number) stored in its memory to its surrounding area thereof by Bluetooth (registered trademark) communication. The identification information is transmitted by Bluetooth low energy (BLE) communication in the present embodiment. The transmission range is a predetermined range having a radius of, for example, 1 m, 3 m, or 10 m around the beacon device 3. The transmission range is appropriately set in accordance with the installation place, the installation interval, or the like of the beacon device 3.

Hereinafter, specific configurations of each device of the guidance system 100 according to the present embodiment will be described. Various configurations of the server apparatus 1 and the mobile terminal 2 will be mainly described below.

Hardware Configurations of each Device

Figure 2:
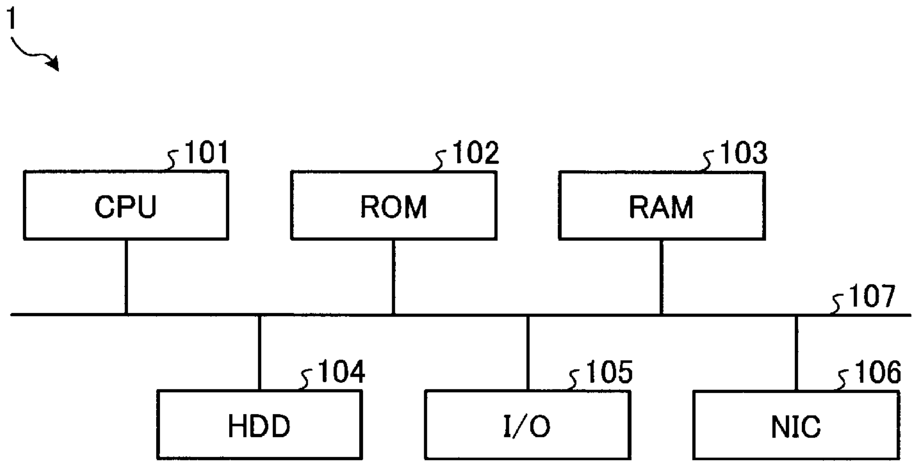
FIG. 2 is a block diagram illustrating one example of a hardware configuration of a server apparatus.

FIG. 2 is a block diagram illustrating one example of a hardware configuration of the server apparatus 1. The server apparatus 1 illustrated in FIG. 2 has a central processing unit (CPU) 101, a read-only memory (ROM) 102, a random access memory (RAM) 103, a hard disk drive (HDD) 104, an input/output (I/O) 105, a network interface controller (NIC) 106, and the like. Each unit is mutually connected by a bus 107. Each unit operates by receiving supply of power from a power supply unit (not illustrated) such as a battery or an AC power supply.

The CPU 101 executes operation processes and control processes for each unit. The ROM 102 stores a fixed program such as a basic input/output system (BIOS). The RAM 103 is used as a work area when the CPU 101 executes a program.

The HDD 104 stores various programs and various types of data. Various programs include an operating system (OS), a driver, server software, database software, a service program for store searching, and the like. Various types of data include screen information transmitted to an external device (such as the mobile terminal 2), a data file of a database DB (refer to FIG. 4), and the like.

The I/O 105 is an input-output circuit for a signal that targets an I/O device such as a keyboard, a mouse, and a display.

The NIC 106 is a controller that performs communication by Ethernet (registered trademark).

Figure 3:
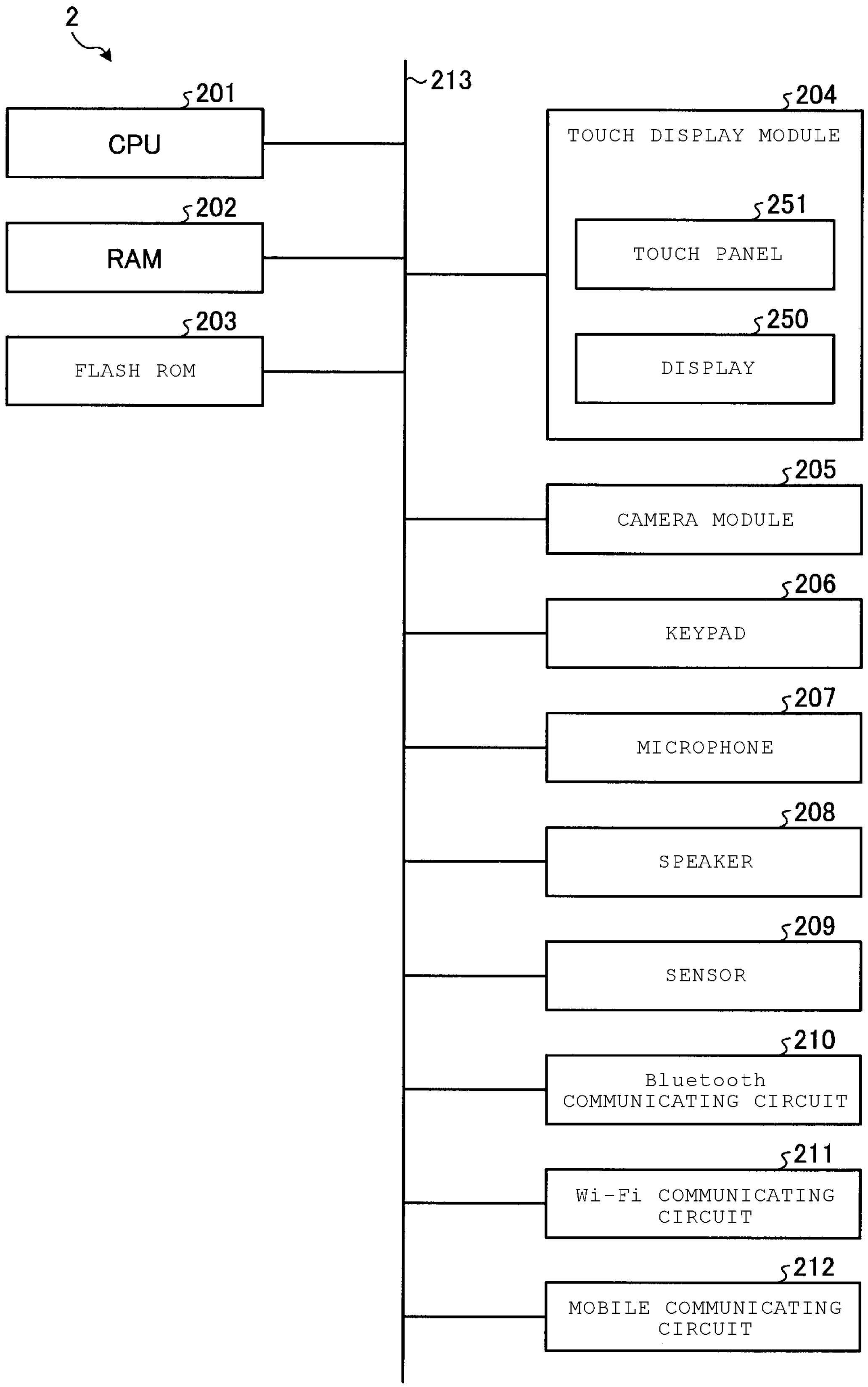
FIG. 3 is a block diagram illustrating one example of a hardware configuration of a mobile terminal.

FIG. 3 is a block diagram illustrating one example of a hardware configuration of the mobile terminal 2. A configuration of a smartphone is illustrated as one example. The mobile terminal 2 illustrated in FIG. 3 has a CPU 201, a RAM 202, a flash ROM 203, a touch display module 204, a camera module 205, a keypad 206, a microphone 207, a speaker 208, a sensor 209, a Bluetooth communicating circuit 210, a Wi-Fi communicating circuit 211, a mobile communicating circuit 212, and the like. Each unit is connected to the CPU 201 by a bus 213. Each unit operates by receiving supply of power from a battery (not illustrated).

The CPU 201 executes operation processes and control processes for each unit. The RAM 202 is used as a work area when the CPU 201 executes a program.

The flash ROM 203 is used as a storage. The flash ROM 203 stores various programs and various types of data. Various programs include an OS, a driver, client software, an application for store search service (hereinafter, referred to as a store search application), and the like. Various types of data include screen data such as a home screen, screen information used by the store search application, and the like.

The touch display module 204 includes a display 250 and a touch panel 251 stacked on the display 250. The display 250 is a display of a liquid crystal or the like. The touch display module 204 detects a touch input of a user on the touch panel 251 and notifies the CPU 201 of a signal indicating the touch input. In addition, the touch display module 204 displays screen data output from the CPU 201 on the display 250.

The camera module 205 includes an imaging element such as a CCD and drives the imaging element to generate imaged data of a subject.

A plurality of hardware keys is connected to the keypad 206. If any of the hardware keys is pushed, the keypad 206 outputs a key signal correlated with the hardware key to the CPU 201.

The microphone 207 receives input of an analog audio signal and converts the analog audio signal into digital audio data.

The speaker 208 converts reproduced audio data into an audio signal and outputs the audio signal.

The sensor 209 includes various sensors such as a GPS sensor, an acceleration sensor, and a direction sensor.

The Bluetooth communicating circuit 210 performs communication by the Bluetooth communication protocol.

The Wi-Fi communicating circuit 211 wirelessly communicates with a Wi-Fi device.

The mobile communicating circuit 212 performs mobile communication through a 3G line or a 4G line.

Functional Configurations of each Device

Next, a functional configuration of the server apparatus 1 will be described. The server apparatus 1 implements functions for the store search service by the CPU 101 reading various programs in the ROM 102 or the HDD 104 into the RAM 103 and executing the programs.

Figure 4:
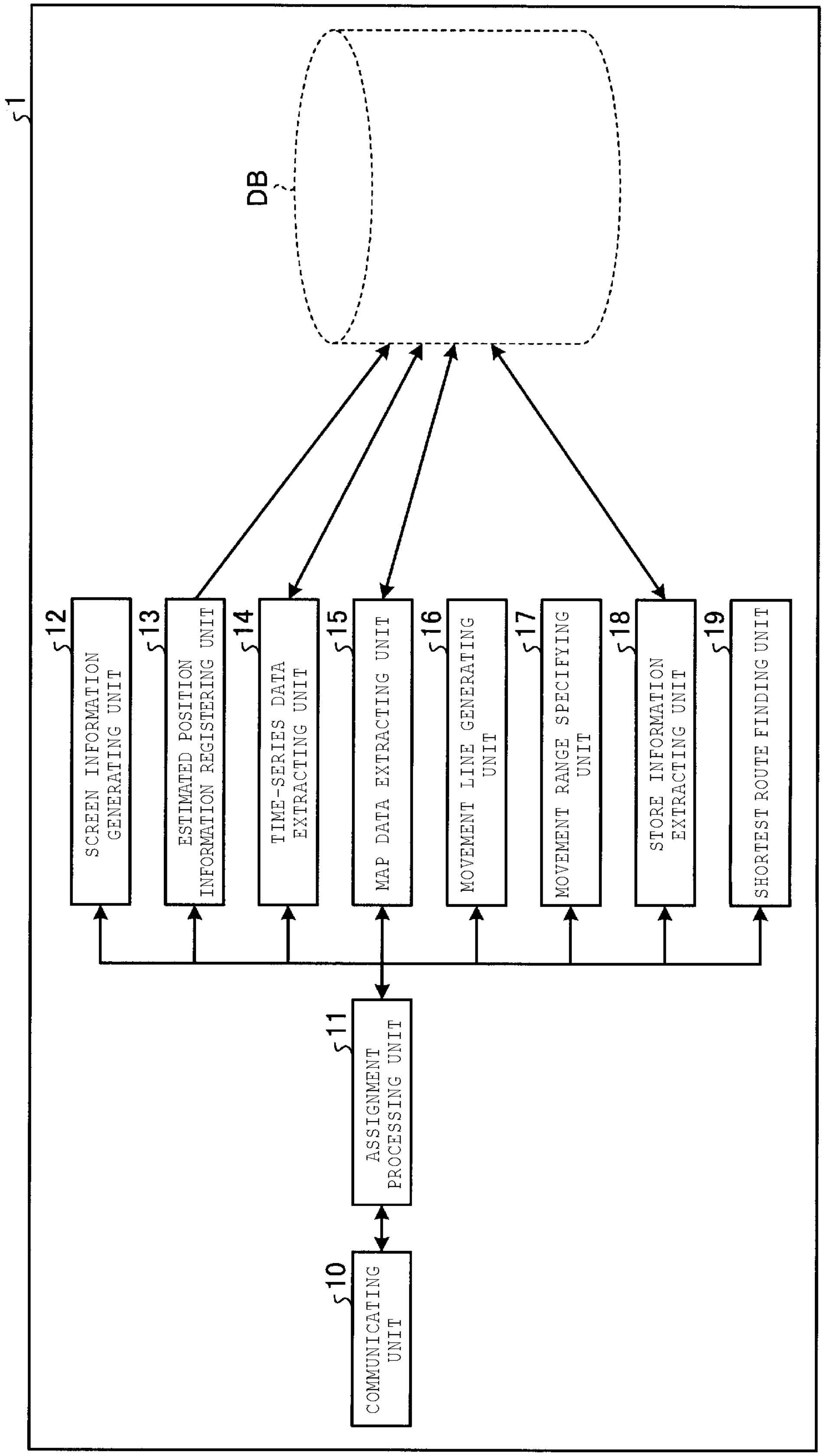
FIG. 4 is a block diagram illustrating one example of functions related to store search service.

FIG. 4 is a block diagram illustrating one example of the functions related to the store search service. As illustrated in FIG. 4, the server apparatus 1 implements functions of a communicating unit 10, an assignment processing unit 11, a screen information generating unit 12, an estimated position information registering unit 13, a time-series data extracting unit 14, a map data extracting unit 15, a movement line generating unit 16, a movement range specifying unit 17, a store information extracting unit 18, a shortest route finding unit 19, and the like.

The communicating unit 10 establishes communication with an external device (for example, the mobile terminal 2) through the NIC 106 and reads received data from the NIC 106 and sends transmitted data such as screen information to the NIC 106. In addition, the communicating unit 10 passes a request content or the like of the received data to the assignment processing unit 11 and receives a processing result or the like from the assignment processing unit 11.

The assignment processing unit 11 manages sessions per identification information of the external device (e.g., the mobile terminal 2 or the like) and assigns processes to each functional unit or receives and passes data with the functional units in accordance with the request content of the received data.

The screen information generating unit 12 generates screen information to be transmitted to the external device (e.g., the mobile terminal or the like) by incorporating a processing result into the screen information of the HDD 104.

The estimated position information registering unit 13 registers the estimated position information of the service user in a movement line data management table T1 (refer to FIG. 5) in correlation with time-series order information. In the present embodiment, the mobile terminal 2 receives a beacon ID from the beacon device 3 and transmits the beacon ID to the server apparatus 1. Therefore, the estimated position information registering unit 13 references a position information conversion table T2 (refer to FIG. 6), converts the beacon ID into correlated position information in the position information conversion table T2, and registers the position information in the movement line data management table T1. In addition, in the case of correction information for the position being included in the information transmitted from the mobile terminal 2, the estimated position information registering unit 13 corrects the position and registers the position information in the movement line data management table T1.

The time-series data extracting unit 14 extracts time-series estimated position information (more generally referred to as time-series data) of the service user from the movement line data management table T1. For example, the time-series data extracting unit 14 specifies the movement line data management table T1 of the service user and, in the case of receiving date and time information of the current date as a default value from the assignment processing unit 11, extracts the time-series data to which the date is attached. In addition, the time-series data extracting unit 14, in the case of receiving date and time information specified in a data portion of the received data from the assignment processing unit 11, extracts the time-series data of the specified date.

The map data extracting unit 15 extracts, from a map information table T3 (refer to FIG. 7), map data that includes a position specified by the estimated position information of the time-series data extracted by the time-series data extracting unit 14.

The movement line generating unit 16 generates movement line data based on the time-series data extracted by the time-series data extracting unit 14. For example, the movement line generating unit 16 generates movement line data that is acquired by interpolating straight line data between each estimated position information in accordance with the time-series order. In addition, from information that indicates a path along which a person can move, such as a passage on the map data extracted by the map data extracting unit 15, the movement line generating unit 16 may correct the position indicated by each estimated position information in such a manner that the position is within the path and may generate movement line data by using the post-correction data. In the present specification, the time-series data and the movement line data are illustrated as one example of "movement line information".

Furthermore, in accordance with a viewer included in the external device (e.g., the mobile terminal or the like), the movement line generating unit 16 may combine the generated movement line data on the map data extracted by the map data extracting unit 15 and may convert the map data combined with the movement line data into an image.

The movement range specifying unit 17, based on each estimated position information of the time-series data extracted by the time-series data extracting unit 14, specifies an area as a movement range within a predetermined range to which each estimated position belongs. For example, the movement range specifying unit 17 generates, as range specification information, a circle of a predetermined radius having the coordinates of each estimated position as center coordinates thereof and specifies the area in each circle as the above area. In addition, from the movement line data based on each estimated position, the movement range specifying unit 17 may generate, as the range specification information, one or a plurality of rectangular boxes (e.g., coordinate information of two diagonal points) of a predetermined size along the path on the line of movement and may specify the area in each rectangular box as the above area. The above area is one example of a "search range" along the line of movement. The "search range" along the line of movement covers a predetermined range from each point along successive points of the time-series data and a predetermined range along a straight line, a curved line, or the like from the starting point to the end point of the movement line data generated based on the time-series data.

The store information extracting unit 18 extracts store information (e.g., a store ID, store position information, store introduction information, or the like) of a relevant store under conditions such as the range specification information specified by the movement range specifying unit 17, the search information for a target store supplied by the service user, and the like. For example, the store information extracting unit 18 searches for a store positioned in the area indicated by the range specification information from store position information 802 of a store information table T4 (refer to FIG. 8) and extracts a hit record of the store (e.g., in the form of a store ID, store position information, store introduction information, or the like). Alternatively, the store information extracting unit 18 searches for a store positioned on the line of movement or along the passage overlapping with the line of movement from the store information table T4 and extracts a hit record of the store. Furthermore, the store information extracting unit 18, in the case of presence of the search information of the service user, performs searching, subsequent to above each process, with the search information for various types of searched information that are set in a merchandise information table T5 (refer to FIG. 9) having a table name of any of each extracted store ID 801. If the searching in the merchandise information table T5 generates a hit, the store information extracting unit 18 confirms previously extracted record information of the store ID of the table name as the store information of the store relevant to the search conditions.

The shortest route finding unit 19 is one example of a "way guidance information processing section". The shortest route finding unit 19 finds the shortest route from a specified starting position to a specified end position on the specified map data and generates shortest route information as one example of "way guidance information". For example, the shortest route finding unit 19 finds the shortest route of any acquirable routes such as passages connecting the starting position to the end position on the map data.

Furthermore, in accordance with the viewer included in the external device (e.g., the mobile terminal or the like), the shortest route finding unit 19 may combine the generated shortest route information on the map data extracted by the map data extracting unit 15 and may convert the combined data into an image as the "way guidance information".

Functional units that specify processes such as registration, updating, deletion, and extraction of data in various tables, perform the processes by connecting to a database management system (DBMS) and issuing SQL statements to the DBMS.

Table Configuration

Configurations of tables of the database DB that is stored by the HDD 104 (refer to FIG. 2) and illustrated by a broken line in FIG. 4 will be described by using FIG. 5 to FIG. 9. The database DB includes information tables such as a movement line data management table, a position information conversion table, and a map information table and includes correspondence information such as a store information table, a merchandise information table, and the like.

FIG. 5 is a diagram illustrating one example of a table configuration of the movement line data management table. The movement line data management table T1 illustrated in FIG. 5 is a table that is generated per terminal ID of the mobile terminal 2 carried by the user of the service. The movement line data management table T1 is a table that correlates date and time information 501 with estimated position information 502. The date and time information 501 is information that indicates a date and time. The estimated position information 502 is information that indicates the estimated position of the mobile terminal 2. In the present embodiment, position information that includes longitude (X1, X2, . . . ) and latitude (Y1, Y2, . . . ) is illustrated as one example of information indicating a position.

FIG. 6 is a diagram illustrating one example of a table configuration of the position information conversion table. The position information conversion table T2 illustrated in FIG. 6 is a table that correlates a beacon ID 601 with beacon position information 602. The beacon ID 601 is the beacon ID (e.g., a terminal number or the like) of the beacon device 3 disposed in the commercial facility U. The beacon position information 602 is the position information for uniquely specifying a place where the beacon device 3 is disposed in the commercial facility U.

FIG. 7 is a diagram illustrating one example of a table configuration of the map information table. The map information table T3 illustrated in FIG. 7 is a table that is disposed per ID of the affiliated commercial facility U and correlates area selection information 701, map information 702, and the like with each other. The area selection information 701 is information that represents the range of the area illustrated by the map data with longitude and latitude. For example, the area selection information includes information of two points of (X0, Y0) and (X5, Y5) as information indicating the range of the longitude X0 to the longitude X5 and the latitude Y0 to the latitude Y5. The map information 702 is path information that indicates a directory, a file name, or the like indicating a storage destination of the range of the map data indicated by the area selection information 701. The present embodiment provides the map data in such a manner that for the map data in each hall of the affiliated commercial facility U, each hall map is divided into a plurality of blocks. The number of divisions of the map data is not one type, but plural types. In FIG. 7, data 7011 and data 7012 have a common area of (X0, Y0) to (X5, Y5). The data 7011 and the data 7012 are different in the range of map data due to different numbers of divisions.

FIG. 8 is a diagram illustrating one example of a table configuration of the store information table. The store information table T4 illustrated in FIG. 8 is a table that correlates store ID 801, store position information 802, store introduction information A 803, store introduction information B 804, . . . , and the like with each other. The store ID 801 is an ID that uniquely identifies a store. The store position information 802 is position information that indicates the position of a store on the map data. The store introduction information A 803, the store introduction information B 804, . . . are introduction information for stores. For example, the store introduction information A 803, the store introduction information B 804, . . . are objective information that supports the user of the store search service narrowing the stores, such as the name of the store, handled merchandise information of the store, surrounding area information of the store, or path information such as a directory or a file name indicating the storage destination of an image illustrating a summary of the store.

FIG. 9 is a diagram illustrating one example of a table configuration of the merchandise information table. The merchandise information table T5 illustrated in FIG. 9 is a table that correlates information used as searched information such as a merchandise code 901, a classification 902, a merchandise name 903, and a unit price 904. The merchandise code 901 is a code for uniquely identifying the type of merchandise, such as a Japanese article number (JAN) code. The classification 902 is category information to which merchandise belongs. For example, the classification 902 is information indicating a main classification such as "clothes" or "footwear" or information indicating a subclassification such as "hats" or "leather shoes" standardized in Japan. The merchandise name 903 is the name of merchandise. For example, the merchandise name 903 is a general name indicating a feature of a shape, a function, or the like or is a name in which a brand name and a general name are combined, such as "leather shoes by brand L". Besides, information related to merchandise such as a manufacturer or a feature of merchandise is appropriately set.

Functional Configuration Continued

Next, a functional configuration of the mobile terminal 2 will be described. The mobile terminal 2 implements functions for receiving the store search service of the server apparatus 1 by the CPU 201 reading various programs in the flash ROM 203 into the RAM 202 and executing the programs.

Figure 10:
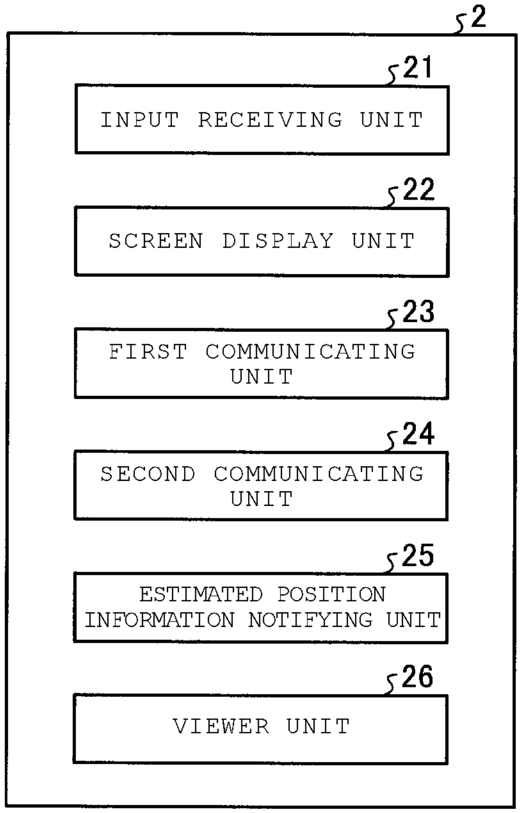
FIG. 10 is a block diagram illustrating one example of functions for receiving the store search service.

FIG. 10 is a block diagram illustrating one example of the functions for receiving the store search service. As illustrated in FIG. 10, the mobile terminal 2 implements functions of an input receiving unit 21, a screen display unit 22, a first communicating unit 23, a second communicating unit 24, an estimated position information notifying unit 25, a viewer unit 26, and the like.

The input receiving unit 21 receives input information such as key information or touch input information from the keypad 206 or the touch display module 204.

The screen display unit 22 outputs screen data to the touch display module (and then to display 250).

The first communicating unit 23 establishes communication with the server apparatus 1 or transmits and receives instructions or data with the server apparatus 1 through the Wi-Fi communicating circuit 211 or the mobile communicating circuit 212.

The second communicating unit 24 reads the beacon ID transmitted from the beacon device 3 through the Bluetooth communicating circuit 210.

The estimated position information notifying unit 25 generates the estimated position information of the mobile terminal 2 from the beacon ID read by the second communicating unit 24 and instructs the first communicating unit 23 to transmit the estimated position information to the server apparatus 1. Generation of the estimated position information is performed after the estimated position information notifying unit 25 determines whether or not the beacon ID has a predetermined format. In the present embodiment, the date and time information that is required when the estimated position information of the mobile terminal 2 is managed in the time-series order in the server apparatus 1 is added to the estimated position information on the mobile terminal 2 side. That is, the estimated position information notifying unit 25 adds the date and time information at the time of reception of the beacon ID to the estimated position information per read beacon ID. In addition, the correction information or the like for the position may be added to the beacon ID of the estimated position information. For example, the estimated position information notifying unit 25, when receiving the beacon ID from the second communicating unit 24, acquires information indicating the received electromagnetic wave strength of the received beacon signal from the Bluetooth communicating circuit 210. The estimated position information notifying unit 25 estimates the distance to the beacon device 3 from the acquired information indicating the received electromagnetic wave strength and adds the correction information for the position to the beacon ID. In the server apparatus 1, the position of the mobile terminal 2 is corrected based on the correction information.

The viewer unit 26 analyzes screen information for using the store search service and displays image data of the screen information on the screen display unit 22. The viewer unit 26 switches screens in accordance of reception from the input receiving unit 21 or instructs the first communicating unit 23 to transmit a request signal to the server apparatus 1.

Data Configuration

Figure 11:
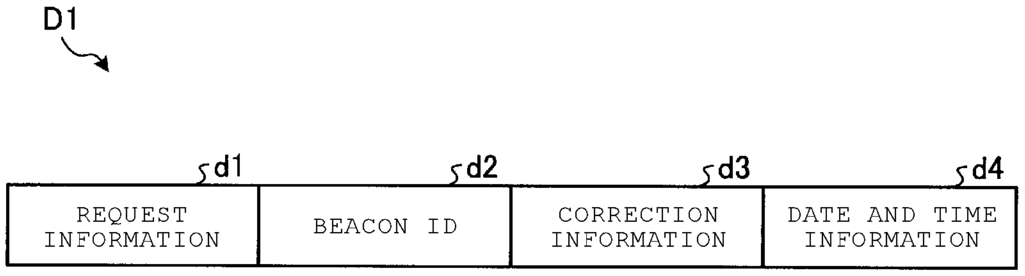
FIG. 11 is a diagram illustrating one example of a storage area configuration of a data portion of transmitted data that an estimated position information notifying unit instructs a first communicating unit to transmit to the server apparatus.

FIG. 11 is a diagram illustrating one example of a storage area configuration of a data portion of transmitted data that the estimated position information notifying unit 25 instructs the first communicating unit 23 to transmit to the server apparatus 1. As illustrated in FIG. 11, a data portion D1 has storage areas of request information d1, a beacon ID d2, correction information d3, date and time information d4, and the like.

FIGS. 12A to 12D are diagrams illustrating one example of storage area configurations of data portions of the transmitted data that the viewer unit 26 instructs the first communicating unit 23 to transmit to the server apparatus 1. FIGS. 12A, 12B, 12C, and 12D are diagrams respectively illustrating one example of storage area configurations of data portions of the transmitted data in the case of making a request for the movement line data, a request for a store list, a request for searching by keyword, and a request for shortest route display as a "way guidance request".

Figure 12A:
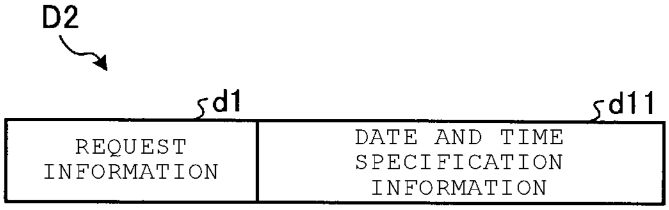
FIGS. 12A to 12D are diagrams illustrating one example of a storage area configuration of a data portion of transmitted data that a viewer unit instructs the first communicating unit to transmit to the server apparatus.
Figure 12B:
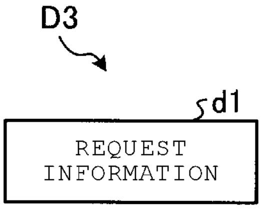
Figure 12C:
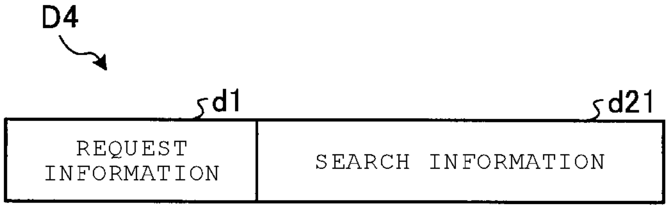
Figure 12D:
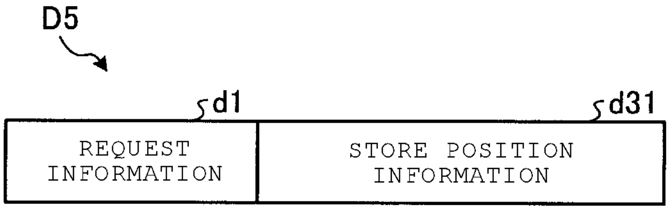

A data portion D2 illustrated in FIG. 12A has storage areas of the request information d1, date and time specification information d11, and the like. A data portion D3 illustrated in FIG. 12B has a storage area of the request information d1. A data portion D4 illustrated in FIG. 12C has storage areas of the request information d1, search information d21, and the like. A data portion D5 illustrated in FIG. 12D has storage areas of the request information d1, store position information d31, and the like.

Operation of Entire System

In operating the system, a manager or the like of the system receives online or offline registrations from the store side and sets various tables of the server apparatus 1 based on the registration information.

For example, in the case of providing online registration on the store side, the manager publishes a registration site on the Internet. The store side specifies a URL in a client terminal of the store to access the registration site. The store side applies for registration by transmitting application information to the registration site from the client terminal.

The registration site issues an account of the applying store in accordance with the application content and adds a record of the applying store to the position information conversion table T2, the store information table T4, the merchandise information table T5, and the like. For example, the registration site adds, to the position information conversion table T2, a record that includes the position information and the beacon ID of the beacon device 3 installed by the applying store. In addition, the registration site adds, to the store information table T4, a record that includes the store information and the like of the applying store. In addition, the registration site adds, to the merchandise information table T5, a record of merchandise sold by the applying store. The registration site receives the added information from the client terminal of the store when an application procedure is performed.

The registration site connects to an email server through a network to transmit in response the account information of the applying store by email to the mobile terminal or the like on the applying store side.

If there is a movement or an increase in number of the beacon device 3, an update of the store information or the merchandise information, or the like after registration, the store side accesses the registration site by using the account information of the response and requests updates of information at any time.

The manager or the like of the system distributes the store search application to the mobile terminal 2 online, offline, or in the form of pre-installation. If the store search application is distributed offline, the store search application is distributed through media such as a CD, a DVD, and an SD card, and the user of the mobile terminal 2 copies the store search application from the media to the flash ROM 203. In addition, if the store search application is distributed online, a link is added to the registration site, and the mobile terminal 2 downloads the store search application to the flash ROM 203 from an assignment place specified at the destination of the link of the registration site.

Sequence of Accumulating Estimated Position

Figure 13:
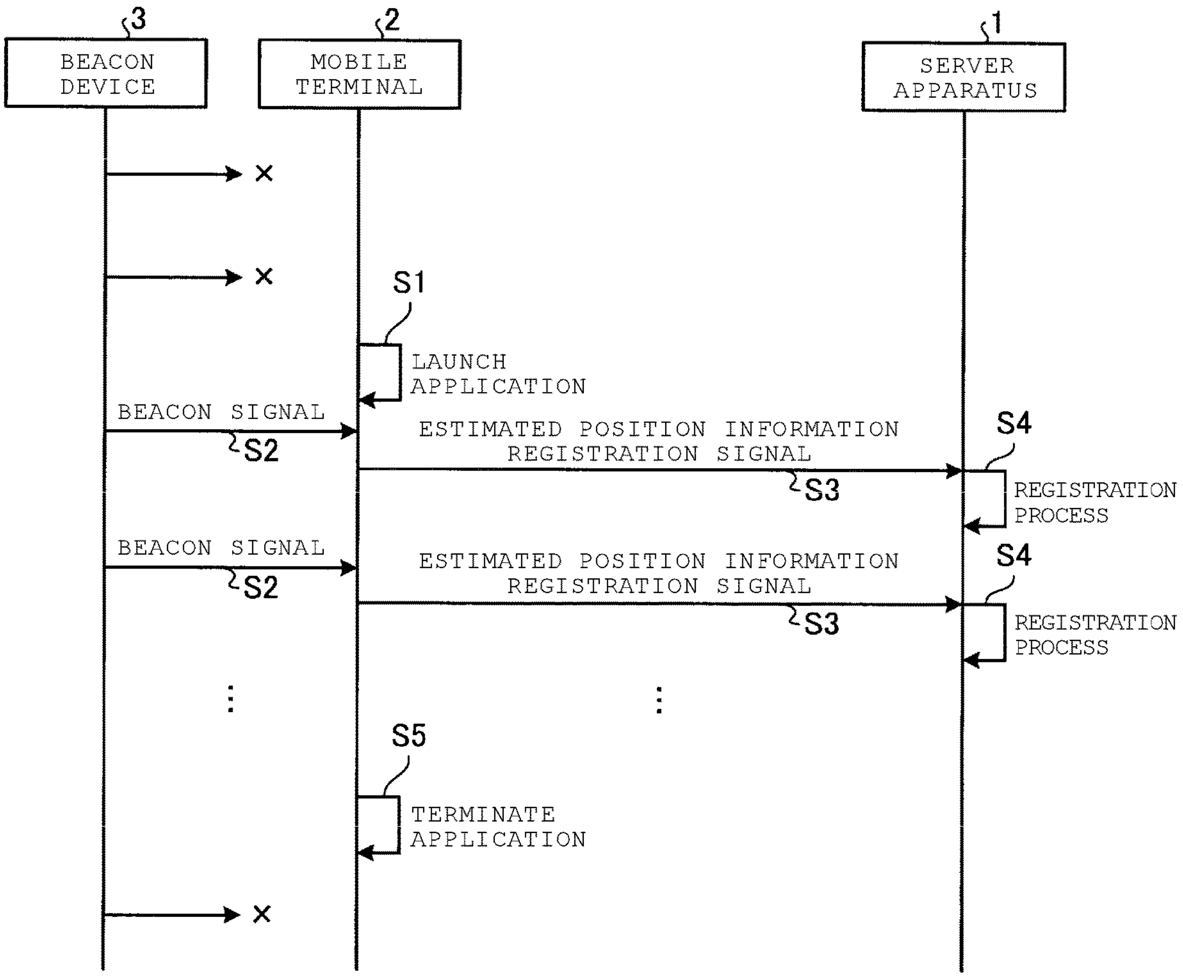
FIG. 13 is a sequence diagram illustrating communication between each device of the guidance system in the case of accumulating an estimated position of the mobile terminal in the server apparatus.

FIG. 13 is a sequence diagram illustrating communication between each device of the guidance system 100 in the case of accumulating the estimated position of the mobile terminal 2 in the server apparatus 1. First, the mobile terminal 2 launches the store search application and initiates reception of the beacon signal (S1).

Next, if the mobile terminal 2 enters the transmission range of the beacon signal of the beacon device 3, the mobile terminal 2 receives the beacon signal from the beacon device 3, the transmission range of which includes the position of the mobile terminal 2 (S2).

Next, the mobile terminal 2 establishes communication with the server apparatus 1 and transmits, to the server apparatus 1, an estimated position information registration signal that includes the beacon ID and the like of the beacon signal (S3). In the present embodiment, the mobile terminal 2 includes the beacon ID of the beacon signal and the date and time information at the time of reception of the beacon signal in the estimated position information registration signal.

If the server apparatus 1 receives the estimated position information registration signal from the mobile terminal 2, the server apparatus 1 adds, to the movement line data management table T1 of the mobile terminal 2, a record that correlates the date and time information of the estimated position information registration signal with the estimated position information (S4).

Each time the mobile terminal 2 enters the transmission ranges of each beacon device 3 dotted on the path by movement of the service user afterward, processing proceeds in the flow of Step S2 to Step S4.

Establishment and disconnection of communication between the mobile terminal 2 and the server apparatus 1 may be appropriately set in such a manner that communication is disconnected each time the mobile terminal 2 transmits the estimated position information registration signal or in the case of the server apparatus 1 not receiving a signal from the mobile terminal 2 for a certain amount of time after establishment of communication.

The mobile terminal 2 terminates reception of the beacon signal by terminating the store search application during movement in the commercial facility U or at an exit of the commercial facility U (S5).

Process Flow of Mobile Terminal 2 in Sequence of Accumulating Estimated Position Next, a process in the mobile terminal 2 in the case of accumulating the estimated position of the mobile terminal 2 in the server apparatus 1 will be described.

The CPU 201 of the mobile terminal 2, by supply of power, reads a base program into the RAM 202 and executes the base program to realize the input receiving unit 21, the screen display unit 22, the first communicating unit 23, the second communicating unit 24, and the like. The screen display unit 22 displays a home screen on the display 250.

Furthermore, the user provides a launch input for the store search application by providing a touch input or the like on an icon on the home screen. Then, the input receiving unit 21 receives the launch input, and the CPU 201 reads a program of the store search application into the RAM 202 and executes the program to realize the estimated position information notifying unit 25, the viewer unit 26, and the like. The screen display unit 22 displays a top screen (refer to a top screen G1 in FIG. 22) of the store search application on the display 250.

Furthermore, if the input receiving unit 21 receives an input specifying initiation of a position information notification process from the top screen (e.g., an input on an "initiate notification" button B3 in FIG. 22), the CPU 201 executes a process flow illustrated below.

Figure 14:
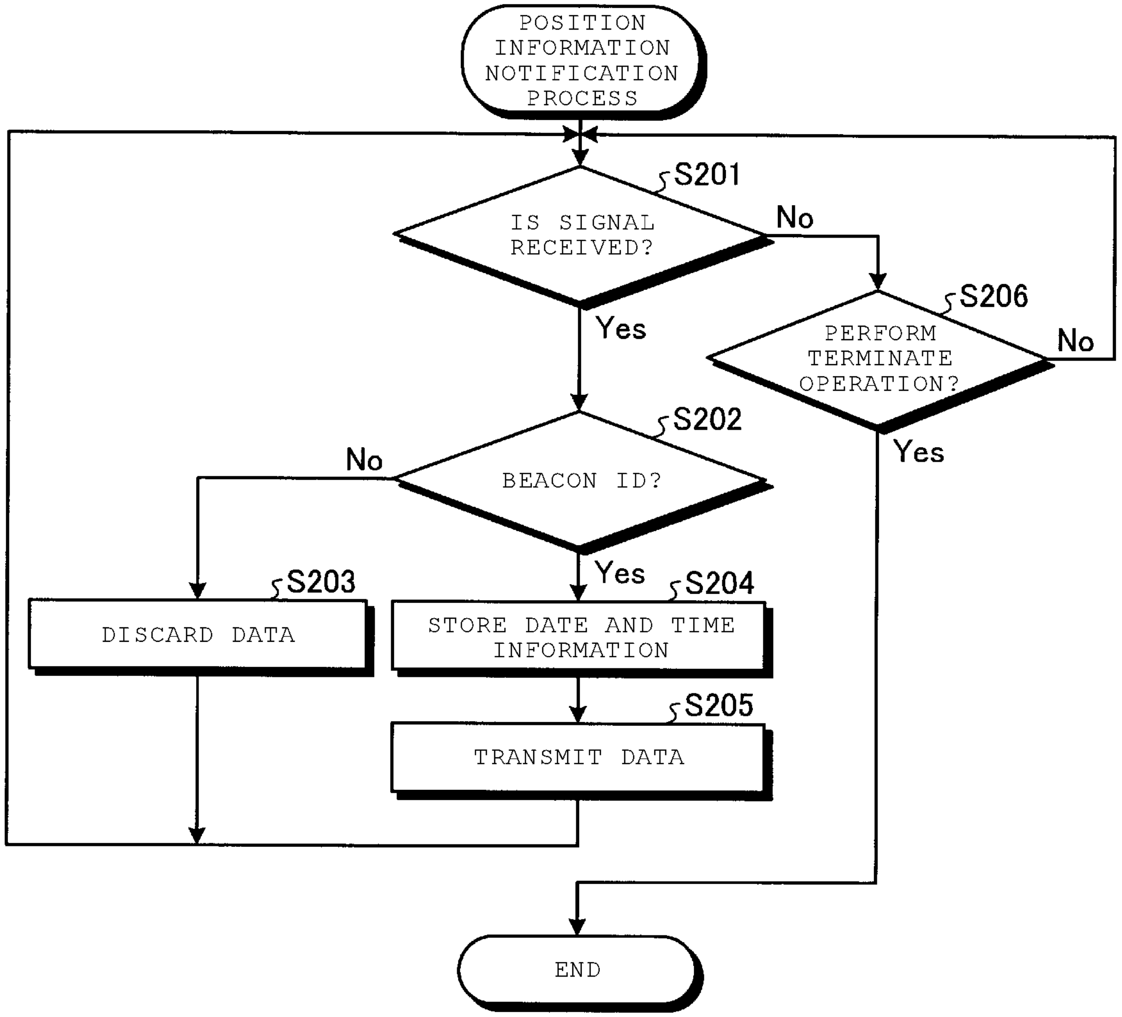
FIG. 14 is a diagram illustrating one example of a process flow of a position information notification process.

FIG. 14 is a diagram illustrating one example of a process flow of the position information notification process by the CPU 201. First, the CPU 201 (in particular, the second communicating unit 24) determines whether or not the Bluetooth communicating circuit 210 receives a signal (S201).

In the case of the Bluetooth communicating circuit 210 receiving a signal (S201: Yes determination), the CPU 201 (in particular, the estimated position information notifying unit 25) receives, from the Bluetooth communicating circuit 210, data that is superimposed on the signal. The CPU 201 (in particular, the estimated position information notifying unit 25) determines whether or not the data portion of the received data includes the beacon ID of the present service (S202).

For example, consider the case of the beacon device 3 transmitting the beacon ID that is coded by a predetermined method. In this case, the CPU 201 (in particular, the estimated position information notifying unit 25) decodes the information of the data portion by a method corresponding to the coding method and determines the post-decoding data to be equal to the beacon ID of the present service in the case of the post-decoding data complying with a certain format (Step S202: Yes determination). Meanwhile, in the case of the post-decoding data not complying with a certain format, the CPU 201 (in particular, the estimated position information notifying unit 25) determines the post-decoding data not to be equal to the beacon ID of the present service (S202: No determination) and discards the received data (S203). After the process of Step S203, the processes from Step S201 are repeated.

In the case of a Yes determination in Step S202, the CPU 201 (in particular, the estimated position information notifying unit 25) stores the current date and time information, the beacon ID, and the like in the data portion D1 (refer to FIG. 11) and generates transmitted data (S204).

Next, the CPU 201 (in particular, the first communicating unit 23) transmits the transmitted data to the server apparatus 1 through a communicating circuit that is currently selected (e.g., the Wi-Fi communicating circuit 211 or the mobile communicating circuit 212) (S205). The CPU 201 (in particular, the first communicating unit 23) establishes communication connection with the server apparatus 1 at the time of transmission of the transmitted data and disconnects communication after completion of registration in the server apparatus 1.

After the process of Step S205, the CPU 201 repeats the processes from Step S201.

Disconnection of communication may be performed at a timing before completion of registration if registration of the estimated position information is guaranteed. In addition, the server apparatus 1 may disconnect communication connection in the case of the server apparatus 1, after completion of registration, maintaining communication connection for a certain amount of time and having no request for registration of the estimated position information from the mobile terminal 2 until elapsing of the certain amount of time.

In the case of a No determination in Step S201, the CPU 201 (in particular, the input receiving unit 21) determines whether or not a terminate input for the position information notification process (e.g., an input on a "terminate notification" button B4 in FIG. 22) is provided (S206). In the case of a terminate input being provided (S206: Yes determination), the CPU 201 terminates the position information notification process. Meanwhile, in the case of a terminate input not being provided (S206: No determination), the CPU 201 repeats the processes from Step S201.

Process Flow of Server Apparatus 1 in Sequence of Accumulating Estimated Position Next, a process in the server apparatus 1 in the case of accumulating the estimated position of the mobile terminal 2 in the server apparatus 1 will be described. The CPU 101 (in particular, the communicating unit 10), if receiving a connection request signal of the mobile terminal 2 by the NIC 106, establishes communication with the mobile terminal 2 through the NIC 106. The CPU 101 (in particular, the communicating unit 10), if further receiving a transmitted signal from the mobile terminal 2 by the NIC 106, reads the information of the transmitted signal, calls the assignment processing unit 11, and causes the assignment processing unit 11 to perform various service processes. The CPU 101 (in particular, the assignment processing unit 11) manages session information per mobile terminal 2 that makes a request, and controls processes in accordance with the request content of the received data. In an accumulation process for the estimated position described here, the CPU 101 (in particular, the assignment processing unit 11) controls processes for the estimated position information registering unit 13. The CPU 101 (in particular, the communicating unit 10) disconnects communication with the mobile terminal 2 by receiving a disconnection request signal from the mobile terminal 2 by the NIC 106 or elapsing of a preset time limit.

Figure 15:
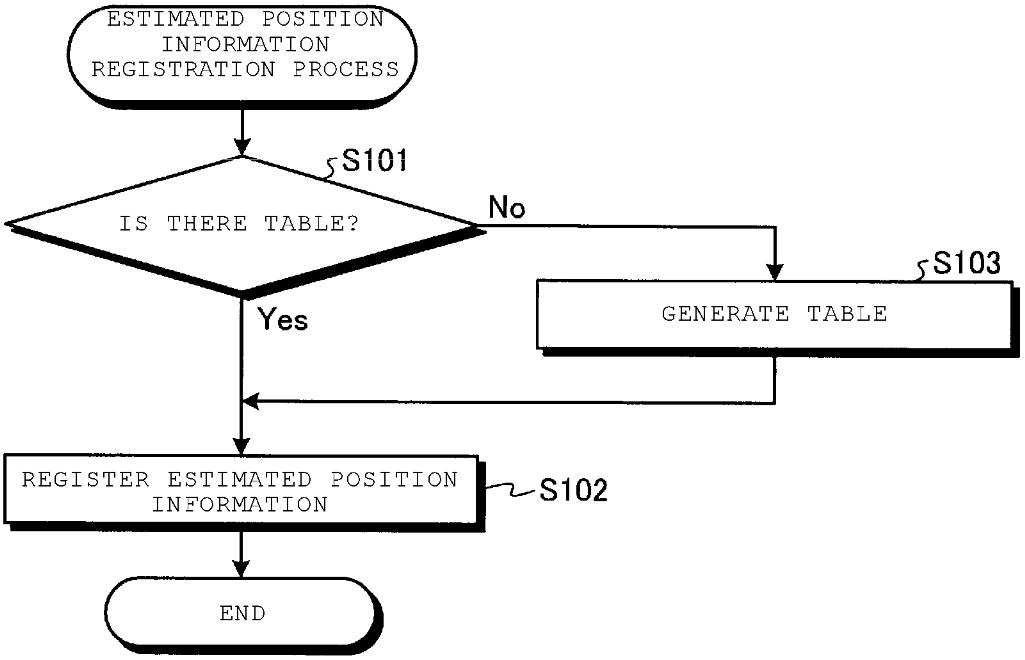
FIG. 15 is a diagram illustrating one example of a process flow of an estimated position information registration process.

FIG. 15 is a diagram illustrating one example of a process flow of an estimated position information registration process by the CPU 101. The assignment processing unit 11 is assumed to receive and pass data with each functional unit, though not particularly illustrated below.

First, the CPU 101 (in particular, the estimated position information registering unit 13) determines whether or not the movement line data management table T1 of a transmitter of the transmitted data is generated (S101). In the present embodiment, identification information of the transmitter is set in the table name of the movement line data management table T1. Therefore, the CPU 101 (in particular, the estimated position information registering unit 13) performs the determination by reading an IP address, a MAC address, or the like stored in a header of the transmitted data and comparing the identification information of the transmitter corresponding to the IP address, the MAC address, or the like with the table name set in the movement line data management table T1.

In the case of the movement line data management table T1 of the transmitter being generated (S101: Yes determination), the CPU 101 (in particular, the estimated position information registering unit 13) registers the estimated position information of the transmitted data in the movement line data management table T1 of the transmitter (S102). In the present embodiment, the CPU 101 (in particular, the estimated position information registering unit 13) references the position information conversion table T2 (refer to FIG. 6) and converts the information of the beacon ID d2 of the data portion D1 (refer to FIG. 11) of the transmitted data into position information. The CPU 101 (in particular, the estimated position information registering unit 13) registers the converted position information in the movement line data management table T1 in correlation with the information of the date and time information d4 of the data portion D1. In the case of the correction information d3 of the data portion D1 storing information, the CPU 101 (in particular, the estimated position information registering unit 13) uses a position corrected with the correction information in registration instead of the above converted position information.

In the case of the movement line data management table T1 of the transmitter not being generated (S101: No determination), the CPU 101 (in particular, the estimated position information registering unit 13) generates the movement line data management table T1 of the transmitter (S103). The CPU 101 (in particular, the estimated position information registering unit 13) transitions to Step S102 and registers the estimated position information of the transmitted data in the movement line data management table T1 of the transmitter.

Sequence of Store Searching

Next, the case of the mobile terminal 2 using the store search service of the server apparatus 1 will be described.

Figure 16:
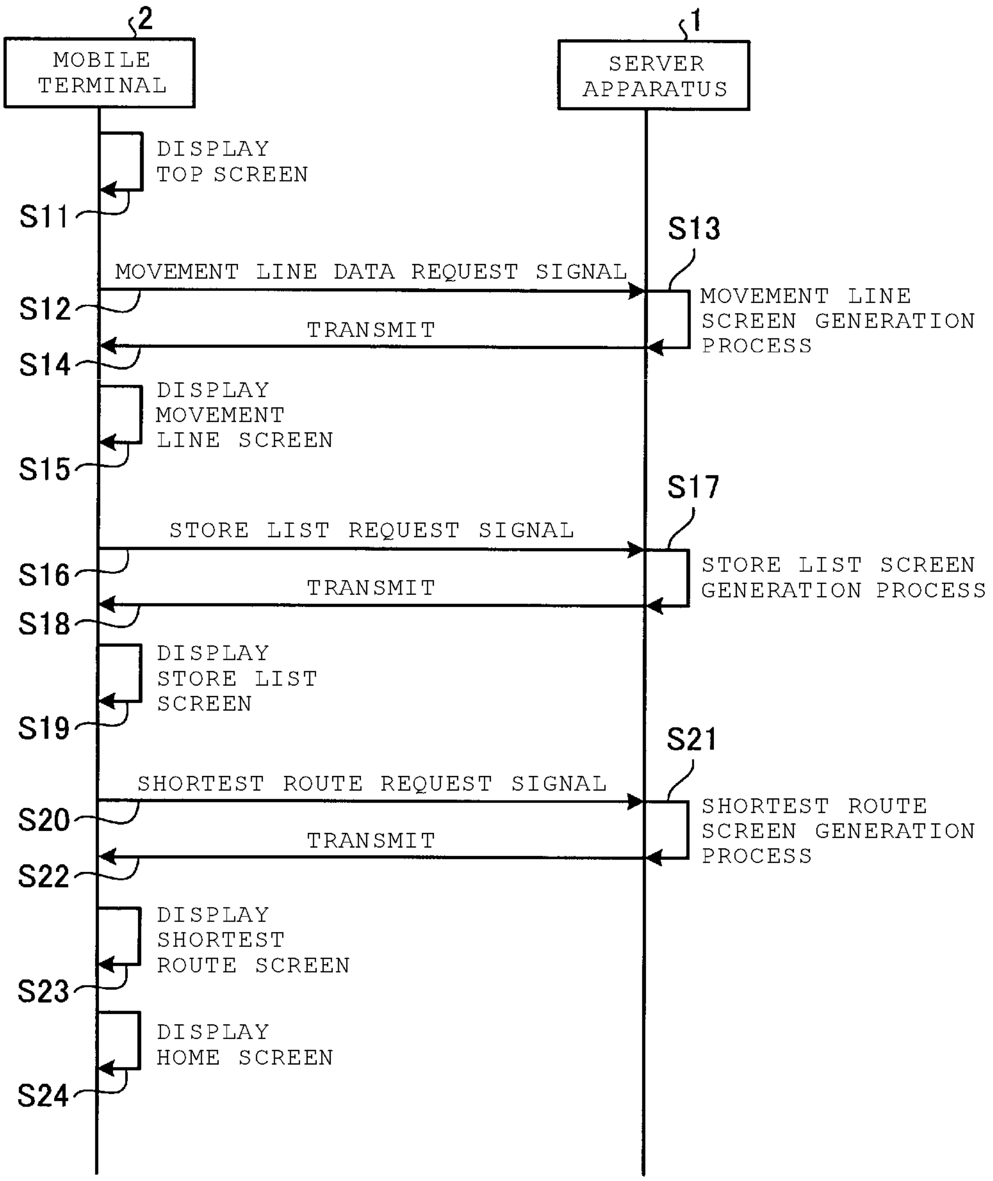
FIG. 16 is a sequence diagram illustrating communication between each device of the guidance system in the case of the mobile terminal searching for a store by list.

FIG. 16 is a sequence diagram illustrating communication between each device of the guidance system 100 in the case of the mobile terminal 2 searching for a store by list. First, the mobile terminal 2 displays the top screen (S11).

Next, the mobile terminal 2, by receiving an operational input for requesting the movement line data, establishes communication with the server apparatus 1 and transmits a movement line data request signal to the server apparatus 1 (S12).

The server apparatus 1, if receiving the movement line data request signal transmitted by the mobile terminal 2, generates screen information indicating the line of movement (in particular, the movement line screen information) (S13) and transmits the screen information to the mobile terminal 2 of the requester (S14).

The mobile terminal 2 displays a movement line screen based on the movement line screen information transmitted by the server apparatus 1 (S15). Furthermore, the mobile terminal 2, in Step S15, displays a search screen by appropriately switching screens in accordance with an operational input.

Next, the mobile terminal 2, by receiving an operational input for requesting a store list, transmits a store list request signal to the server apparatus 1 (S16).

The server apparatus 1, if receiving the store list request signal transmitted by the mobile terminal 2, generates screen information indicating a store list (S17) and transmits the screen information to the mobile terminal 2 of the requester (S18). In the present embodiment, the server apparatus 1 is assumed to also transmit the store information of each store of the listed stores to the mobile terminal 2 of the requester along with the store list screen information.

The mobile terminal 2 displays a store list screen based on the store list screen information transmitted by the server apparatus 1 (S19). Furthermore, the mobile terminal 2, in Step S19, displays a store information screen for a store selected from the store list screen.

Next, the mobile terminal 2, by receiving an operational input for requesting the shortest route, transmits a shortest route request signal to the server apparatus 1 (S20).

The server apparatus 1, if receiving the shortest route request signal transmitted by the mobile terminal 2, generates screen information indicating the shortest route based on the request information (S21) and transmits the screen information to the mobile terminal 2 of the requester (S22).

The mobile terminal 2 displays a shortest route screen based on the shortest route screen information transmitted by the server apparatus 1 (S23).

Then, the mobile terminal 2, by an operational input, again displays a screen for requesting screen information from the server apparatus 1 and, if receiving an operational input on the screen, repeats the procedure from Step S12, Step S16, or Step S20 corresponding to the operational input.

Then, the mobile terminal 2, if receiving an operational input for terminating use of the store search service, disconnects communication established with the server apparatus 1 and displays a screen based on the operational input (S24). For example, the mobile terminal 2 displays the home screen in the case of receiving an operational input for terminating the store search application. As another example, the mobile terminal 2 displays the top screen of the store search application in the case of receiving an operational input for terminating the store search service.

Figure 17:
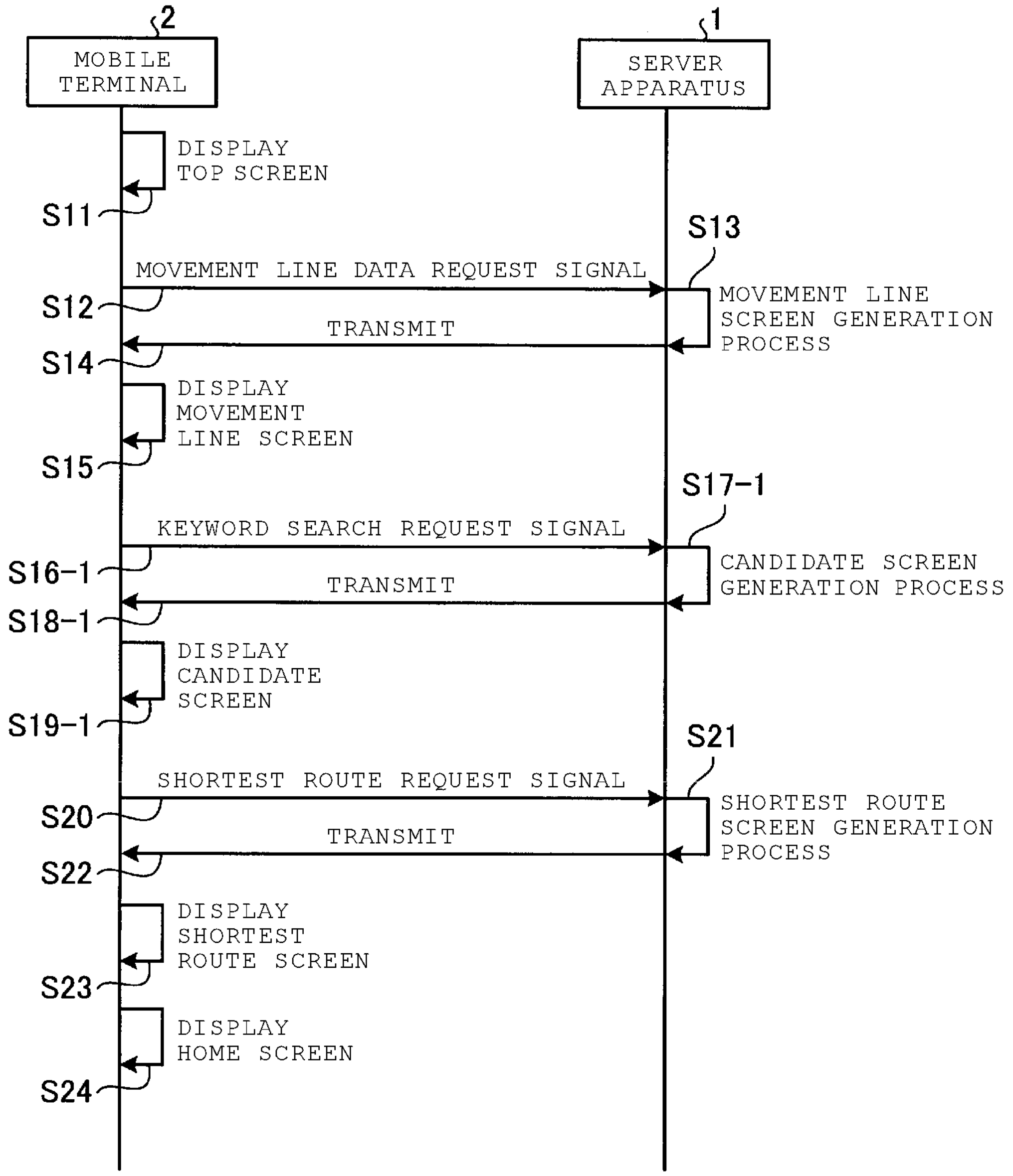
FIG. 17 is a sequence diagram illustrating communication between each device of the guidance system in the case of the mobile terminal searching for a store by keyword.

FIG. 17 is a sequence diagram illustrating communication between each device of the guidance system 100 in the case of the mobile terminal 2 searching for a store by keyword. Hereinafter, different parts from the sequence diagram of FIG. 16 will be described.

The mobile terminal 2, in Step S15, displays the movement line screen and displays a keyword input screen by further switching screens in accordance with an operational input. The mobile terminal 2, if receiving a keyword and a request for searching with the keyword on the keyword input screen, includes the keyword in a keyword search request signal and transmits the keyword search request signal to the server apparatus 1 (S16-1).

The server apparatus 1, based on the keyword search request signal transmitted by the mobile terminal 2, generates screen information for a relevant store (S17-1) and transmits the screen information to the mobile terminal 2 of the requester (S18-1). In the present embodiment, the server apparatus 1 is assumed to also transmit store information indicating detailed information of each candidate store to the mobile terminal 2 of the requester along with the candidate screen information.

The mobile terminal 2 displays a candidate screen based on the candidate screen information transmitted by the server apparatus 1 (S19-1). Furthermore, the mobile terminal 2, in Step S19-1, displays the store information screen for a store selected from the candidate screen.

Then, the procedure of the mobile terminal 2 is the same as the procedure from Step S20 in FIG. 16.

Process Flow of Server Apparatus 1 in Sequence of Store Searching

Next, a service process of the server apparatus 1 in the case of the mobile terminal 2 using the store search service of the server apparatus 1 will be described. The service process of the server apparatus 1 is performed under control of the assignment processing unit 11 described in the estimated position information registration process in FIG. 15 and acquires screen information to be transmitted to the mobile terminal 2. The CPU 101 (in particular, the communicating unit 10) receives the screen information and transmits in response the screen information to the mobile terminal 2 through the NIC 106.

FIG. 18 to FIG. 21 are diagrams illustrating one example of flows of various service processes. Hereinafter, the process flows in each drawing will be described, assuming that the assignment processing unit 11 receives and passes data with each functional unit, though not particularly described in each drawing.

Figure 18:
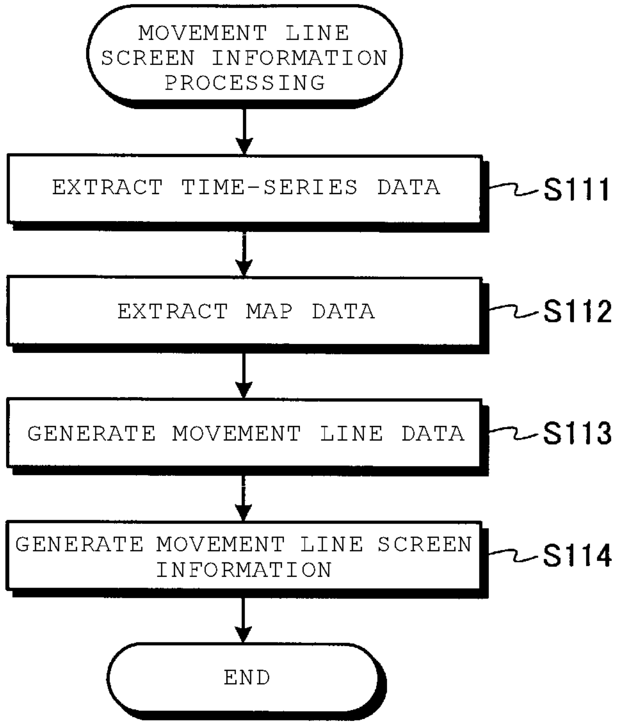
FIG. 18 is a flowchart of a service process in the case of the server apparatus receiving a movement line data request signal.

FIG. 18 is a flowchart of a service process in the case of the server apparatus 1 receiving a movement line data request signal. First, the CPU 101 (in particular, the time-series data extracting unit 14) extracts time-series data from the movement line data management table T1 of the transmitter (S111).

Specifically, the CPU 101 (in particular, the time-series data extracting unit 14) reads an IP address, a MAC address, or the like stored in a header of the received data and specifies the movement line data management table T1 of the transmitter based on the identification information of the transmitter corresponding to the IP address, the MAC address, or the like. The CPU 101 (in particular, the time-series data extracting unit 14) extracts time-series data on the current date from the movement line data management table T1.

The CPU 101 (in particular, the time-series data extracting unit 14), in the case of date and time information being stored in the date and time specification information d11 of the data portion D2 (refer to FIG. 12) of the received data, extracts time-series data of the date and time indicated by the date and time information. For example, assume that a range from “2015. 11. 11. 5:00 p.m.” to “2015. 11. 11. 6:00 p.m.” is specified as the date and time specification information. In this case, the CPU 101 (in particular, the time-series data extracting unit 14) sets records of the date and time information 501 of the movement line data management table T1 relevant to the specified range as an extraction range for the time-series data.

Next, the CPU 101 (in particular, the map data extracting unit 15) extracts, from the map information table T3 (refer to FIG. 7), map data that includes a position specified by the estimated position information of the time-series data extracted by the time-series data extracting unit 14 (S112). In the present embodiment, the minimum area of the map data including all positions is extracted by comparing the range of the area specified in the area selection information 701 of the map information table T3 with the positions specified by each estimated position information of the time-series data.

Next, the CPU 101 (in particular, the movement line generating unit 16) generates movement line data based on the time-series data extracted by the time-series data extracting unit 14 (S113). For example, the CPU 101 (in particular, the movement line generating unit 16) generates movement line data from the starting position to the end position of the time-series data by interpolating, in the time-series order, straight line data between each estimated position information in the time-series order.

Next, the CPU 101 (in particular, the screen information generating unit 12) generates, as the screen information, an image or the like in which the movement line data and the map data are combined (S114).

Figure 19:
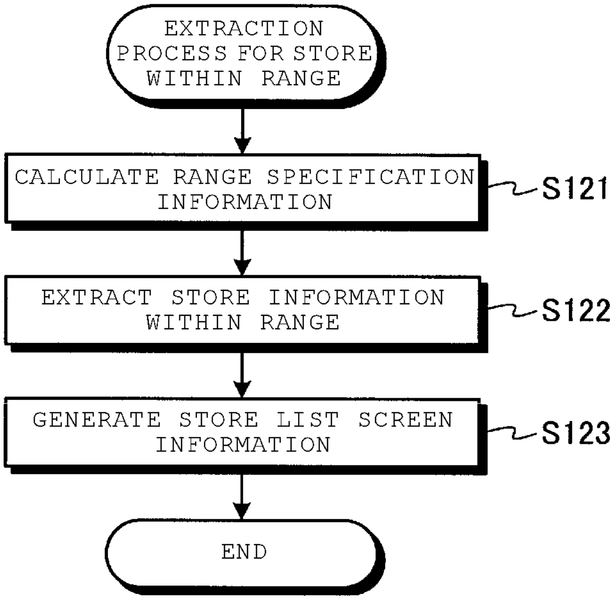
FIG. 19 is a flowchart of a service process in the case of the server apparatus receiving a store list request signal.

FIG. 19 is a flowchart of a service process in the case of the server apparatus 1 receiving a store list request signal. First, the CPU 101 (in particular, the movement range specifying unit 17), based on each estimated position information of the time-series data extracted by the time-series data extracting unit 14, calculates the range specification information that sets an area along the path connecting each estimated position as a movement range (S121).

Next, the CPU 101 (in particular, the store information extracting unit 18) extracts all relevant stores with the range specification information calculated by the movement range specifying unit 17 as a search condition (S122). Specifically, the CPU 101 (in particular, the store information extracting unit 18) searches for a store in the area indicated by the range specification information from the store position information 802 of the store information table T4. For example, assume that the range specification information is information that indicates the distance from the estimated position. In this case, a store for which the position information of the store position information 802 is within the distance from the estimated position is regarded as being in the area indicated by the range specification information, and the store information indicating the store is extracted.

Next, the CPU 101 (in particular, the screen information generating unit 12) generates screen information of the store list screen illustrating a list of the stores extracted by the store information extracting unit 18 or screen information of the store information screen illustrating detailed information per store (S123).

Figure 20:
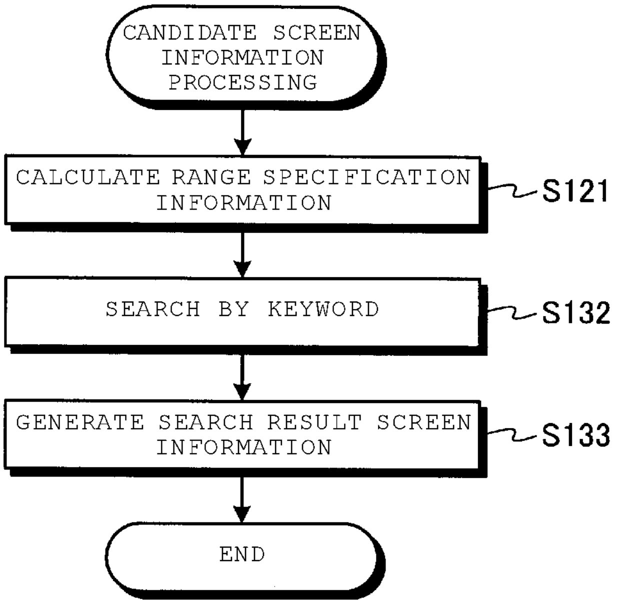
FIG. 20 is a flowchart of a service process in the case of the server apparatus receiving a keyword search request signal.

FIG. 20 is a flowchart of a service process in the case of the server apparatus 1 receiving a keyword search request signal. First, the CPU 101 (in particular, the movement range specifying unit 17), based on each estimated position information of the time-series data extracted by the time-series data extracting unit 14, calculates the range specification information that sets an area along the path connecting each estimated position as a movement range (S121).

Next, the CPU 101 (in particular, the store information extracting unit 18) extracts relevant stores with the range specification information calculated by the movement range specifying unit 17 and the search information included in the keyword search request signal as search conditions (S132).

Specifically, the CPU 101 (in particular, the store information extracting unit 18) searches for a store in the area indicated by the range specification information from the store position information 802 of the store information table T4 and extracts the store information of the store. Furthermore, the CPU 101 (in particular, the store information extracting unit 18) performs searching with the search information (e.g., the keyword or the like) in the merchandise information table T5 (refer to FIG. 9) that corresponds to the store ID of any extracted store. The search information is information that is stored in the search information d21 of the data portion D4 (refer to FIG. 12) of the keyword search request signal. If the searching generates a hit in the target merchandise information table T5, the CPU 101 (in particular, the store information extracting unit 18) confirms previously extracted store information of the store ID of the table name as the store information of the candidate stores.

Next, the CPU 101 (in particular, the screen information generating unit 12) generates screen information of a search result screen illustrating the candidate stores confirmed by the store information extracting unit 18 or screen information of the store information screen illustrating detailed information of the candidate stores (S133).

Figure 21:
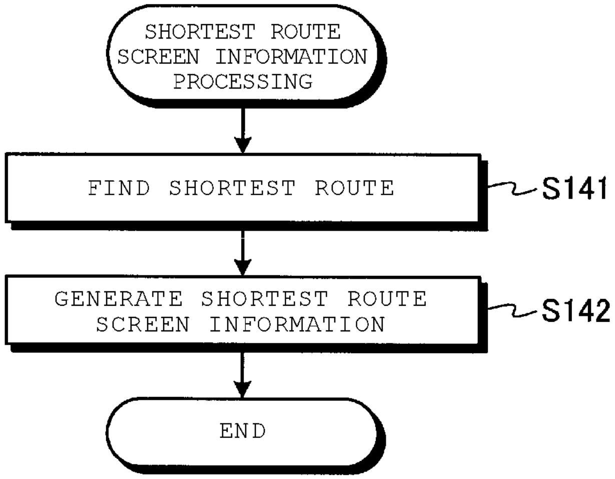
FIG. 21 is a flowchart of a service process in the case of the server apparatus receiving a shortest route request signal.

FIG. 21 is a flowchart of a service process in the case of the server apparatus 1 receiving a shortest route request signal. First, the CPU 101 (in particular, the shortest route finding unit 19) finds the shortest route to the position indicated by the store position information included in the shortest route request signal (S141).

For example, the CPU 101 (in particular, the shortest route finding unit 19) sets the estimated position information of the last time-series data extracted by the time-series data extracting unit 14 to a starting point as a current place and finds the shortest route from the starting point to the position indicated by the store position information. The store position information is stored in the store position information d31 of the data portion D5 (FIG. 12) of the shortest route request signal.

Next, the CPU 101 (in particular, the screen information generating unit 12) generates, as the screen information, an image in which data representing the shortest route and the map data are combined (S142).

Process Flow of Mobile Terminal 2

Next, a process in the mobile terminal 2 in accordance with the screen flow of the store search application of the mobile terminal 2 will be described. The mobile terminal 2 performs a launch process for the store application by executing the store search application downloaded to the flash ROM 203 and displays the top screen on the display. Then, the mobile terminal 2 receives a touch input on a button from the user (e.g., service user) and switches display screens or accesses the server apparatus 1 in accordance with the input. The mobile terminal 2, in the case of accessing the server apparatus 1, receives the screen information transmitted in response by the server apparatus 1 and updates the display screen of the display based on the received screen information.

FIG. 22 to FIG. 25 are diagrams illustrating one example of screen configurations and a screen flow of each screen used in the store search application. A top screen G1 illustrated in FIG. 22 has a "confirm line of movement of today" button B1, a "confirm past line of movement" button B2, the "initiate notification" button B3, the "terminate notification" button B4, a "terminate" button B5, and the like.

The "confirm line of movement of today" button B1 is an operation button for instructing the viewer unit 26 to display the line of movement of today. The "confirm past line of movement" button B2 is an operation button for instructing the viewer unit 26 to display the past line of movement. The "terminate" button B5 is an operation button for instructing the viewer unit 26 to terminate the store search application. The "terminate" button B5 is also disposed in each screen described later.

The "initiate notification" button B3 and the "terminate notification" button B4 are respectively operation buttons for instructing the estimated position information notifying unit 25 to initiate notification of the estimated position of the mobile terminal 2 to the server apparatus 1 and to terminate initiated notification.

If a touch input is provided on the "confirm line of movement of today" button B1, the viewer unit 26 acquires, by communication, the movement line screen information indicating the line of movement of the current date and displays a movement line screen G2. Meanwhile, if a touch input is provided on the "confirm past line of movement" button B2, the viewer unit 26 displays an input form screen and receives input of a specified date and time.

Figure 22:
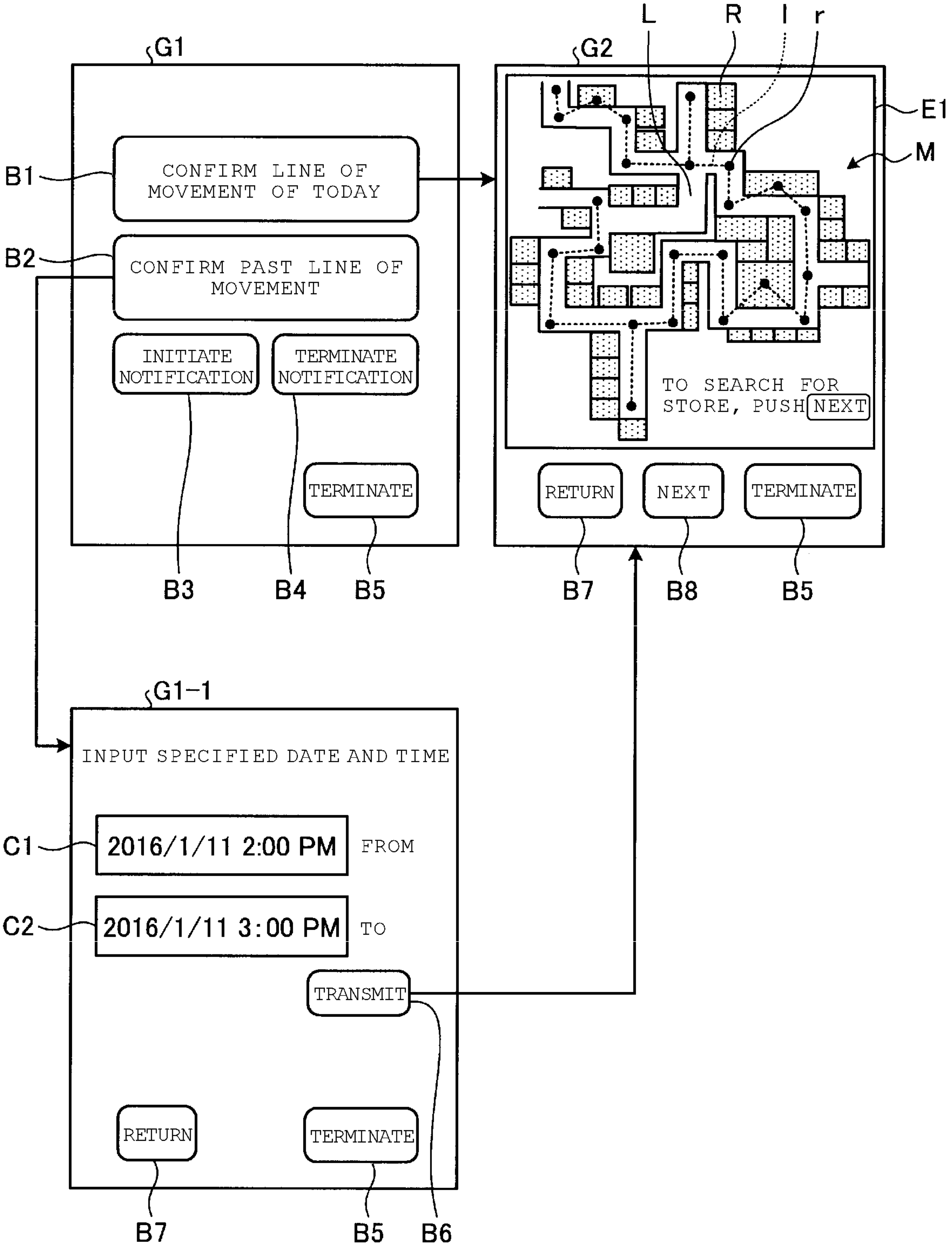
FIGS. 22-25 are each a diagram illustrating one example of screen configurations and a screen flow of each screen used in a store search application.

In an input form screen G1-1 illustrated in FIG. 22, an input box C1 for the starting date and time and an input box C2 for the end date and time are disposed so that the user can specify any period. If a touch input is provided on a "transmit" button B6, the viewer unit 26 acquires, by communication, the movement line screen information indicating the line of movement in the range of the period specified by the starting date and time of the input box C1 and the end date and time of the input box C2 and displays the movement line screen G2 that includes the line of movement. A "return" button B7 of the input form screen G1-1 is an operation button for instructing the viewer unit 26 to return to the most previous display screen. The "return" button B7 is also appropriately disposed in other screens described later.

The movement line screen G2 illustrated in FIG. 22 has a map display area E1 displaying the line of movement of the requested date (or the specified date and time) and the map data of the line of movement, a "next" button B8, and the like.

In the present embodiment, the map display area E1 displays an image that is generated in the server apparatus 1 by combining the line of movement on the map data. The movement line screen G2 illustrated in FIG. 22 represents a simple display example illustrating the estimated position of the service user in the transmission area of the beacon signal by a black circle mark r and illustrating the line of movement connecting each estimated position in the time-series order by a dotted line 1. A shaded rectangle R illustrates one store. In addition, a map M that includes each store and a passage L along the stores is the minimum range of the map including the line of movement (represented by dotted line 1) that is selected by the server apparatus 1.

The "next" button B8 is an operation button for instructing the viewer unit 26 to use store searching. If a touch input is provided on the "next" button B8, the viewer unit 26 displays a screen for selecting a method of store searching.

Figure 23:
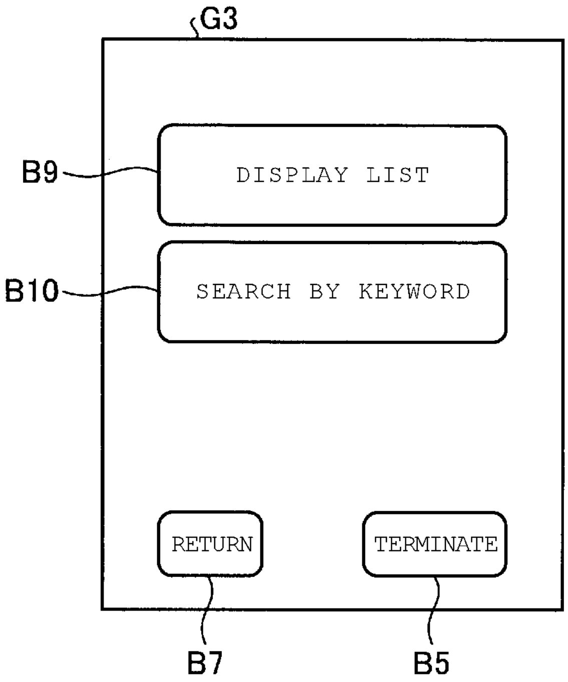

A search method selection screen G3 illustrated in FIG. 23 has a "display list" button B9, a "search by keyword" button B10, and the like. The "display list" button B9 is an operation button for instructing the viewer unit 26 to display the store list of the stores on the line of movement. The "search by keyword" button B10 is an operation button for instructing the viewer unit 26 to display a store, of the stores on the line of movement, relevant to a keyword.

If a touch input is provided on the "display list" button B9, the viewer unit 26 acquires the store list screen information by communication with the server apparatus 1 and displays a store list screen G4. Meanwhile, if a touch input is provided on the "search by keyword" button B10, the viewer unit 26 displays an input form screen for a keyword and receives input of a keyword.

Figure 24:
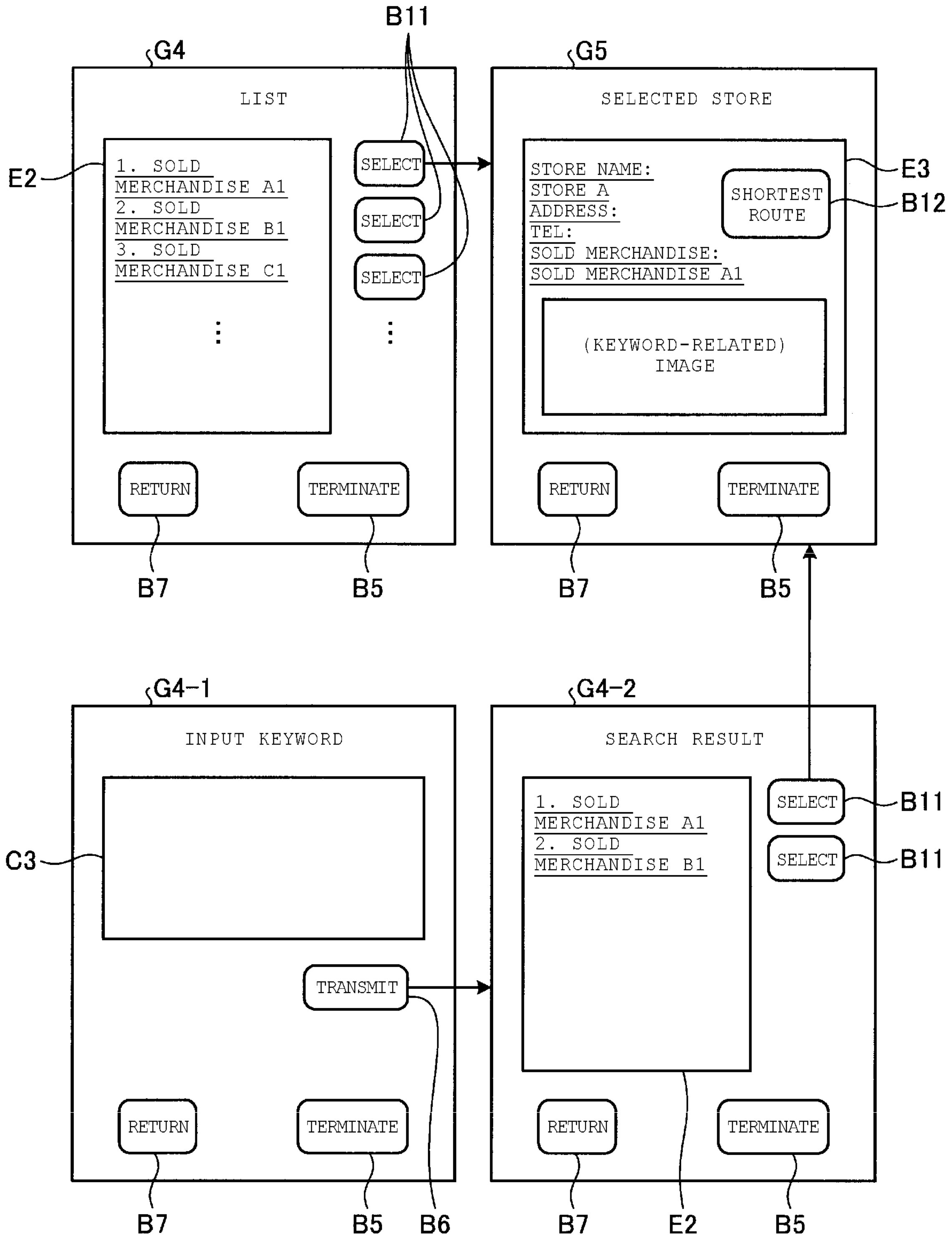

An input form screen G4-1 for a keyword illustrated in FIG. 24 has an input box C3 for a keyword, the "transmit" button B6, and the like. An input method for a keyword may be appropriately set. For example, one keyword may be input in the input box C3. Alternatively, a plurality of keywords may be input, and each keyword may be connected by search condition information such as "AND" and "OR". In addition, a plurality of input boxes may be disposed, and input keywords of each input box may be correlated with AND searching or OR searching.

If a touch input is provided on the "transmit" button B6, the viewer unit 26 acquires, by communication with the server apparatus 1, the candidate screen information for stores relevant to the input keyword and displays a candidate screen G4-2.

The store list screen G4 illustrated in FIG. 24 has a store list E2, a "select" button B11 per store on the store list E2, and the like. The store list E2 displays simple store information of each store on the line of movement. For example, one or a plurality of pieces of information, of the store name, the position information, and the objective information included in the store information, that is previously set by the user or the like is displayed. In FIG. 24, the name of a sold item that is one objective information is displayed as an example. If a touch input is provided on the "select" button B11 of one store on the store list E2, the viewer unit 26 displays a store information screen G5 that displays detailed information of the store for which the touch input is provided.

The candidate screen G4-2 illustrated in FIG. 24 has the store list E2 of stores that are further narrowed by the keyword, the "select" button B11 per store on the store list E2, and the like. The store list E2 displays simple store information of stores, of the stores on the line of movement, narrowed by the keyword. If a touch input is provided on the "select" button B11 of one store on the store list E2, the viewer unit 26 displays the store information screen G5 for the store.

The store information screen G5 illustrated in FIG. 24 has detailed information E3 of the store, a "shortest route" button B12, and the like. The detailed information E3 of the store displays the store information of the selected store (for example, an image displaying a summary of the store or an item image corresponding to the keyword in the case of item images being registered). The "shortest route" button B12 is an operation button for instructing the viewer unit 26 to display the shortest route information to the store. If a touch input is provided on the "shortest route" button B12, the viewer unit 26 acquires the shortest route information by communication with the server apparatus 1 and displays a shortest route screen G6.

Figure 25:
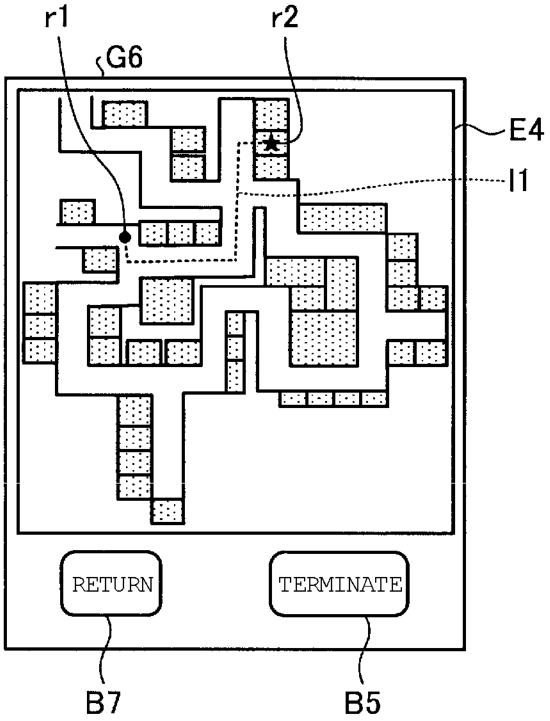

The shortest route screen G6 illustrated in FIG. 25 has a map display area E4 that displays map data illustrating the shortest route, and the like.

In the present embodiment, the map display area E4 displays an image that is generated in the server apparatus 1 by combining the shortest route on the map data. The shortest route screen G6 illustrated in FIG. 25 represents a simple display example illustrating the final position of the service user on the line of movement by a black circle mark r1, illustrating the destination of the service user by a star mark r2, and illustrating the shortest route from the final position to the destination by a dotted line 11.

As described heretofore, the server apparatus 1 as the information processing apparatus according to the present embodiment functions as an input section that receives input of information related to service, by the communicating unit 10 that receives information related to service from the mobile terminal 2, the assignment processing unit 11 that receives the request content of the received data, and the like.

By the time-series data extracting unit 14 that extracts the time-series data of the mobile terminal from the movement line data management table T1, the map data extracting unit 15 that extracts the map data of the area indicated by the time-series data from the map information table T3, the movement range specifying unit 17 that specifies the movement range of the mobile terminal 2 from the time-series data and the map data, the store information extracting unit 18 that extracts the position information of a store included in the movement range from the store information table T4, and the like, the server apparatus 1 functions as a specification processing section.

By the screen information generating unit 12 that generates screen information including the position information of the store, the communicating unit 10 that transmits the screen information to the mobile terminal 2 of the requester, and the like, the server apparatus 1 functions as an output section that outputs the position information of the store specified by the specification processing section.

By the store information extracting unit 18 that, in the case of the data received from the mobile terminal 2 including search information, searches in the merchandise information table T5 of each store ID and extracts the store ID including merchandise relevant to the search information, and the like, the server apparatus 1 functions as an extraction processing section.

By the shortest route finding unit 19 that finds the shortest route from the estimated position of the service user at the time of store searching to a desired store, and the like, the server apparatus 1 functions as a way guidance information processing section.

By the estimated position information registering unit 13 and the like, the server apparatus 1 functions as a registration processing section. In addition, by the movement line data management table T1, the position information conversion table T2, and the like, the server apparatus 1 has a storage unit that stores the estimated position information registered by the registration processing section in correlation with the time-series order information.

By the second communicating unit 24 that reads the beacon ID transmitted from the beacon device 3, the estimated position information notifying unit 25 that notifies the server apparatus 1 of the read beacon ID, and the like, the mobile terminal 2 according to the present embodiment functions as a generating section.

By the first communicating unit 23, the viewer unit 26, and the like, the mobile terminal 2 functions as a first transmitting section, a second transmitting section, and a first receiving section.

By the input receiving unit 21 and the like, the mobile terminal 2 functions as a search information input section.

By the screen display unit 22, the viewer unit 26, and the like, the mobile terminal 2 functions as a display section.

The present embodiment illustrates a guidance system in a commercial facility and, as one example, illustrates the mobile terminal 2 as receiving the beacon ID from the beacon device 3 installed at each place and generating information related to the position thereof from the beacon ID. However, the manner that the mobile terminal 2 generates the position information thereof is not limited thereto. Changes may be made in such a manner that the mobile terminal 2 can receive position information from the GPS outdoors. In addition, in the case of not being able to receive position information from the GPS, the mobile terminal 2 may be changed to generate position information from geomagnetic data.

For example, a GPS unit, a three-axis magnetic sensor or a three-axis acceleration sensor for implementing self-contained pedestrian navigation, or the like is disposed in the mobile terminal 2. The mobile terminal 2, in the case of being able to receive position information from the GPS, receives position information by the GPS unit and generates the time-series data by using the position information or the time of reception. In addition, the mobile terminal 2, in the case of not being able to receive a signal from the GPS, monitors an output signal that is output at all times by the three-axis magnetic sensor or the three-axis acceleration sensor, and generates the time-series data with the last position information received from the GPS as a starting point.

As another example, an atmospheric pressure sensor is disposed in the mobile terminal 2. In addition, a positioning database that correlates position information with information indicating the altitudinal position of the place is disposed in the server apparatus 1. The mobile terminal 2 measures the altitudinal position of the mobile terminal during movement by the output of the atmospheric pressure sensor and transmits information indicating the altitudinal position, the time of position measurement, the terminal ID, and the like to the server apparatus 1. The server apparatus 1 references the position measurement database and acquires position information that corresponds to the information indicating the altitudinal position received from the mobile terminal 2. The server apparatus 1 accumulates the acquired position information as the estimated position information of the mobile terminal 2 and manages the time-series data.

Besides, as other positioning methods, Wi-Fi positioning, mobile phone base station positioning, sonic positioning, Bluetooth positioning, visible light positioning, camera image positioning, and the like may be appropriately applied. In addition, various types of positioning may be applied in a combined manner.

While the present embodiment illustratively illustrates store searching as one example of place searching, the place of a searching target is not limited to a store. The place of a searching target may be any public place of which the position is open to the public. For example, the public place may include not only stores providing merchandise or service but also parks, facilities, famous places, and the like. In addition, the public place is not limited to a place having a fixed position and may be a place having a changing position.

For example, the public place having a changing position may include places of blood donation, leaflet distribution, busking, and the like. In this case, the mobile terminal 2 is carried by a person who provides service such as blood donation, leaflet distribution, or busking in the public place having a changing position. In this mobile terminal 2, a registration request for the position information in the time-series data is changed to an update request for the position information of the public place in a transmission process of transmitting information indicating a position to the server apparatus 1 after reception of a beacon signal. By this update request, the server apparatus 1 updates, with the received position information, the position information of the public place correlated with the identification information of the mobile terminal 2.

While the present embodiment illustratively illustrates the case of a human being moving on foot, the store search service may be provided to a service user who moves by vehicle or the like such as a car. For example, the store search service may be provided in a car navigation system.

In addition, the predetermined range to which the estimated position belongs may be set to any range, such as a range including stores lined up along a passage in the range of movement of the service user or a range including several stores outside of the passage.

While the present embodiment regards a person using the store search service as the "service user", the "service user" is not limited to a person registered in the present system. For example, the store search service may be widely provided to users other than the registered person.

The present embodiment describes the server apparatus 1 as having various tables (e.g., the movement line data management table, the position information conversion table, and the map information table, and the store information table, the merchandise information table, and the like as correspondence information) and performing registration, extraction, and the like for each table. However, the configuration of the server apparatus 1 is not limited to this configuration. The server apparatus 1 may be changed to include one or a plurality of various tables in an external device and acquire data from the external device. For example, the server apparatus 1 may acquire the time-series data of the mobile terminal 2 provided by the external device and provide the above store search service based on the acquired time-series data. In addition, the server apparatus 1 may acquire the predetermined range of the map data from a map database provided by the external device and provide the above store search service based on the acquired map data. In addition, the server apparatus 1 may acquire the position information of a store provided by the external device and provide the above store search service based on the acquired information.

While the present embodiment illustratively illustrates finding the shortest route with the final position of the service user on the time-series data as a starting position, the present embodiment is not limited thereto. For example, the server apparatus 1 may receive information related to position from the mobile terminal 2 at the time of store searching and find the shortest route with the estimated position as a starting position.

While the present embodiment illustratively illustrates the server apparatus 1 as transmitting an image combined with the line of movement or the shortest route to the mobile terminal 2, the present embodiment is not limited thereto. A viewer that displays map data may be installed on the mobile terminal 2, receive the map data, the movement line data, or the shortest route data transmitted from the server apparatus 1, and display the data on the mobile terminal 2 by managing the data in layers.

The present embodiment, as one example, illustrates a flow of a series of processes in which the service user Q types search information such as a store or merchandise that the service user Q remembers into the mobile terminal 2 and acquires a search result for the position of the store relevant to the search information from the server apparatus 1. However, the service user Q may use the present system to search for the position of a store that is not known to be on the line of movement. In this case, even if the service user Q types search information into the mobile terminal 2, the server apparatus 1 may not acquire a relevant store. Therefore, in the case of such use, a notifying section that, in the case of absence of the store relevant to the search information, notifies the mobile terminal 2 of the absence by screen information or the like from the server apparatus 1 may be disposed.

By various configurations described heretofore, if the mobile terminal 2 requests store searching, the mobile terminal 2 can acquire the position information of a desired store within the range of movement thereof from the server apparatus 1. In addition, the mobile terminal 2, in the case of transmitting search information, can acquire the position information of a store relevant to the search condition within the range of movement thereof from the server apparatus 1. Even in the case of absence of a store relevant to the search information, the absence can be notified from the server apparatus 1 to the mobile terminal 2. Thus, the presence or absence of the desired store within the range of movement of the mobile terminal 2 can be recognized on the mobile terminal 2 side.

The mobile terminal 2, in the case of specifying generation of the shortest route, can acquire information indicating the shortest route to the desired store from the server apparatus 1.

For example, assume that the service user during shopping recalls a store that is on the way passed. In this case, the service user, by requesting the server apparatus 1 to perform store searching with the mobile terminal 2 that the service user carries, can acquire the position information of a store included in the range of movement thereof (e.g., a store and the like that is along the traveled path of the service user). Furthermore, by typing a keyword for merchandise coming to mind into the mobile terminal 2 and transmitting the keyword to the server apparatus 1, the service user can acquire the position information of a store, within the range of movement thereof, that handles merchandise relevant to the keyword. The service user can return to the desired store in accordance with the position information. Furthermore, if the user requests the shortest route, the shortest route to the desired store is displayed on the mobile terminal 2, and the service user can definitely return to the desired store in accordance with the display.

Second Embodiment

An embodiment of providing the server apparatus 1 illustrated in the first embodiment by cloud computing such as platform as a service (PaaS) will be illustrated in a second embodiment.

Figure 26:
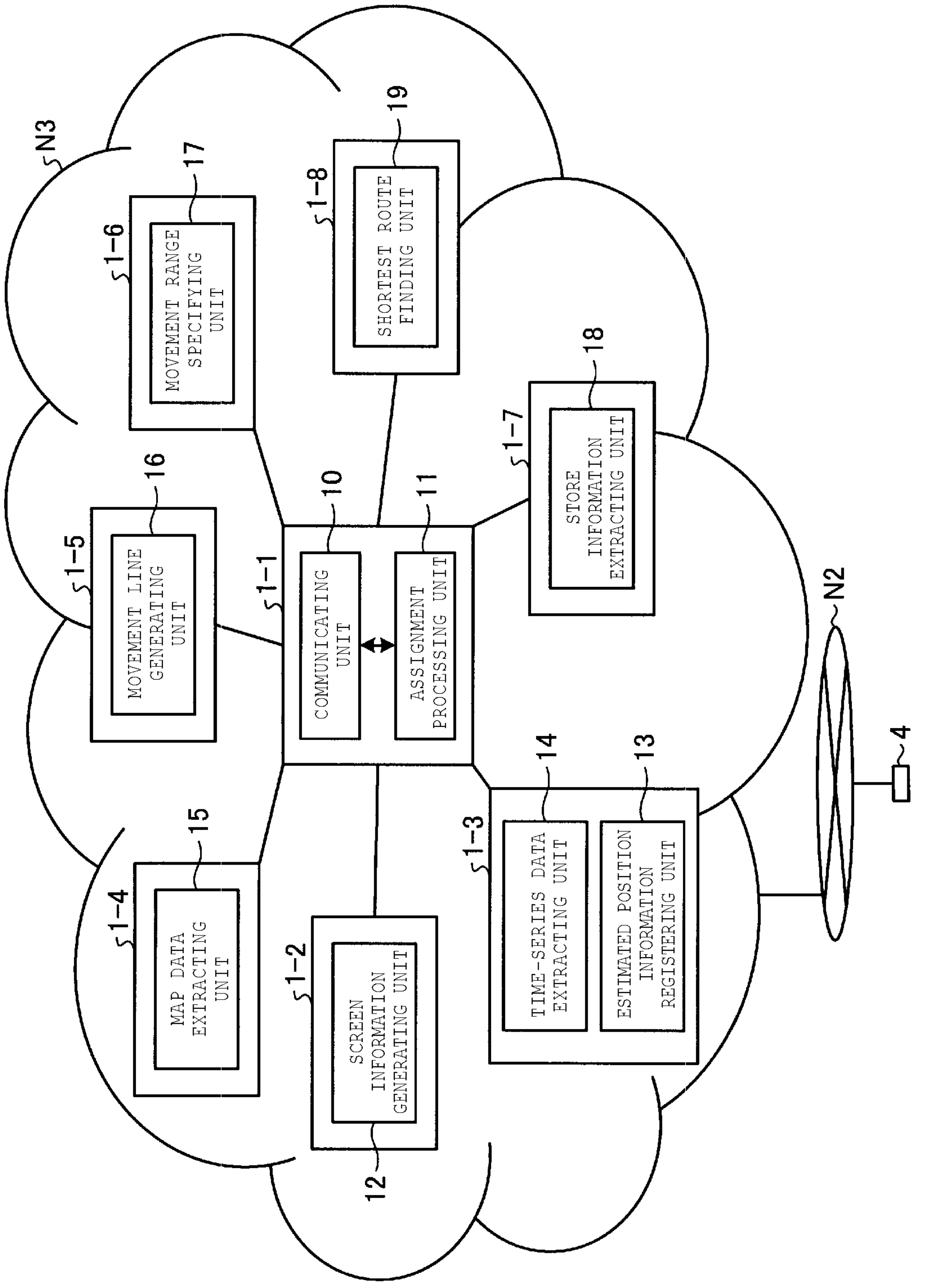
FIG. 26 is a diagram illustrating one embodiment of providing functional units in a distributed manner in a plurality of server apparatuses according to a second embodiment.

FIG. 26 is a diagram illustrating one embodiment of providing the functional units of the server apparatus 1 in a distributed manner in a plurality of server apparatuses.

The example illustrated in FIG. 26 illustrates a conceptual diagram of the case of implementing, as a group of relevant functional units, the communicating unit 10, the assignment processing unit 11, the screen information generating unit 12, the estimated position information registering unit 13, the time-series data extracting unit 14, the map data extracting unit 15, the movement line generating unit 16, the movement range specifying unit 17, the store information extracting unit 18, the shortest route finding unit 19, and the like illustrated in FIG. 4 on different server apparatuses.

In the example illustrated in FIG. 26, a server apparatus 1-1 implements functional units of the communicating unit 10 and the assignment processing unit 11 and manages various requests from the mobile terminal 2, session information with the mobile terminal 2, information of an assignment destination, and the like. For example, the server apparatus 1-1 manages various requests from the mobile terminal 2 by number and transmits execution result information of a service process of a server apparatus of an assignment destination to another server apparatus to acquire final result information such as screen information.

Other server apparatuses 1-2, 1-3, . . . , 1-8 execute service processes of the functional units implemented therein by request from the assignment processing unit 11 and transmit in response execution results to the assignment processing unit 11. For example, the server apparatus 1-3 includes the movement line data management table T1 (refer to FIG. 5) and the position information conversion table T2 (refer to FIG. 6) and performs a registration process for the time-series data in the movement line data management table T1, an extraction process for the time-series data from the movement line data management table T1, and the like. In addition, the server apparatus 1-4 includes the map information table T3 and performs an extraction process for the map data, and the like. In addition, the server apparatus 1-7 includes the store information table T4 and the merchandise information table T5 and performs an extraction process for the store information, and the like.

The configuration in FIG. 26 illustrated as the second embodiment is one example of a provided embodiment, and the provided embodiment by cloud computing is not limited thereto. The provided embodiment may be appropriately changed if hardware resources, infrastructural resources, or software resources of the Internet N3 for providing an execution environment can be used. For example, the number of server apparatuses 1-1, 1-2, . . . may be increased or decreased, and the combination of functional units implemented in each of the server apparatuses 1-1, 1-2, . . . may be appropriately changed. In addition, each functional unit may be further divided, and the divided functional units may be appropriately combined and implemented in the plurality of server apparatuses 1-1, 1-2, . . . . In addition, changes may be made in such a manner that various tables T1 to T5 are disposed in a database server apparatus so that each server apparatus references the tables in the database server apparatus.

Third Embodiment

An embodiment in the case of disposing the server apparatus 1 illustrated in the first embodiment per commercial facility will be illustrated in a third embodiment. Hereinafter, the same parts as the first embodiment will be designated by the same reference signs and will not be described. Different parts from the first embodiment will be mainly described.

Figure 27:
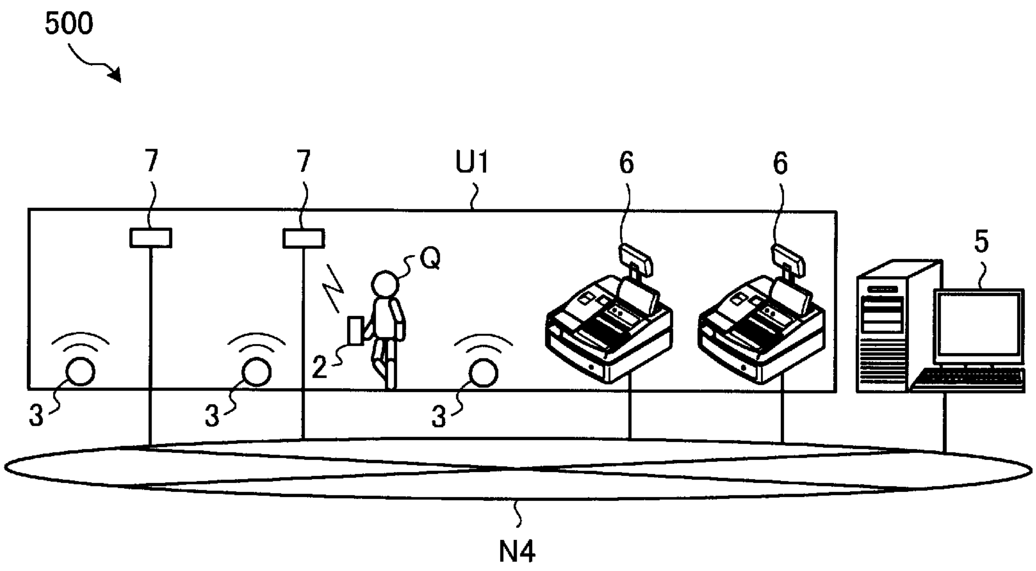
FIG. 27 is a diagram illustrating one example of a network configuration of a guidance system according to a third embodiment.

FIG. 27 is a diagram illustrating one example of a network configuration of a guidance system 500 according to the third embodiment. The guidance system 500 illustrated in FIG. 27 has a server apparatus 5, a POS terminal 6, a wireless communicating device 7, the mobile terminal 2, and the beacon device 3. The server apparatus 5, the POS terminal 6, and the wireless communicating device 7 are disposed in a local area network (LAN) N4 that is installed in one commercial facility U1. The POS terminal 6 is a point of sales (POS) terminal included in each store of the commercial facility U1. The POS terminal 6 includes a merchandise information table of the store. The wireless communicating device 7 is a wireless relay device that is disposed at each place in the commercial facility U1 for allowing the mobile terminal 2 to access the server apparatus 5. The mobile terminal 2 illustrated in the present embodiment is assumed to be, as one example, a wireless relay device that can perform wireless communication by Wi-Fi.

In the network configuration, the mobile terminal 2 in each transmission area of the beacon device 3 receives the beacon signal that is emitted by the beacon device 3. In addition, the mobile terminal 2 wirelessly and communicably connects to the wireless communicating device 7 by Wi-Fi and accesses the server apparatus 5 through the wireless communicating device 7.

In the guidance system 500, the server apparatus 5, the POS terminal 6, and the mobile terminal 2 operate as follows.

The server apparatus 5, in the same manner as the server apparatus 1 illustrated in the first embodiment, provides the store search service to the service user Q by access from the mobile terminal 2. However, the server apparatus 5, in the case of narrowing stores with search information such as a keyword, transmits the search information to each POS terminal 6 and causes each POS terminal 6 to perform merchandise inquiry in the merchandise information table included in each POS terminal 6. Therefore, in the present embodiment, the merchandise information table T5 (refer to FIG. 9) illustrated in the first embodiment is replaced by the merchandise information table included in each POS terminal 6.

If there is an inquiry request from the server apparatus 5, each POS terminal 6 performs an inquiry in the merchandise information table included therein and notifies an inquiry result to the server apparatus 5.

The mobile terminal 2 is approximately the same as the mobile terminal 2 illustrated in the first embodiment except for transmitting the position information of the beacon signal received from the beacon device 3 to the server apparatus 5 through the wireless communicating device 7 and not through the wireless base station 4 such as a mobile phone base station or a Wi-Fi spot.

Specific Examples of Each Device

Configurations of each of the server apparatus 5 and the POS terminal 6 according to the third embodiment will be described. The mobile terminal 2 has the same configuration as the mobile terminal 2 illustrated in the first embodiment (refer to FIG. 3 and FIG. 10) and thus will not be described. In addition, the wireless communicating device 7 is a relay device that relays transferred data between the mobile terminal 2 and the server apparatus 5. The wireless communicating device 7 performs wireless communication with the mobile terminal 2 side and performs Ethernet communication with the server apparatus 5 side by the LAN N4. The configuration of the wireless communicating device 7 is well known and thus will not be described in detail.

First, a functional configuration of the server apparatus 5 will be described. A hardware configuration of the server apparatus 5 is approximately the same as the server apparatus 1 illustrated in the first embodiment except for storing, in the HDD, programs corresponding to the functional units according to the third embodiment and removing the merchandise information table from the database of the HDD. Thus, refer to the hardware configuration diagram (FIG. 2) for the hardware configuration of the server apparatus 5.

Figure 28:
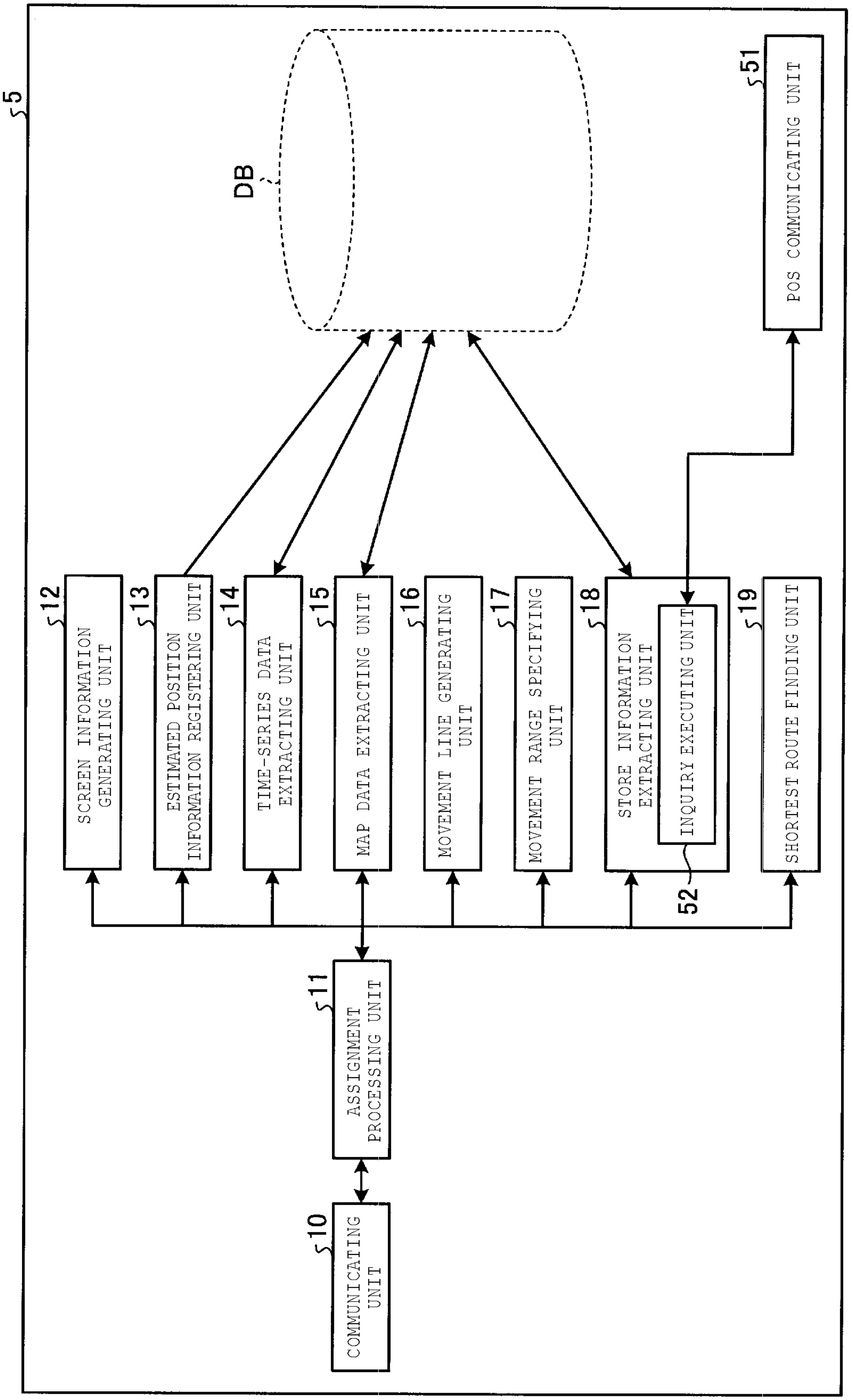
FIG. 28 is a block diagram illustrating one example of functions related to store search service of a server apparatus.

FIG. 28 is a block diagram illustrating one example of functions related to the store search service of the server apparatus 5 according to the third embodiment. FIG. 28 is acquired by replacing a part of the function of the store information extracting unit 18 as an inquiry executing unit 52 and adding a POS communicating unit 51 in the functional blocks of the server apparatus 1 illustrated in the first embodiment (refer to FIG. 4). The server apparatus 5 implements each functional unit illustrated in FIG. 28 by the CPU 101 in the hardware configuration illustrated in FIG. 2 reading the corresponding programs in the ROM 102 or in the HDD 104 into the RAM 103 in order and executing the corresponding programs.

The store information extracting unit 18, by request from the assignment processing unit 11, extracts the store information (e.g., a store ID, store position information, store introduction information, an IP address as one example of a network address of the POS terminal 6, or the like) of a relevant store from the store information table T4 with the range specification information specified by the movement range specifying unit 17 as a condition. Furthermore, the store information extracting unit 18, in the case of receiving search information such as a keyword in the request from the assignment processing unit 11, executes an inquiry process of the inquiry executing unit 52 after the extraction process for the store information.

The inquiry executing unit 52 stores the search information such as a keyword received by the store information extracting unit 18 in a data portion of an inquiry request signal. The inquiry executing unit 52 instructs the POS communicating unit 51 to transmit the inquiry request signal to the IP address of each POS terminal 6 of the stores in a predetermined area for which the store information is extracted by the extraction process. In addition, the inquiry executing unit 52 receives, from the POS communicating unit 51, inquiry result information transmitted in response by the POS terminal 6 and passes the received inquiry result information to the store information extracting unit 18. Accordingly, the store information extracting unit 18 confirms the store of the POS terminal 6 having relevant merchandise from the inquiry result information of each POS terminal 6.

The POS communicating unit 51 transmits the inquiry request signal to the specified POS terminal 6 through the NIC 106 and reads, from the NIC 106, the inquiry result information transmitted in response from the POS terminal 6.

While, as one example, the inquiry executing unit 52 is described as specifying transmission of the inquiry request signal to the POS terminal 6 of the store in the predetermined area for which the store information is extracted by the extraction process, the present embodiment is not limited thereto. The inquiry executing unit 52 may specify transmission of the inquiry request signal to all POS terminals 6 in the LAN N4. In this case, the store information extracting unit 18 compares the store of the POS terminal 6 having relevant merchandise in the inquiry result information of each POS terminal 6 with the store relevant to the store information extracted by the extraction process and narrows stores down to the matching store.

Figure 29:
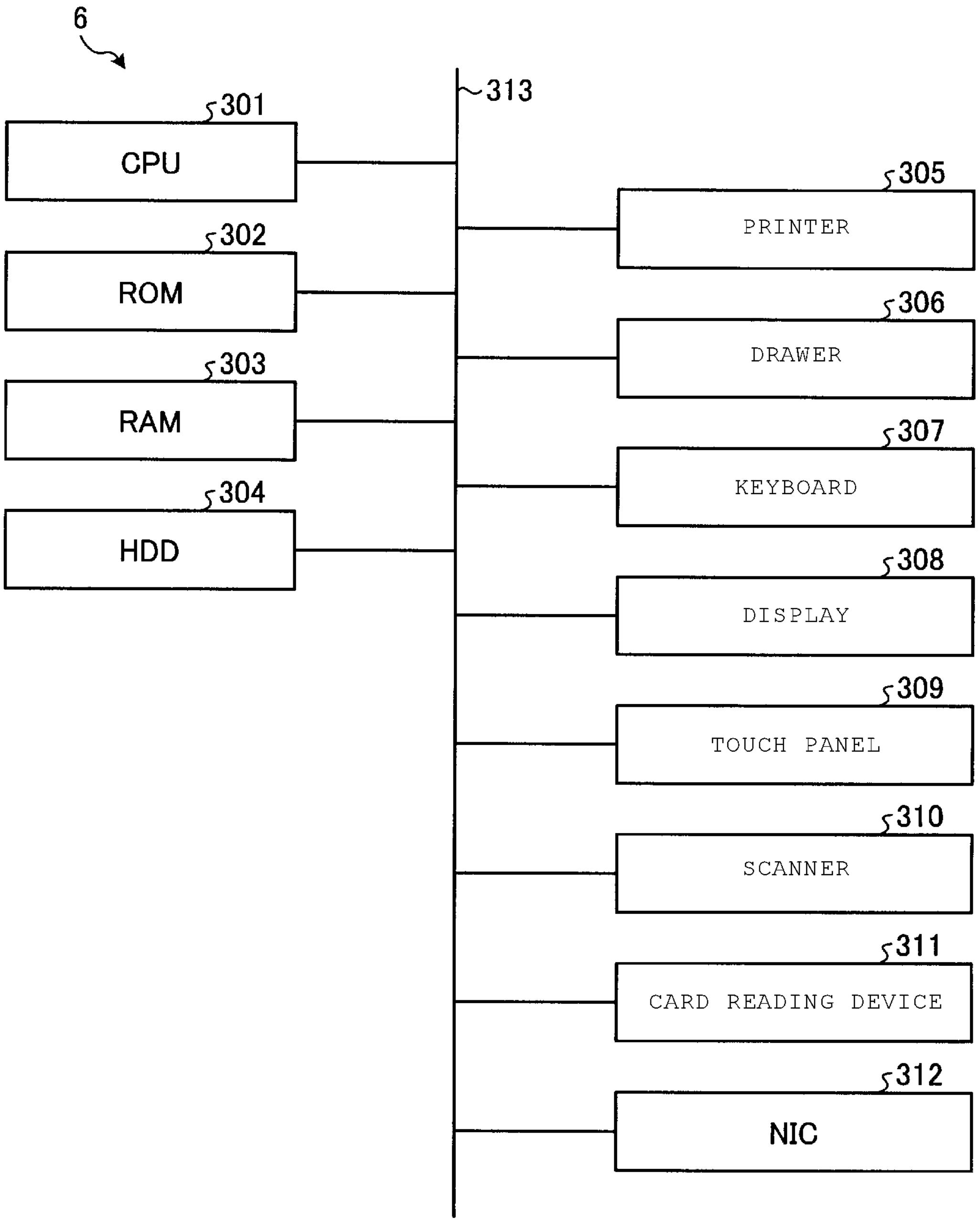
FIG. 29 is a diagram illustrating one example of a hardware configuration of a POS terminal.

Next, a configuration of the POS terminal 6 will be described. FIG. 29 is a diagram illustrating one example of a hardware configuration of the POS terminal 6. As illustrated in FIG. 29, the POS terminal 6 has a CPU 301, a ROM 302, a RAM 303, an HDD 304, a printer 305, a drawer 306, a keyboard 307, a display 308, a touch panel 309, a scanner 310, a card reading device 311, an NIC 312, and the like.

Each unit is mutually connected by a bus 313. Each unit operates by receiving supply of power from a power supply unit (not illustrated) such as a battery or an AC power supply.

The CPU 301 executes operation processes and control processes for each unit. The ROM 302 stores a fixed program such as a BIOS. The RAM 303 is used as a work area when the CPU 301 executes a program.

The HDD 304 stores various programs and various types of data. Various programs include an operating system (OS) that performs basic operations, a driver that drives each unit, client software, database software, an application program, and the like. In addition, various types of data include screen information, a data file of the merchandise information table (refer to FIG. 9) of the store, a data file of a registration/sales table, and the like.

The printer 305 prints print data on a receipt sheet.

The drawer 306 controls release of a drawer.

The keyboard 307 converts an input signal of a push key into a predetermined code and notifies the code to the CPU 301.

The display 308 displays a predetermined screen.

The touch panel 309 detects a touch input and notifies the touch input to the CPU 301.

The scanner 310 reads a code symbol and notifies information of the code symbol to the CPU 301.

The card reading device 311 reads card information from a credit card or the like.

The NIC 312 is a controller that performs communication by Ethernet. The NIC 312 performs data communication with the server apparatus 5, a store computer, a server of a card company, and the like.

Next, a functional configuration of the POS terminal 6 will be described. The POS terminal 6 implements functions related to merchandise registration, accounting, merchandise inquiry, and the like by the CPU 301 reading various programs of the ROM 302 or the HDD 304 into the RAM 303 in order and executing the programs.

Figure 30:
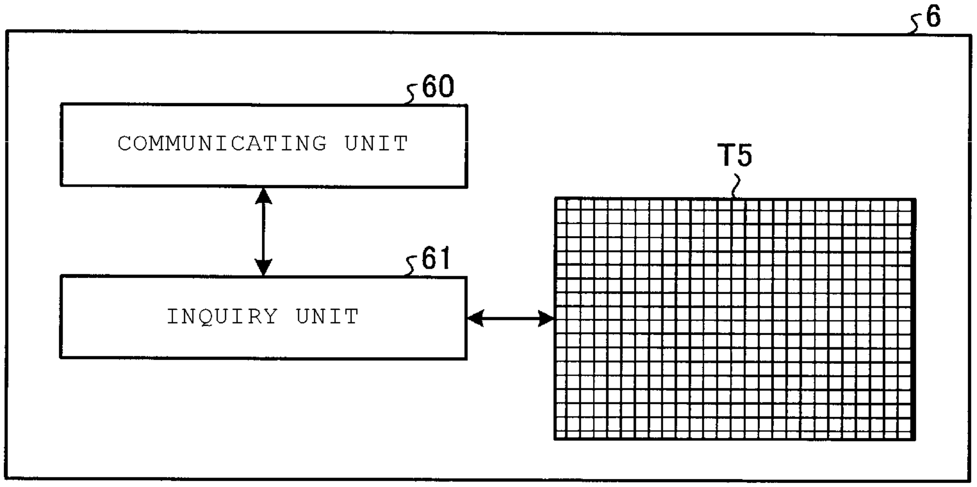
FIG. 30 is a block diagram illustrating one example of functions related to merchandise inquiry.

FIG. 30 is a block diagram illustrating one example of functions related to merchandise inquiry. As illustrated in FIG. 30, the POS terminal 6 implements functions of a communicating unit 60, an inquiry unit 61, and the like.

The communicating unit 60 establishes communication with the server apparatus 5 through the NIC 312 and reads received data from the NIC 312 and sends transmitted data such as the inquiry result information to the NIC 312.

The inquiry unit 61 uses search information included in the received data read by the communicating unit 60 to perform an inquiry as to whether or not merchandise relevant to the search information is included in the merchandise information table T5 (refer to FIG. 9) of the HDD 304.

For example, assume that the search information includes “hat by brand L” that represents a merchandise name. In this case, the inquiry unit 61 performs an inquiry as to whether or not there is a record relevant to “hat by brand L” in the merchandise name 903 of the merchandise information table T5. In the present example, “hat by brand L” is set in the merchandise name 903, and an inquiry result of a match can be acquired. While an inquiry result of a non-match is acquired if “hat by brand L” is not set in the merchandise name 903, changes may be made to divide “hat by brand L” into “brand L” and “hat” so that an inquiry result of a match is acquired in the case of existence of records including each keyword.

The inquiry unit 61 stores the inquiry result information in response data and instructs the communicating unit 60 to transmit the response data to the server apparatus 5.

The inquiry result information may include detailed information of hit merchandise.

Data Configuration

Figure 31A:
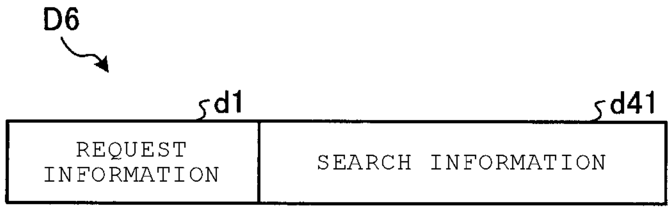
FIGS. 31A and 31B are diagrams illustrating one example of storage area configurations of data storage portions of transmitted data of the server apparatus and response data of the POS terminal.
Figure 31B:
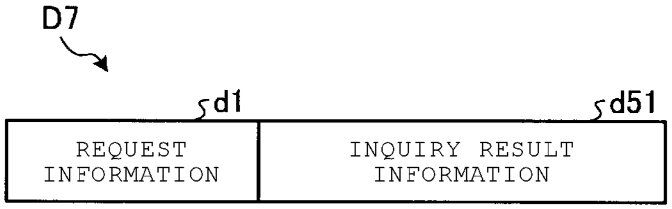

FIGS. 31A and 31B are diagrams illustrating one example of storage area configurations of data storage portions of the transmitted data of the server apparatus 5 and the response data of the POS terminal 6.

FIG. 31A is a diagram illustrating one example of a storage area configuration of a data portion of the transmitted data that the inquiry executing unit 52 of the server apparatus 5 instructs the POS communicating unit 51 to transmit to the POS terminal 6. As illustrated in FIG. 31A, a data portion D6 has storage areas of the request information d1, search information d41, and the like.

FIG. 31B is a diagram illustrating one example of a storage area configuration of a data portion of the response data that the inquiry unit 61 of the POS terminal 6 instructs the communicating unit 60 to transmit in response to the server apparatus 5. As illustrated in FIG. 31B, a data portion D7 has storage areas of the request information d1, inquiry result information d51, and the like.

Sequence of Store Searching

Figure 32:
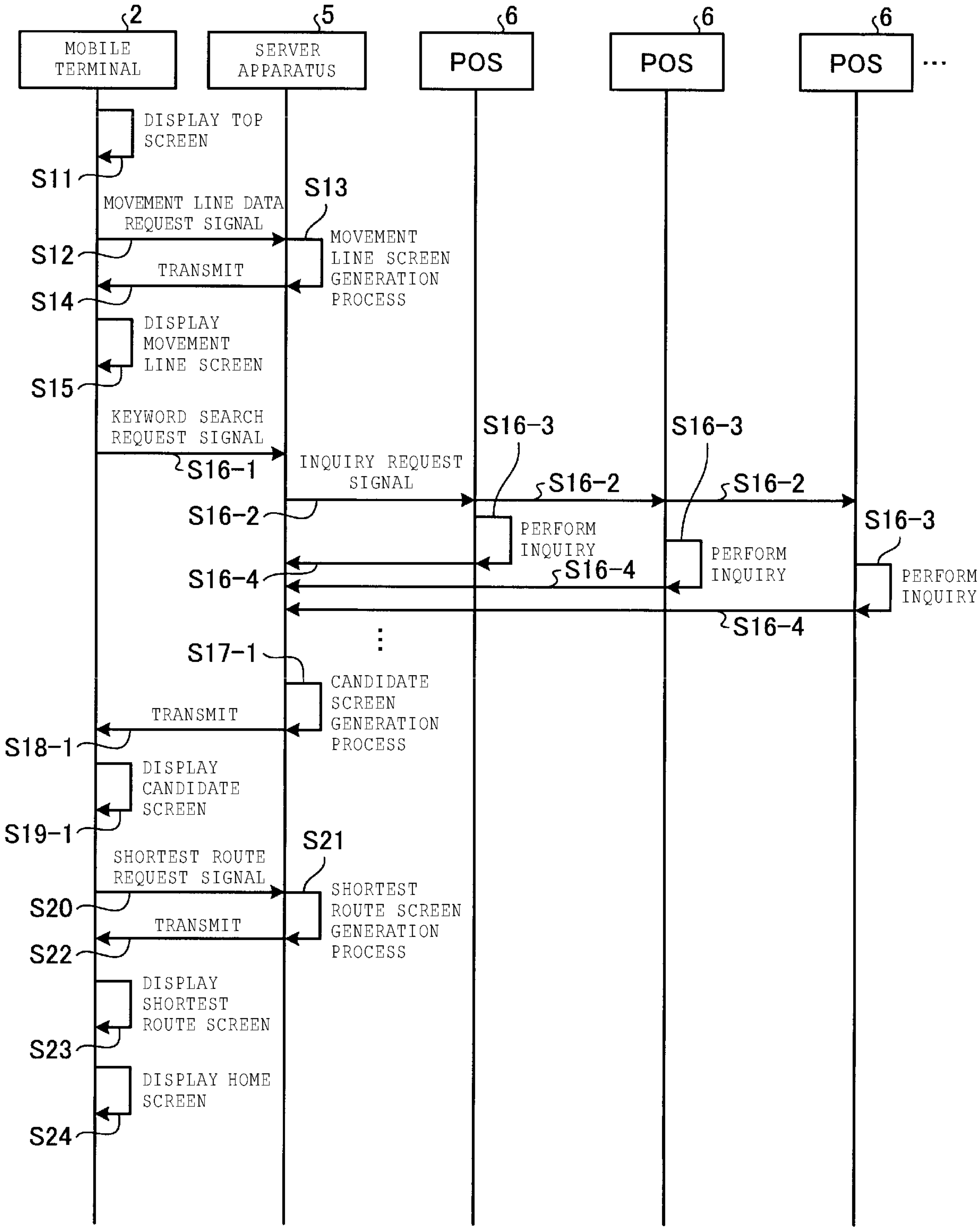
FIG. 32 is a sequence diagram illustrating communication between each device of the guidance system in the case of a mobile terminal searching for a store by keyword.

FIG. 32 is a sequence diagram illustrating communication between each device of the guidance system 500 in the case of the mobile terminal 2 searching for a store by keyword. Hereinafter, different parts from the sequence diagram of the guidance system 100 according to the first embodiment (refer to FIG. 17) will be mainly described.

The server apparatus 5, if receiving a keyword search request signal from the mobile terminal 2, stores the keyword in an inquiry request signal and transmits the inquiry request signal to the POS terminal 6 in the predetermined area (S16-2).

Each POS terminal 6, if receiving the inquiry request signal, performs an inquiry in the merchandise information table thereof with the received keyword (S16-3). The POS terminal 6 notifies the inquiry result to the server apparatus 5 (S16-4).

The server apparatus 5, based on the inquiry result from the POS terminal 6, generates screen information of a candidate store of the stores on the line of movement (S17-1) and transmits the screen information to the mobile terminal 2 of the requester (S18-1).

Process Flow of Server Apparatus 5 in Sequence of Store Searching

Next, a process flow of a service process in the case of the server apparatus 5 according to the third embodiment receiving a keyword search request signal will be described.

Figure 33:
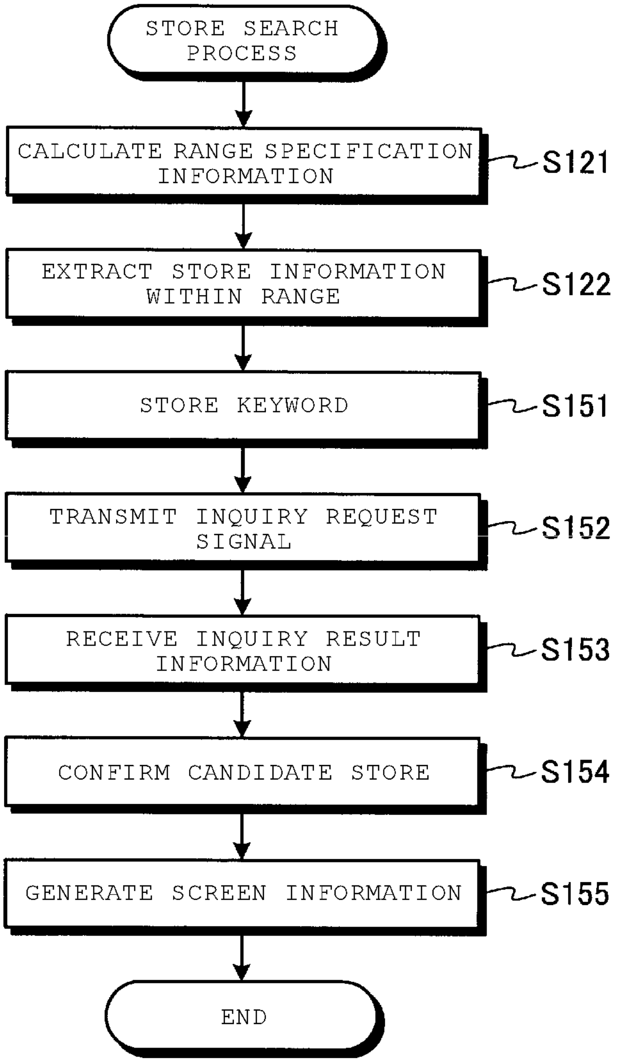
FIG. 33 is a flowchart of a service process in the case of the server apparatus receiving a keyword search request signal.

FIG. 33 is a flowchart of a service process in the case of the server apparatus 5 receiving a keyword search request signal. First, the CPU 101 (in particular, the movement range specifying unit 17), based on each estimated position information of the time-series data extracted by the time-series data extracting unit 14, calculates the range specification information that sets an area along the path connecting each estimated position as a movement range (S121).

Next, the CPU 101 (in particular, the store information extracting unit 18) extracts all relevant stores with the range specification information calculated by the movement range specifying unit 17 as a search condition (S122).

Next, the CPU 101 (in particular, the inquiry executing unit 52) stores, in a data portion of an inquiry request signal, search information such as a keyword received from the store information extracting unit 18 and instructs the POS communicating unit 51 to transmit the inquiry request signal to each POS terminal 6 of the stores in the predetermined area extracted in Step S122 (S151).

Next, the CPU 101 (in particular, the POS communicating unit 51) generates and transmits an inquiry request signal to the IP addresses of all POS terminals 6 specified by the inquiry executing unit 52 (S152).

Next, the CPU 101 (in particular, the POS communicating unit 51) receives inquiry result information from the transmission destination of the inquiry request signal (S153).

Next, the CPU 101 (in particular, the inquiry executing unit 52) receives the inquiry result information from the POS communicating unit 51 and passes the received inquiry result information to the store information extracting unit 18.

Next, the CPU 101 (in particular, the store information extracting unit 18) confirms the store of the POS terminal 6 having relevant merchandise as a candidate store from the inquiry result information of each POS terminal 6 (S154).

Next, the CPU 101 (in particular, the screen information generating unit 12) generates screen information of the search result screen illustrating the candidate stores confirmed by the store information extracting unit 18 or screen information of the store information screen illustrating detailed information of the candidate stores (S155).

The server apparatus 5 as the information processing apparatus according to the present embodiment, mainly by the POS communicating unit 51 and the like, functions as a transmitting section that transmits inquiry data as to search information to a device in a public place, and as a receiving section that receives inquiry result data transmitted in response from the device. In addition, by the inquiry executing unit 52 and the like, the server apparatus 5 functions as an inquiry processing section that specifies a device for which the search information generates a hit.

The configuration described heretofore also enables the service user to specify a desired store based on the latest merchandise information or the like currently handled by the store. While the merchandise information table is disposed in the HDD of the POS terminal in the present embodiment, the merchandise information table may be disposed in a server that is disposed in the store, such as a store server. Furthermore, the merchandise information table may be disposed in a server on a cloud. In this case, the merchandise information table may be disposed along with the position information of a store.

Fourth Embodiment

An embodiment in the case of the movement line data of the service user accumulated in a server apparatus in one area being used in a server apparatus in another area will be illustrated in a fourth embodiment. Hereinafter, with the commercial facility U1 illustrated in the third embodiment as the one area, the case of the movement line data accumulated in the server apparatus 5 being used in another commercial facility will be illustratively described.

Figure 34:
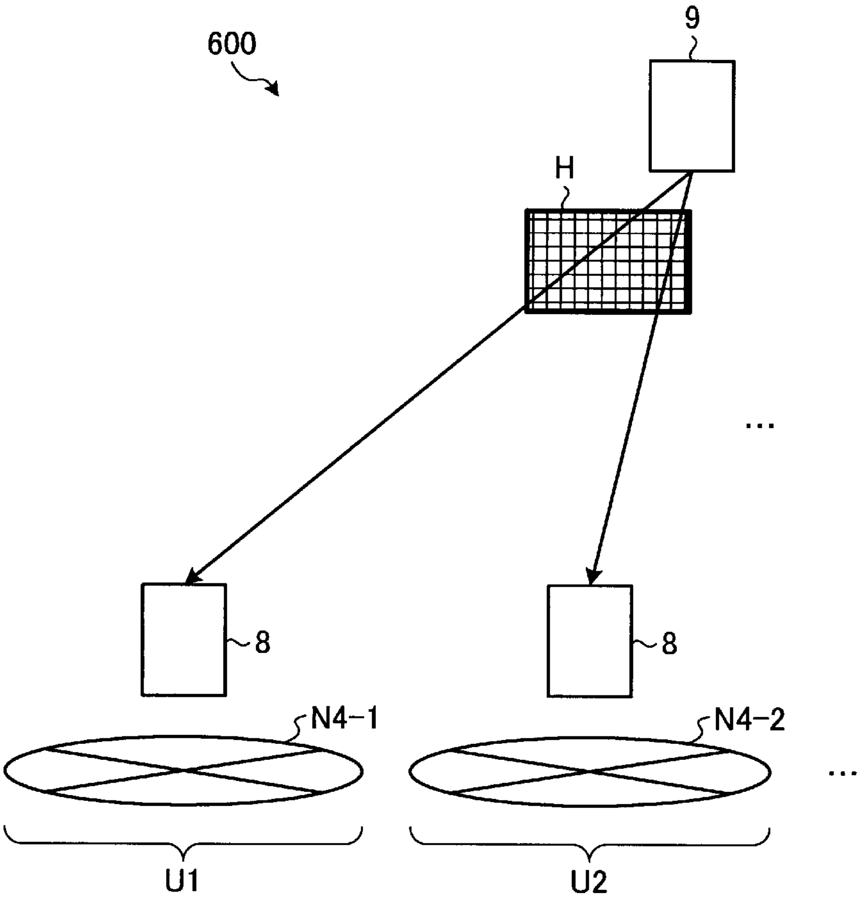
FIG. 34 is a conceptual diagram illustrating a configuration of a server apparatus of a guidance system according to a fourth embodiment.

FIG. 34 is a conceptual diagram illustrating a configuration of a server apparatus of a guidance system 600 according to the fourth embodiment. As illustrated in FIG. 34, the guidance system 600 has an area server apparatus 8 and a higher apparatus 9 as the server apparatus. The area server apparatus 8 is a server apparatus that manages each area disposed in the commercial facility U1, a commercial facility U2, . . . , and corresponds to the server apparatus 5 illustrated in the third embodiment. In addition, the higher apparatus 9 is a server apparatus that manages each area server apparatus 8, and is disposed in a LAN or the like of a headquarter so as to be able to connect to LANs N4-1, N4-2, . . . of each area. The LAN of the headquarter and the LANs N4-1, N4-2, . . . of each area are connected by a wide area network (WAN) or the like.

In the configuration illustrated in FIG. 34, the higher apparatus 9, by upload from the area server apparatus 8 or the like of each of the areas N4-1, N4-2, . . . , manages tables of all areas, for example, the movement line data management table T1, the position information conversion table T2, the map information table T3, the store information table T4, and the merchandise information table T5.

If there is an update of data in the position information conversion table T2, the map information table T3, the store information table T4, the merchandise information table T5, and the like, each area server apparatus 8 notifies difference data to the higher apparatus 9 at night or the like. In addition, each area server apparatus 8 notifies the time-series data of the movement line data management table T1 to the higher apparatus 9 at a predetermined timing. For example, each area server apparatus 8 notifies the time-series data to the higher apparatus 9 at the timing of termination of the notification function of the mobile terminal or in the case of absence of notification for position registration from the mobile terminal for a predetermined amount of time.

The higher apparatus 9 distributes notification information H of all area server apparatuses 8 to each area server apparatus 8 at the same time and causes each area server apparatus 8 to set various tables for all areas.

The area server apparatus 8 includes a higher apparatus transmitting section that transmits the time-series data stored in the movement line data management table T1 to the higher apparatus 9, a higher apparatus receiving section that receives the time-series data stored in the movement line data management table T1 of another area server apparatus 8 from the higher apparatus 9, and the like. The higher apparatus transmitting section and the higher apparatus receiving section include the communicating unit 10, the assignment processing unit 11, and the like.

The area server apparatus 8 registers the time-series data received by the higher apparatus receiving section in the movement line data management table T1. Specifically, the assignment processing unit 11 instructs the estimated position information registering unit 13 to register the time-series data.

Accordingly, the service user can execute store searching in another area by using the line of movement in a first area and confirm information of a store in the first area in another area.

Fifth Embodiment

An embodiment in the case of the store search service of the server apparatus 5 illustrated in the third embodiment being used by a multimedia terminal (e.g., kiosk terminal) disposed in a commercial facility will be illustrated in a fifth embodiment.

Figure 35:
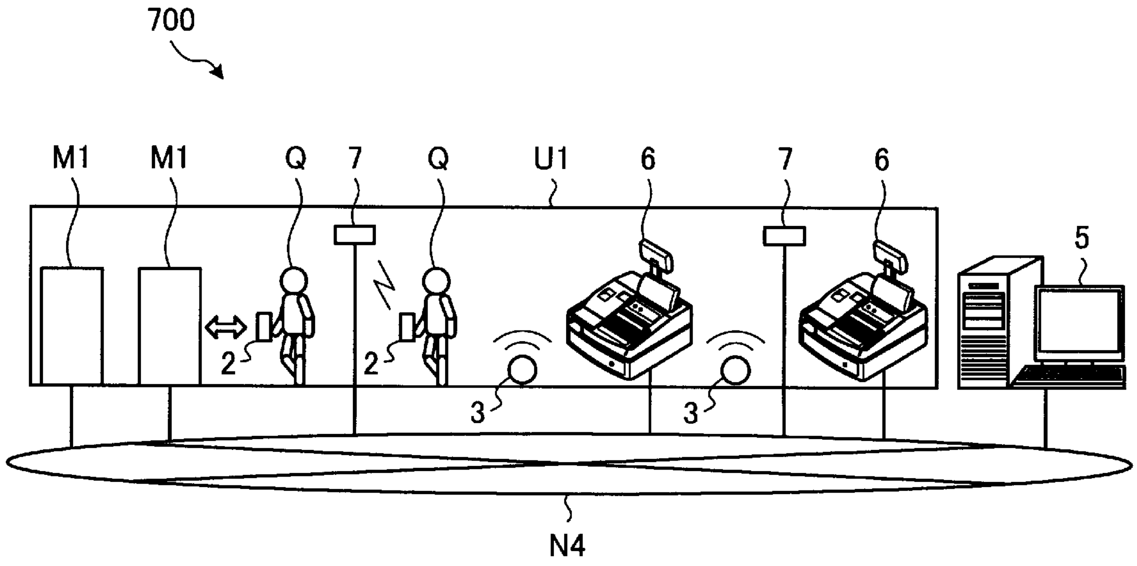
FIG. 35 is a diagram illustrating one example of a network configuration of a guidance system according to a fifth embodiment.

FIG. 35 is a diagram illustrating one example of a network configuration of a guidance system 700 according to the fifth embodiment. The guidance system 700 illustrated in FIG. 35 is acquired by disposing a multimedia terminal M1 in the guidance system 500 (refer to FIG. 27) illustrated in the third embodiment.

The multimedia terminal M1 is disposed in a predetermined area in the commercial facility U1 and is connected to the local area network (LAN) N4 by a LAN cable or the like. The multimedia terminal M1 provides various types of service such as sale of tickets and store searching to the service user Q of the commercial facility U1.

Hardware Configuration of Multimedia Terminal M1

Figure 36:
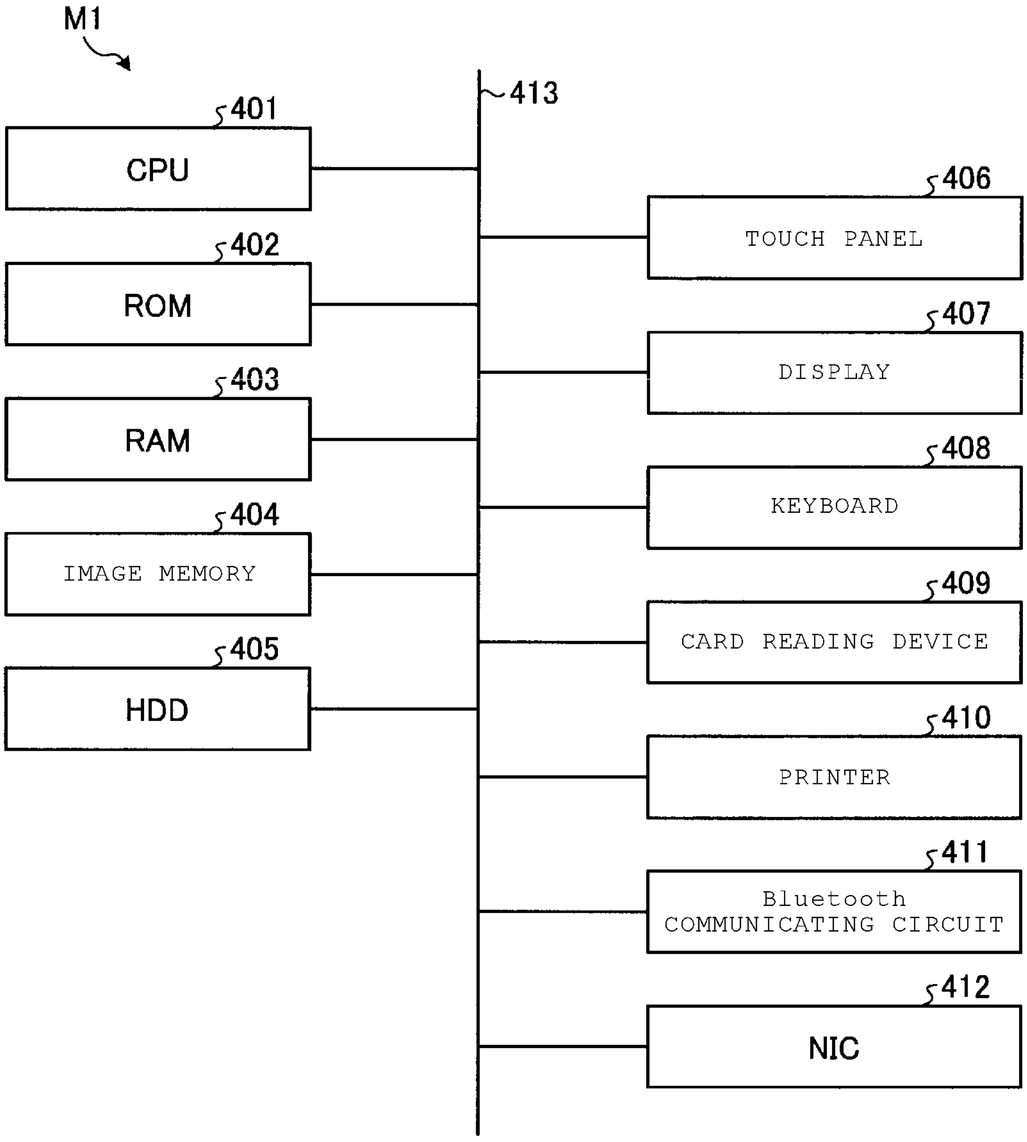
FIG. 36 is a diagram illustrating one example of a hardware configuration of a multimedia terminal.

FIG. 36 is a diagram illustrating one example of a hardware configuration of the multimedia terminal M1. As illustrated in FIG. 36, the multimedia terminal M1 has a CPU 401, a ROM 402, a RAM 403, an image memory 404, an HDD 405, a touch panel 406, a display 407, a keyboard 408, a card reading device 409, a printer 410, a Bluetooth communicating circuit 411, an NIC 412, and the like. Each unit is mutually connected by a bus 413. Each unit operates by receiving supply of power from a power supply unit (not illustrated) such as a battery or an AC power supply.

The CPU 401 executes operation processes and control processes for each unit. The ROM 402 stores a fixed program such as a BIOS. The RAM 403 is used as a work area when the CPU 401 executes a program. The image memory 404 is an image memory for printing.

The HDD 405 stores various programs and various types of data. Various programs include an operating system (OS) that performs basic operations, a driver that drives each unit, client software, and an application that is related to store searching, sale of tickets, and the like. In addition, various types of data include screen information and the like.

The touch panel 406 detects a touch input on a touch panel and notifies a detected signal to the CPU 401.

The display 407 displays a predetermined screen output by the CPU 401 on a display of a liquid crystal or the like.

The keyboard 408 converts an input signal of a push key on a keyboard into a predetermined code and notifies the code to the CPU 401.

The card reading device 409 drives a card reading device to read card information from a credit card or the like.

The printer 410 controls a printer to print an image of the image memory 404 on a printing sheet.

The Bluetooth communicating circuit 411 performs communication by the Bluetooth communication protocol.

The NIC 412 is a controller that performs communication by Ethernet. The NIC 412 performs data communication with the server apparatus 5, a server apparatus of a card company (not illustrated), and the like.

Functional Configuration of Multimedia Terminal M1

Next, a functional configuration of the multimedia terminal M1 will be described. The multimedia terminal M1 implements multimedia functions such as store searching and sale of tickets by the CPU 401 reading various programs of the ROM 402 or the HDD 405 into the RAM 403 in order and executing the programs.

Figure 37:
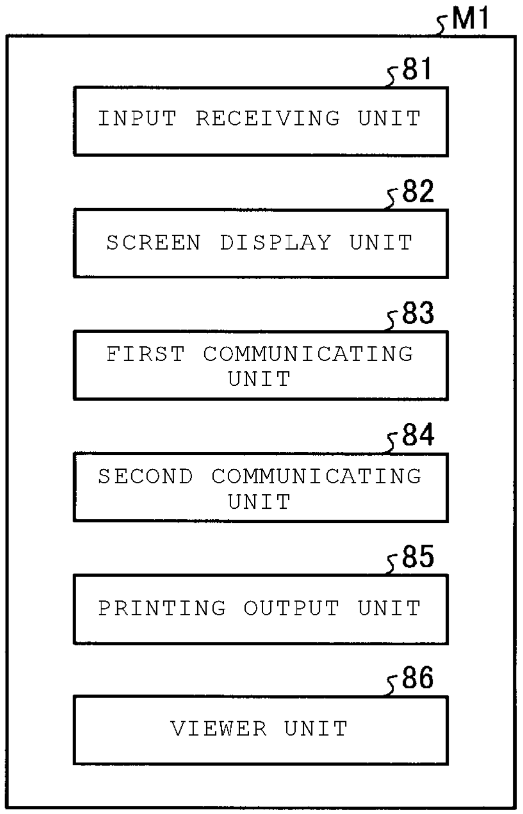
FIG. 37 is a block diagram illustrating one example of functions related to store searching of the multimedia terminal.

FIG. 37 is a block diagram illustrating one example of functions related to store searching of the multimedia functions. As illustrated in FIG. 37, the multimedia terminal M1 implements functions of an input receiving unit 81, a screen display unit 82, a first communicating unit 83, a second communicating unit 84, a printing output unit 85, a viewer unit 86, and the like.

The input receiving unit 81 receives input information by a key input or a touch input from the keyboard 408 or the touch panel 406.

The screen display unit 82 outputs screen data to the display 407.

The first communicating unit 83 establishes communication with the server apparatus 5 and transmits and receives instructions and data with the server apparatus 5 through the NIC 412.

The second communicating unit 84 establishes communication with the mobile terminal 2 through the Bluetooth communicating circuit 411 and reads terminal-specific identification information of the mobile terminal 2.

The printing output unit 85 loads display screen information of the display 407 into the image memory 404 and drives the printer 410 to print the display screen information on a printing sheet.

The viewer unit 86 acquires screen information related to the store search service and outputs the screen information to the screen display unit 82. For example, the viewer unit 86 outputs, to the screen display unit 82, a screen corresponding to a received content of the input receiving unit 81. In addition, the viewer unit 86, in accordance with the received content of the input receiving unit 81, acquires screen information from the server apparatus 5 through the first communicating unit 83 and outputs the screen.

In this configuration, the multimedia terminal M1 displays, on the display 407, a top screen dedicated to the multimedia terminal M1 that includes an operation button initiating the store search service. In the case of a touch input being provided on the operation button, a switch is made to the top screen for the store search service. The multimedia terminal M1, by receiving various inputs on the top screen for the store search service, uses the store search service of the server apparatus 5 instead of the mobile terminal 2.

Process Flow of Multimedia Terminal M1

Figure 38:
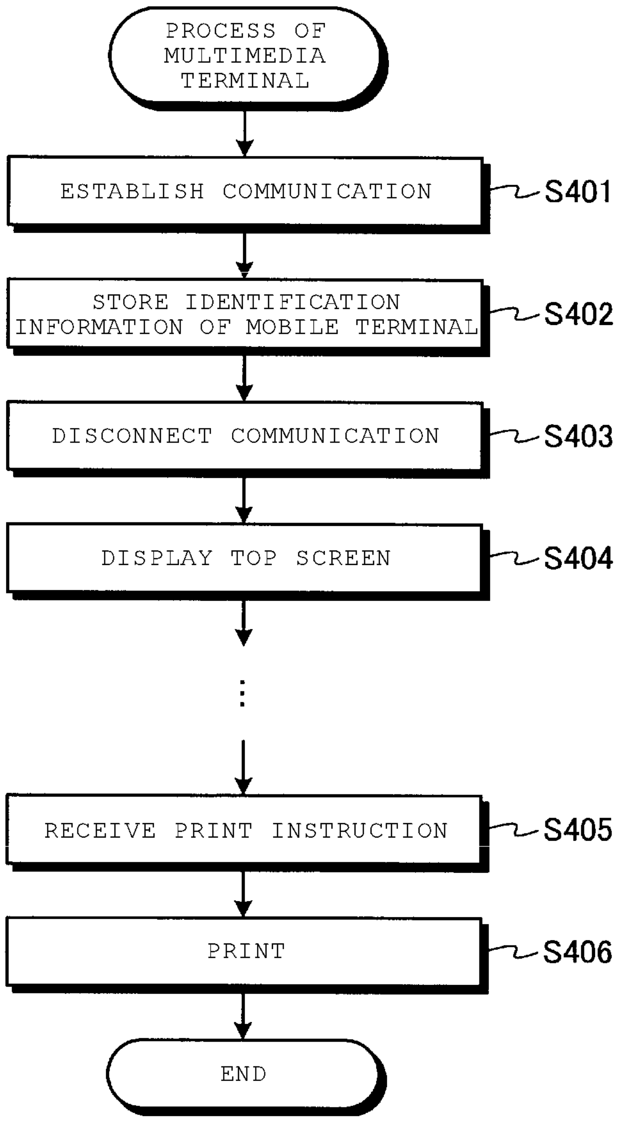
FIG. 38 is a diagram illustrating one example of a process flow of the multimedia terminal.

FIG. 38 is a diagram illustrating one example of a process flow of the CPU 401 of the multimedia terminal M1. First, if a touch input is provided on the operation button that initiates the store search service, the CPU 401 displays, on the display 407, message information that prompts bringing the mobile terminal 2 close to a predetermined read position, and establishes communication with the mobile terminal 2 through the Bluetooth communicating circuit 411 (S401).

Next, the CPU 401 reads the terminal-specific identification information transmitted by the mobile terminal 2 and temporarily stores the identification information in a predetermined storage region in the RAM 403 (S402).

Next, the CPU 401 disconnects communication with the mobile terminal 2 (S403).

Next, the CPU 401 displays the top screen for the store search service on the display 407 and receives an operational input (S404).

A screen flow of the multimedia terminal M1 or a communication flow between each device after reception of an operational input on the top screen is approximately the same as that illustrated in the third embodiment. That is, the screen flow is illustrated in FIG. 22 to FIG. 25, and the communication flow is acquired by replacing the mobile terminal 2 in FIG. 32 with the multimedia terminal M1.

Main differences are the server apparatus 5 side process of Step S21 illustrated in the communication flow in FIG. 32 and processes in the multimedia terminal M1 after Step S23.

In the shortest route screen generation process of Step S21, the server apparatus 5 finds the shortest route from the position information of the multimedia terminal M1 as a starting point to the position indicated by the store position information. Specifically, the server apparatus 5 previously manages the position information of the multimedia terminal M1 in correlation with an IP address, a MAC address, or the like of the multimedia terminal M1 in a management table or the like. Accordingly, the assignment processing unit 11, if receiving a request from the multimedia terminal M1, acquires position information from the management table based on the IP address, the MAC address, or the like indicating the requester and passes the position information as a current place to the shortest route finding unit 19. The shortest route finding unit 19 finds the shortest route from the position information as a starting point to the position indicated by the store position information.

Process Flow of Multimedia Terminal M1 Continued

Processes of the CPU 401 of the multimedia terminal M1 after Step S23 are as follows.

As illustrated in FIG. 38, first, the CPU 401 receives an operational input on a print button (S405).

Next, the CPU 401, based on the operational input on the print button, loads the display screen information of the display 407 into the image memory 404 and drives the printer 410 to print the display screen information on a printing sheet (S406). Accordingly, the printing sheet having the shortest route screen is discharged from a discharge port.

Then, the CPU 401, based on an operational input on a terminate button, releases the storage region of the terminal-specific identification information to display the top screen dedicated to the multimedia terminal M1.

Display Screen of Multimedia Terminal M1

Figure 39A:
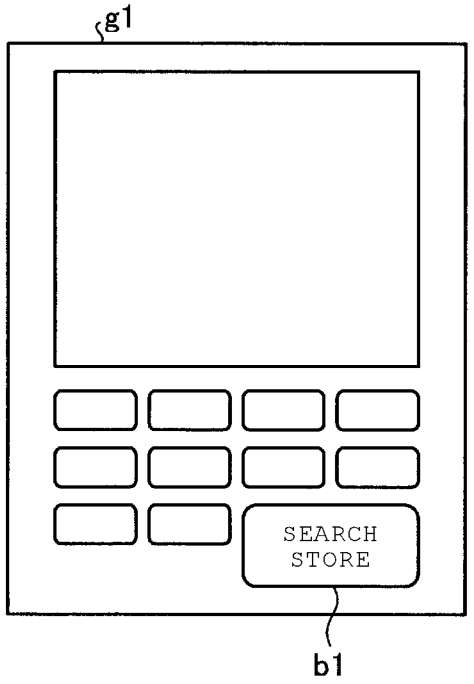
FIGS. 39A to 39D are diagrams illustrating one example of display screens of the multimedia terminal.
Figure 39B:
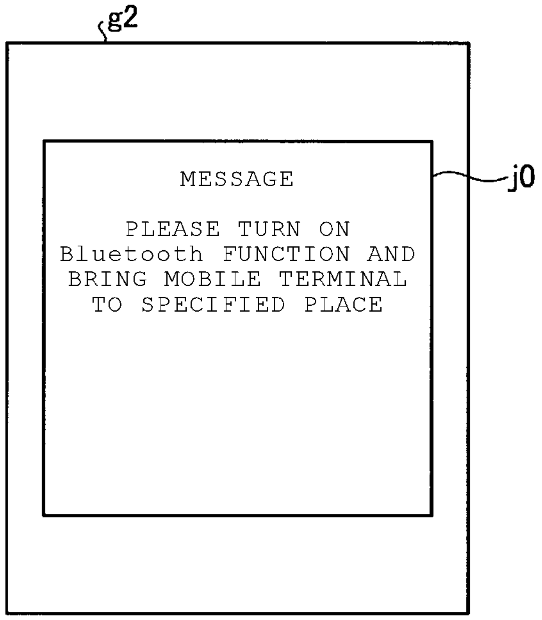
Figure 39C:
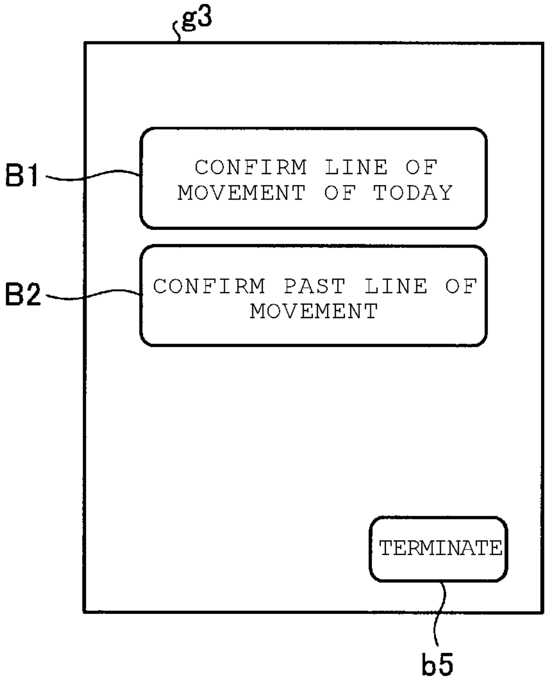
Figure 39D:
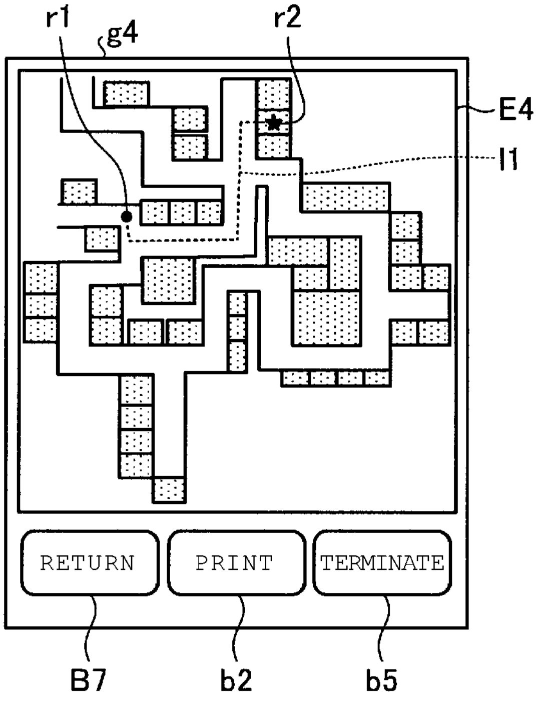

FIGS. 39A to 39D are diagrams illustrating one example of display screens of the multimedia terminal M1. FIG. 39A is the top screen dedicated to the multimedia terminal M1. FIG. 39B is the communication message screen. FIG. 39C is the top screen for the store search service. FIG. 39D is the shortest route screen. Other screens are not illustrated.

A top screen g1 dedicated to the multimedia terminal M1 illustrated in FIG. 39A includes a "store search" button b1. The "store search" button b1 is an operation button for instructing the viewer unit 86 to initiate the store search service. If a touch input is provided on the "store search" button b1, the viewer unit 86 displays the communication message screen.

A communication message screen g2 illustrated in FIG. 39B includes message information j0 that prompts bringing the mobile terminal 2 close to a predetermined reading position. The CPU 401, if reading the terminal-specific identification information of the mobile terminal 2, displays the top screen for the store search service.

A top screen g3 for the store search service illustrated in FIG. 39C is a screen of the multimedia terminal M1 that corresponds to the top screen G1 of the mobile terminal 2 illustrated in FIG. 22. As one example, the top screen g3 has the "confirm line of movement of today" button B1, the "confirm past line of movement" button B2, the "terminate" button b5, and the like.

The "confirm line of movement of today" button B1 and the "confirm past line of movement" button B2 are the same as those illustrated in FIG. 22. The "terminate" button b5 is an operation button for instructing the viewer unit 86 to terminate the store search service. If a touch input is provided on the "terminate" button b5, the viewer unit 86 displays the top screen of the multimedia terminal M1. The "terminate" button b5 is also disposed in each screen described later.

A shortest route screen g4 illustrated in FIG. 39D is a screen of the multimedia terminal M1 that corresponds to the shortest route screen G6 of the mobile terminal 2 illustrated in FIG. 25. The shortest route screen g4 that is illustrated as one example is acquired by adding a "print" button b2 to the shortest route screen G6 in FIG. 25.

The "print" button b2 is an operation button for instructing the viewer unit 86 to print the display screen. If a touch input is provided on the "print" button b2, the printing output unit 85 is called by the viewer unit 86 to print the display screen information of the display 407 on a printing sheet.

The multimedia terminal M1 as the information processing apparatus according to the present embodiment, by the input receiving unit 81 that receives information related to service from the mobile terminal 2, the second communicating unit 84 that reads the terminal-specific identification information of the mobile terminal 2, and the like, functions as an input section that receives input of information related to service.

The multimedia terminal M1, by the printing output unit 85 and the like, functions as an output section that outputs the position information of a store or the like received.

By this configuration, the service user can use the store search service with the multimedia terminal M1 instead of the mobile terminal 2. In addition, since the position information of a store or the like, the shortest route to a store, and the like can be printed at the multimedia terminal M1, the service user can go toward a desired store while confirming the printed sheet.

Sixth Embodiment

An embodiment in the case of a multimedia terminal in a commercial facility providing the store search service as the server apparatus 5 illustrated in the third embodiment will be illustrated in a sixth embodiment.

Figure 40:
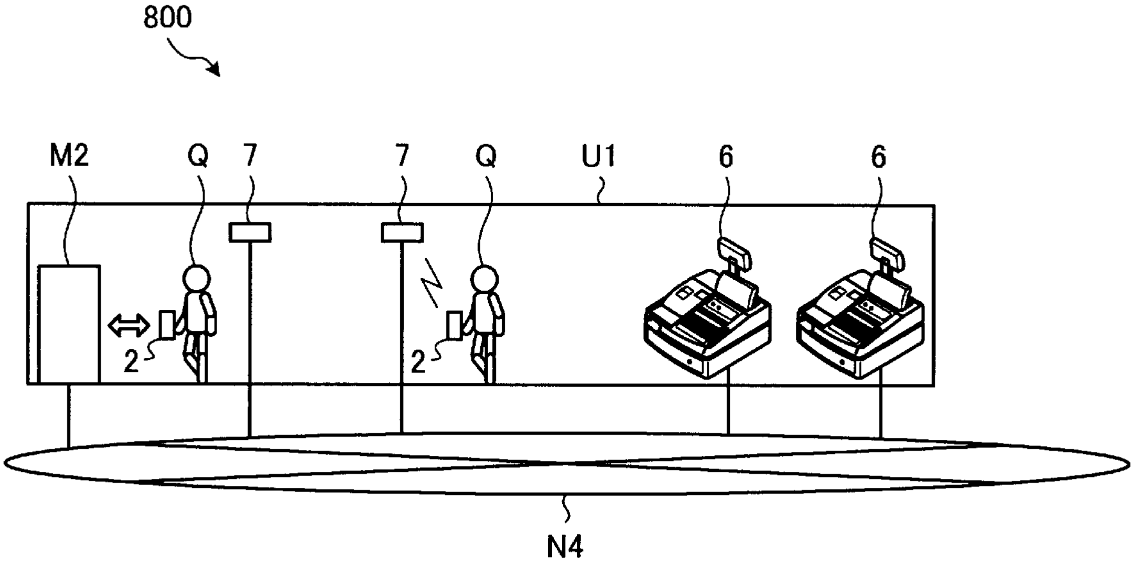
FIG. 40 is a diagram illustrating one example of a network configuration of a guidance system according to a sixth embodiment.

FIG. 40 is a diagram illustrating one example of a network configuration of a guidance system 800 according to the sixth embodiment. The guidance system 800 illustrated in FIG. 40 is acquired by replacing the server apparatus 5 with a multimedia terminal M2 and removing the beacon device 3 in the guidance system 500 (refer to FIG. 27) illustrated in the third embodiment.

The multimedia terminal M2 is disposed in a predetermined area in the commercial facility U1 and is connected to the local area network (LAN) N4 by a LAN cable or the like.

In this network configuration, the mobile terminal 2 transmits unique identification information to the wireless communicating device 7 by Wi-Fi or the like during movement. The wireless communicating device 7 transmits, to the multimedia terminal M2, data in which identification information thereof (corresponds to the beacon ID) is added to the identification information of the mobile terminal 2. The multimedia terminal M2, if receiving data from the wireless communicating device 7, registers the identification information of the wireless communicating device 7 stored in the received data as the time-series data in the movement line data management table T1 (refer to FIG. 5) that corresponds to the identification information of the mobile terminal 2 stored in the received data.

Subsequent operation of the multimedia terminal M2 by the service user is approximately the same as that of the multimedia terminal M1 illustrated in the fifth embodiment except that the store search service is processed in the multimedia terminal M2.

That is, the multimedia terminal M2 displays an operation screen related to the store search service on the screen thereof. The multimedia terminal M2, if receiving an input related to the store search service on the operation screen, receives the identification information of the mobile terminal 2 by Bluetooth communication or the like from the mobile terminal 2. Furthermore, the multimedia terminal M2, if receiving an input related to store searching on the operation screen, executes a process related to store search service therein and displays the execution result on the operation screen. Details of the process are repetition of the process previously described in the other embodiments and thus will not be further described here.

Seventh Embodiment

An embodiment in the case of the mobile terminal 2 illustrated in the sixth embodiment accumulating the time-series data and using the store search service provided by a multimedia terminal will be illustrated in a seventh embodiment.

Figure 41:
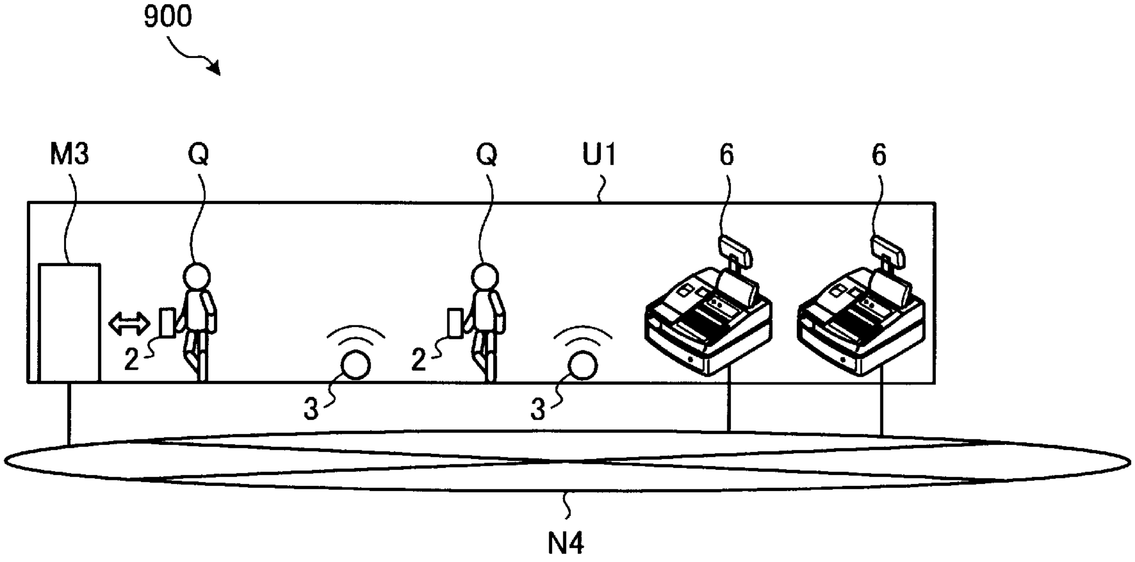
FIG. 41 is a diagram illustrating one example of a network configuration of a guidance system according to a seventh embodiment.

FIG. 41 is a diagram illustrating one example of a network configuration of a guidance system 900 according to the seventh embodiment. The guidance system 900 illustrated in FIG. 41 is acquired by, mainly, arranging the beacon device 3 and removing the wireless communicating device 7 in the guidance system 800 (refer to FIG. 40) illustrated in the sixth embodiment.

In the network configuration, the mobile terminal 2 in each transmission area of the beacon device 3 receives the beacon signal that is emitted by the beacon device 3. The mobile terminal 2 stores the beacon ID of the beacon signal in correlation with date and time information at the time of reception of the beacon signal. Each time the mobile terminal 2 receives the beacon signal emitted by the beacon device 3, the mobile terminal 2 correlates the beacon ID with date and time information at the time of reception of the beacon signal and manages the beacon ID as the time-series data therein.

A multimedia terminal M3 displays an operation screen related to the store search service on the screen thereof. The multimedia terminal M3, if receiving an input related to the store search service on the operation screen, receives the time-series data by Bluetooth communication or the like from the mobile terminal 2.

Furthermore, the multimedia terminal M3, if receiving an input related to store searching on the operation screen, executes a process related to the store search service therein based on the time-series data received from the mobile terminal 2 and displays the execution result on the operation screen. Subsequent operation of the multimedia terminal M3 by the service user is approximately the same as that of the multimedia terminal M2 illustrated in the sixth embodiment.

Eighth Embodiment

The mobile terminal 2 may be configured to have the functional units of the store service process of the server apparatus 1 illustrated in the first embodiment. In this case, the mobile terminal 2 receives the beacon signal emitted by the beacon device 3 in each transmission area of the beacon device 3. The mobile terminal 2 correlates the beacon ID of the beacon signal with date and time information at the time of reception of the beacon signal and stores the beacon ID in the flash ROM 203 (refer to FIG. 3) thereof. Each time the mobile terminal 2 receives the beacon signal emitted by the beacon device 3, the mobile terminal 2 correlates the beacon ID with date and time information at the time of reception of the beacon signal and manages the time-series data in the flash ROM 203.

The mobile terminal 2 displays, on the display 250 (refer to FIG. 3) thereof, an operation screen related to the store search service that is previously stored in the flash ROM 203. The mobile terminal 2, if receiving an input related to the store search service on the operation screen, executes a process related to the store search service based on the time-series data managed in the flash ROM 203 and displays the execution result on the display 250. Details of the process are repetition of the previously described process between the mobile terminal 2 and the server apparatus 1 in the first embodiment as the process of the mobile terminal 2 and thus will not be further described here.

Ninth Embodiment

An embodiment in the case of searching for a stop position of a car in a parking lot in a commercial facility or the like will be illustrated in a ninth embodiment. First, the store search application of the mobile terminal is launched in the stop position of the car. By this launching, the mobile terminal receives the beacon signal from a nearby beacon device and transmits the beacon ID and date and time information to the server apparatus 1. When the user of the mobile terminal finishes shopping and returns to the parking lot, the user pushes a stop position search button on the mobile terminal to transmit a request signal for the stop position to the server apparatus. The server apparatus, if receiving the request signal for the stop position from the mobile terminal, extracts the time-series data of the mobile terminal and determines the starting point of the time-series data to be the stop position. The server apparatus transmits position information, map information, and the like to the mobile terminal of the requester. A number or the like that indicates the stop position disposed in the parking lot is transmitted in the position information.

Tenth Embodiment

An embodiment of a lost article guidance system that provides guidance for information as to a lost article to a user of a commercial facility will be illustrated in the present embodiment.

Figure 42:
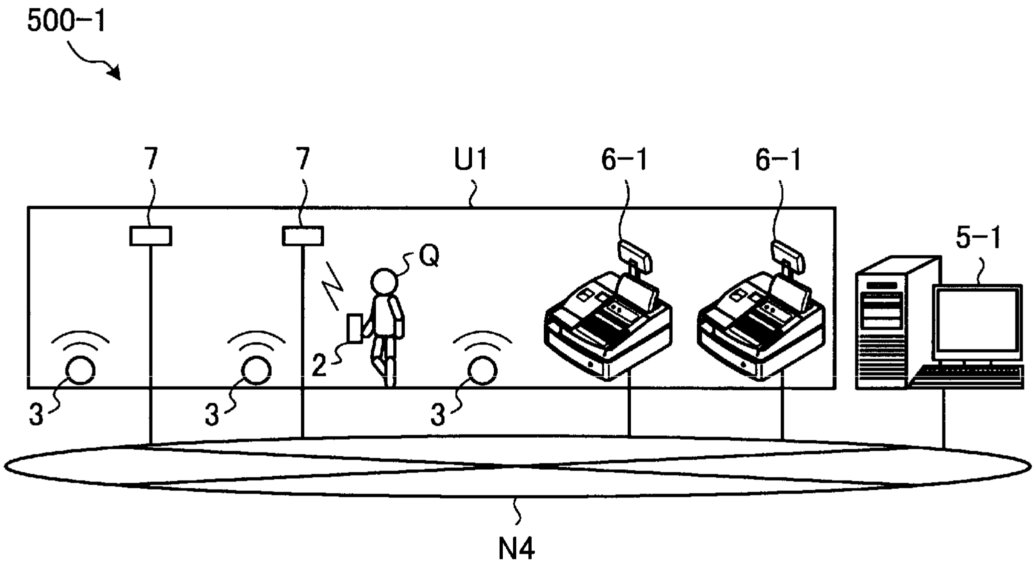
FIG. 42 is a diagram illustrating one example of a network configuration of a lost article guidance system according to a tenth embodiment.

FIG. 42 is a diagram illustrating one example of a network configuration of a lost article guidance system 500-1 according to a tenth embodiment. The lost article guidance system 500-1 illustrated in FIG. 42 is acquired by disposing the server apparatus 5 and the POS terminal 6 respectively as a server apparatus 5-1 and a POS terminal 6-1 having a lost article function in the guidance system 500 (refer to FIG. 27) illustrated in the third embodiment. In the lost article guidance system 500-1, the server apparatus 5-1, the POS terminal 6-1, and the mobile terminal 2 perform operation related to lost article guidance illustrated below, in addition to the operation related to the store search service.

The server apparatus 5-1, by access from the mobile terminal 2, provides service such as lost article searching and guidance for a storage place of a lost article. For example, if there is a query as to a lost article from the mobile terminal 2, the server apparatus 5-1 provides guidance for a storage place of a found article relevant to the lost article based on provision of information from each POS terminal 6-1.

The POS terminal 6-1, in the case of discovering a found article, notifies information of the found article (e.g., information that indicates the found date and time, the name of the found article, or the features of the found article) to the server apparatus 5-1.

The mobile terminal 2, by making a query as to the lost article to the server apparatus 5-1, acquires information such as a storage place of the lost article from the server apparatus 5-1.

Specific Example of Each Device

Next, specific configurations of each device of the lost article guidance system 500-1 according to the present embodiment will be described. Configurations of the server apparatus 5-1 and the POS terminal 6-1 will be described. For the server apparatus 5-1, "functions related to lost article guidance" and table configurations that are different from those of the server apparatus 5 illustrated in the third embodiment will be described. In addition, for the POS terminal 6-1, the exterior of the POS terminal 6-1 will be illustrated, and "functions related to lost article guidance" that are different from the configuration of the POS terminal 6 illustrated in the third embodiment will be described. For hardware configurations of the server apparatus 5-1 and the POS terminal 6-1, refer to FIG. 2 and FIG. 29.

For a configuration of the mobile terminal 2, a flow of a process of the mobile terminal 2 will be described with reference to FIG. 3 to FIG. 10. In addition, the wireless communicating device 7 is a relay device that relays transferred data between the mobile terminal 2 and the server apparatus 5-1. The wireless communicating device 7 performs wireless communication with the mobile terminal 2 side and performs Ethernet communication with the server apparatus 5-1 side by the LAN N4. Further description of the configuration of the wireless communicating device 7 will not be provided.

Functional Configuration of Server Apparatus 5-1

First, a functional configuration of the server apparatus 5-1 will be described. The server apparatus 5-1 implements each functional unit illustrated in FIG. 43 by the CPU 101 reading previously stored corresponding programs of the ROM 102 or the HDD 104 into the RAM 103 in order and executing the corresponding programs.

Figure 43:
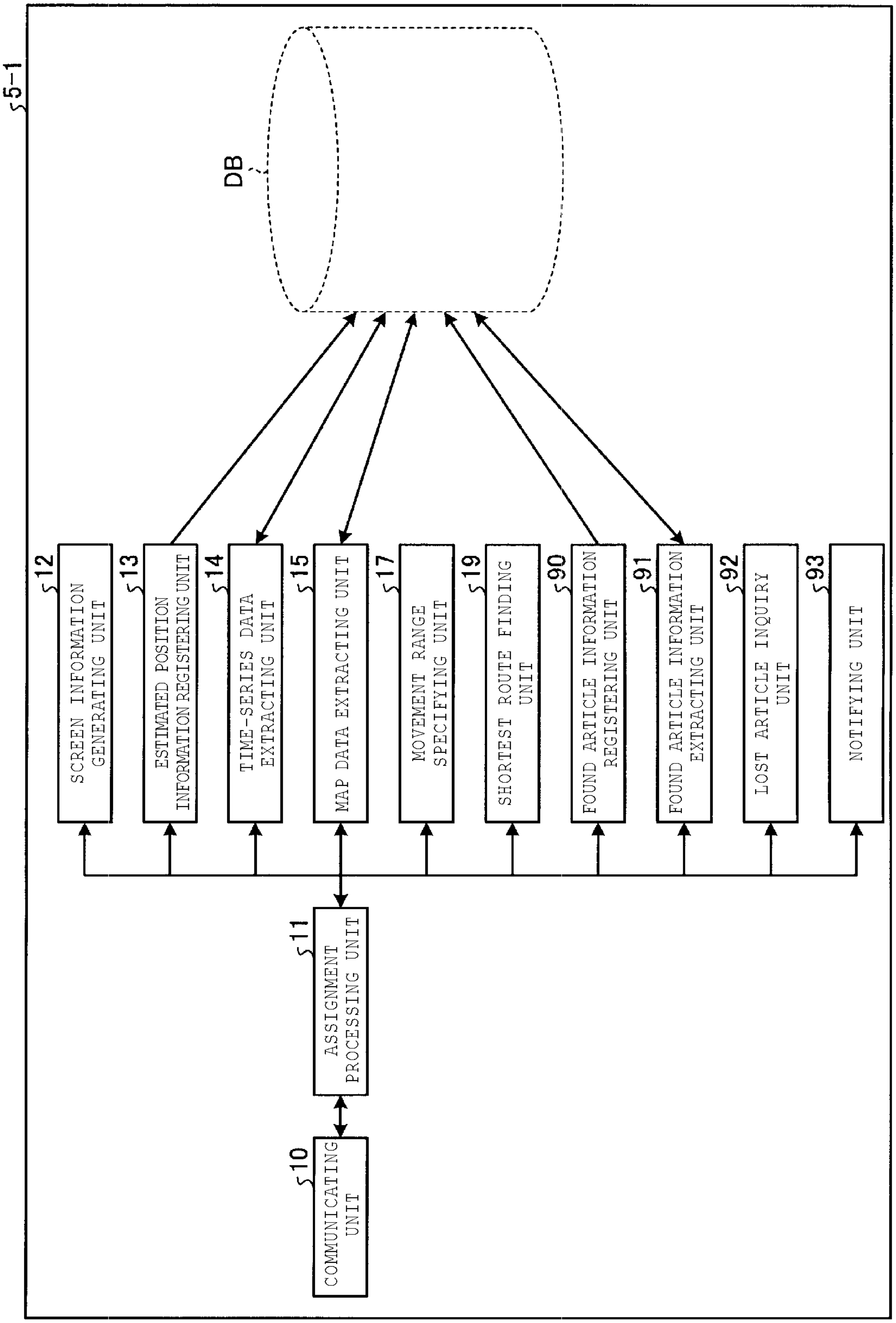
FIG. 43 is a block diagram illustrating one example of functions related to lost article guidance service of a server apparatus.

FIG. 43 is a block diagram illustrating one example of functions related to lost article guidance service of the server apparatus 5-1. As illustrated in FIG. 43, the server apparatus 5-1 implements functions of the communicating unit 10, the assignment processing unit 11, the screen information generating unit 12, the estimated position information registering unit 13, the time-series data extracting unit 14, the map data extracting unit 15, the movement range specifying unit 17, the shortest route finding unit 19, a found article information registering unit 90, a found article information extracting unit 91, a lost article query unit 92, a notifying unit 93, and the like. For each functional unit, the same functional units as the functional units illustrated in the third embodiment are designated by the same reference signs. Hereinafter, additional functional units in the present embodiment will be described.

Figures 44, 45:
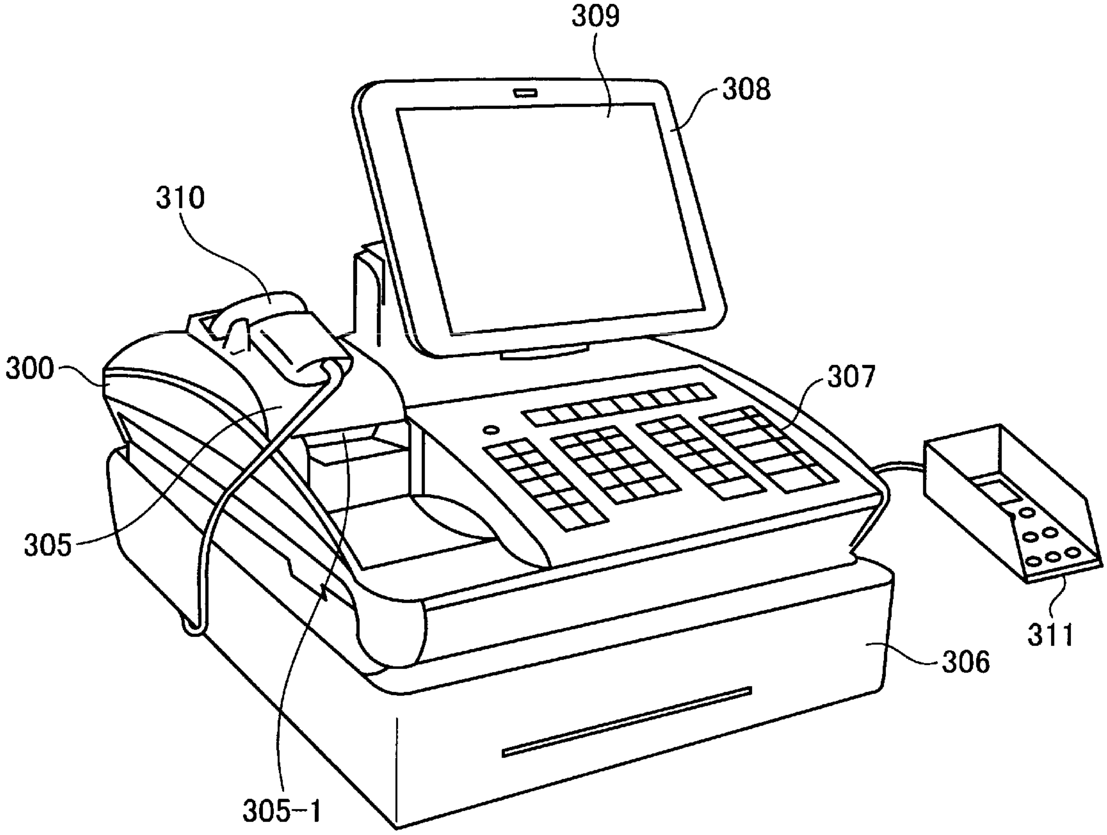
FIG. 44 is a diagram illustrating one example of a table configuration of a found article management table.
FIG. 45 is a perspective exterior view of a POS cash register illustrated as one example of a POS terminal.

The found article information registering unit 90 registers information of a found article discovered by the POS terminal 6-1 in a found article management table T6 (refer to FIG. 44).

The found article information extracting unit 91 extracts relevant found article information from the found article management table T6 with information as to the lost article provided from the mobile terminal 2 as a search condition.

The lost article query unit 92 transmits an inquiry request signal as to the lost article to the POS terminal 6-1 installed in each store within the movement range of the service user and acquires found article information from any POS terminal 6-1.

The notifying unit 93 generates notification data that operates the notification function of the mobile terminal 2. For example, the notifying unit 93 generates notification data by embedding a signal operating a notification sound, vibrations, or the like into functional information of the mobile terminal 2 received from the assignment processing unit 11.

Table Configuration

FIG. 44 is a diagram illustrating one example of a table configuration of the found article management table. The found article management table T6 illustrated in FIG. 44 is a table that correlates found date information 1001, found article name 1002, found article feature 1003, a storage place 1004, and the like with each other. The found date information 1001 is information that indicates the found date and time. The found article name 1002 is name information of the found article such as “handkerchief” or “bag”. The found article feature 1003 is information that indicates features of an acquired article such as the shape, the color, and the size thereof. The storage place 1004 is information that indicates the storage place of the found article such as the name or the position information of a store that temporarily stores the found article or a management office or the position information thereof that collects found articles.

Hardware Configuration of POS Terminal 6-1

FIG. 45 is a perspective exterior view of a POS cash register illustrated as one example of the POS terminal 6-1. For each unit of the POS terminal 6-1, parts corresponding to the hardware configuration of the POS terminal 6 (refer to FIG. 29) are designated by the same reference signs.

The POS terminal 6-1 illustrated in FIG. 45 has a main body 300 incorporating a control board and the drawer 306 accommodating change of banknotes and coins. As one example, the illustrated drawer 306 is one disposed in a lower portion of the main body 300.

The POS terminal 6-1 includes, on a top surface of the main body 300, the keyboard 307 in which multiple push keys including numeric keys such as “0” to “9”, a total key, and the like are arranged. Furthermore, the POS terminal 6-1 includes, in an upper portion of the main body 300, the display (e.g., liquid crystal display or the like) 308 in which the touch panel 309 is disposed on the surface.

The POS terminal 6-1 includes a discharge port 305-1 for receipts on the left side of the keyboard 307. The printer 305 that is incorporated in the main body 300 discharges a printed receipt from the discharge port 305-1. Besides, the POS terminal 6-1 includes the scanner 310 that reads a code symbol of merchandise, the card reading device 311 that reads card information of a credit card or the like, and the like.

Functional Configuration of POS Terminal 6-1

Next, a functional configuration of the POS terminal 6-1 will be described. The POS terminal 6-1 implements functions related to merchandise registration, accounting, merchandise inquiry, found article reporting, and the like by the CPU 301 reading previously stored corresponding programs of the ROM 302 or the HDD 304 into the RAM 303 in order and executing the corresponding programs.

Figure 46:
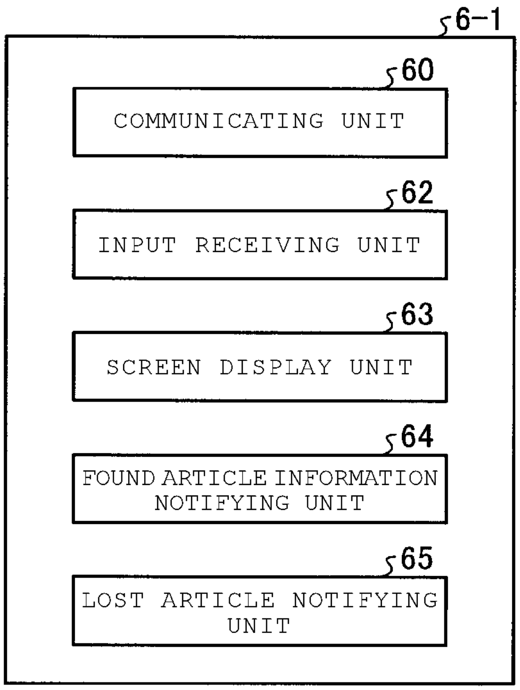
FIG. 46 is a block diagram illustrating one example of functions related to found article reporting.

FIG. 46 is a block diagram illustrating one example of functions related to found article reporting. As illustrated in FIG. 46, the POS terminal 6-1 implements functions of the communicating unit 60, an input receiving unit 62, a screen display unit 63, a found article information notifying unit 64, a lost article notifying unit 65, and the like.

The communicating unit 60 establishes communication with the server apparatus 5-1 through the NIC 312 and reads received data from the NIC 312 and sends transmitted data such as the found article information to the NIC 312.

The input receiving unit 62 receives an operational input from the keyboard 307 or the touch panel 309.

The screen display unit 63 displays screen information such as a found article notification screen or a pop-up screen on the display 308.

The found article information notifying unit 64 stores, in a data portion of a registration request signal, the found article information input from an operator on the found article notification screen and instructs the communicating unit 60 to transmit the registration request signal to the server apparatus 5-1.

The lost article notifying unit 65, in the case of received data read by the communicating unit 60 being equal to a query request signal, generates screen information that prompts searching around for the lost article, and outputs the screen information to the screen display unit 63. In the case of the data portion of the query request signal storing information as to the lost article, the lost article notifying unit 65 generates screen information that includes information as to the lost article. A display method for the screen information may be appropriately set, such as pop-up display or alert display.

The viewer unit 26 has a function of using the lost article guidance service in addition to the functional configuration of the mobile terminal 2 illustrated in FIG. 10. For a hardware configuration of the mobile terminal 2, refer to FIG. 3.

Sequence of Entire System Related to Notification of Found Article

Next, a communication flow between the devices of the lost article guidance system 500-1 will be described.

Figure 47:
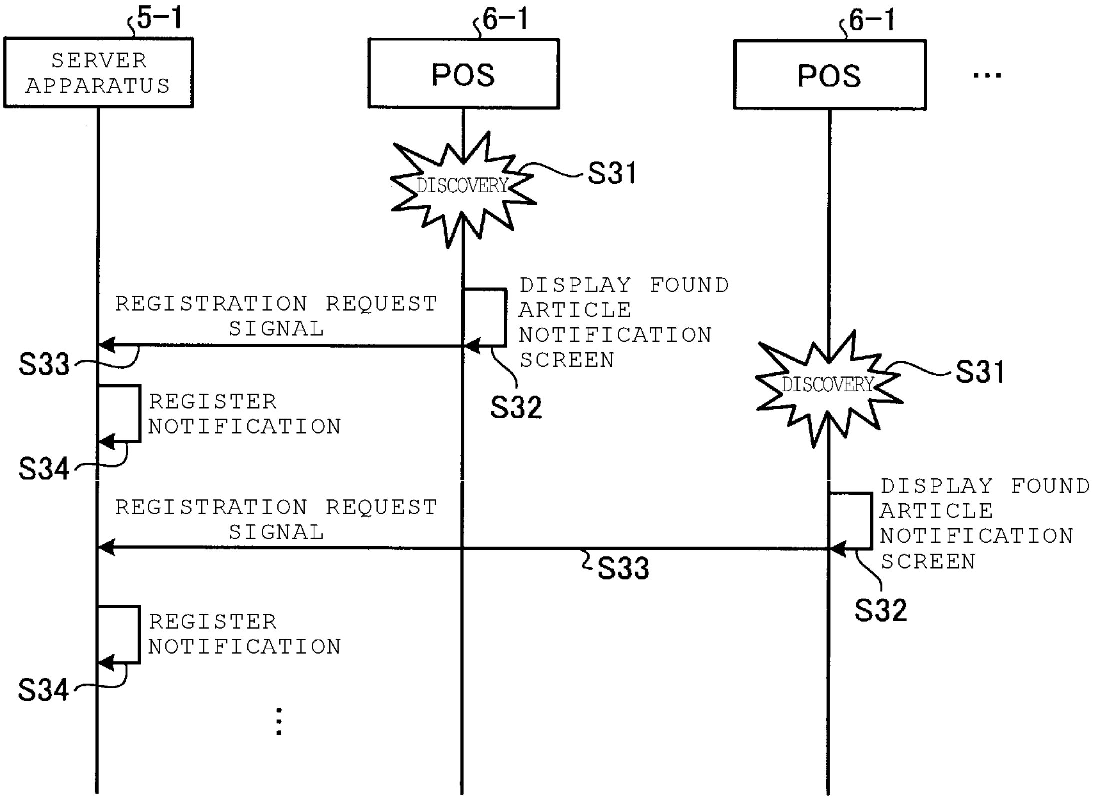
FIG. 47 is a sequence diagram illustrating communication between devices of the lost article guidance system in the case of the POS terminal reporting found article information to the server apparatus.

FIG. 47 is a sequence diagram illustrating communication between the devices of the lost article guidance system 500-1 in the case of the POS terminal 6-1 reporting the found article information to the server apparatus 5-1.

First, a salesperson in a store having the POS terminal 6-1 discovers a lost article (S31).

Next, by operation of the salesperson, the POS terminal 6-1 displays the found article notification screen on the display 308 and receives input of the found article information (S32).

The POS terminal 6-1 transmits a registration request signal storing the found article information to the server apparatus 5-1 (S33).

The server apparatus 5-1, if receiving the registration request signal transmitted from the POS terminal 6-1, registers the notified found article information in the found article management table T6 (S34).

In the case of a salesperson in another store discovering a lost article, a notification procedure is performed between each device in the same manner as Step S31 to Step S34.

Process Flow of Server Apparatus 5-1

A registration process for the found article information in the server apparatus 5-1 will be described. The CPU 101 (in particular, the communicating unit 10), if receiving a connection request signal of the POS terminal 6-1 by the NIC 106, establishes communication with the POS terminal 6-1 through the NIC 106.

The CPU 101 (in particular, the communicating unit 10), if further receiving a transmitted signal from the POS terminal 6-1 by the NIC 106, reads the information of the transmitted signal, calls the assignment processing unit 11, and causes the assignment processing unit 11 to perform various service processes.

The CPU 101 (in particular, the assignment processing unit 11) manages session information per POS terminal 6-1 that makes a request, and controls processes in accordance with the request content of the received data. In the registration process for the found article information described here, the CPU 101 (in particular, the assignment processing unit 11) controls processes for the found article information registering unit 90. The CPU 101 (in particular, the found article information registering unit 90) registers the found article information of the received data in the found article management table T6.

In the present embodiment, the CPU 101 (in particular, the found article information registering unit 90) references the store information table T4 (refer to FIG. 8) and acquires the store name, the position information, and the like of a store corresponding to a transmitter address (an IP address, a MAC address, or the like) of the received data. The CPU 101 (in particular, the found article information registering unit 90) registers the found article information in the found article management table T6 in correlation with the acquired information.

For example, assume that the CPU 101 (in particular, the found article information registering unit 90) receives the found date “2016. 1. 11. 2 p.m.”, the name of the found article “bag”, the features of the found article “beige” and “shoulder type” as the found article information. In this case, the CPU 101 (in particular, the found article information registering unit 90) registers the information and information specifying a store acquired from the store information table T4 as one record information in each of the found date information 1001, the found article name 1002, the found article feature 1003, and the storage place 1004.

By this registration, a record DT illustrated in FIG. 44 is generated. The CPU 101 (in particular, the communicating unit 10) disconnects communication with the POS terminal 6-1 by receiving a disconnection request signal from the POS terminal 6-1 by the NIC 106 or elapsing of a preset time limit.

In the case of moving the found article to the management office or the like after temporary storage of the found article, a management terminal or the like of the management office connects to the server apparatus 5-1 and updates a target record of the found article management table T6 to change the storage place of the record to the information of the management office.

Display Screen of POS Terminal 6-1

Figure 48:
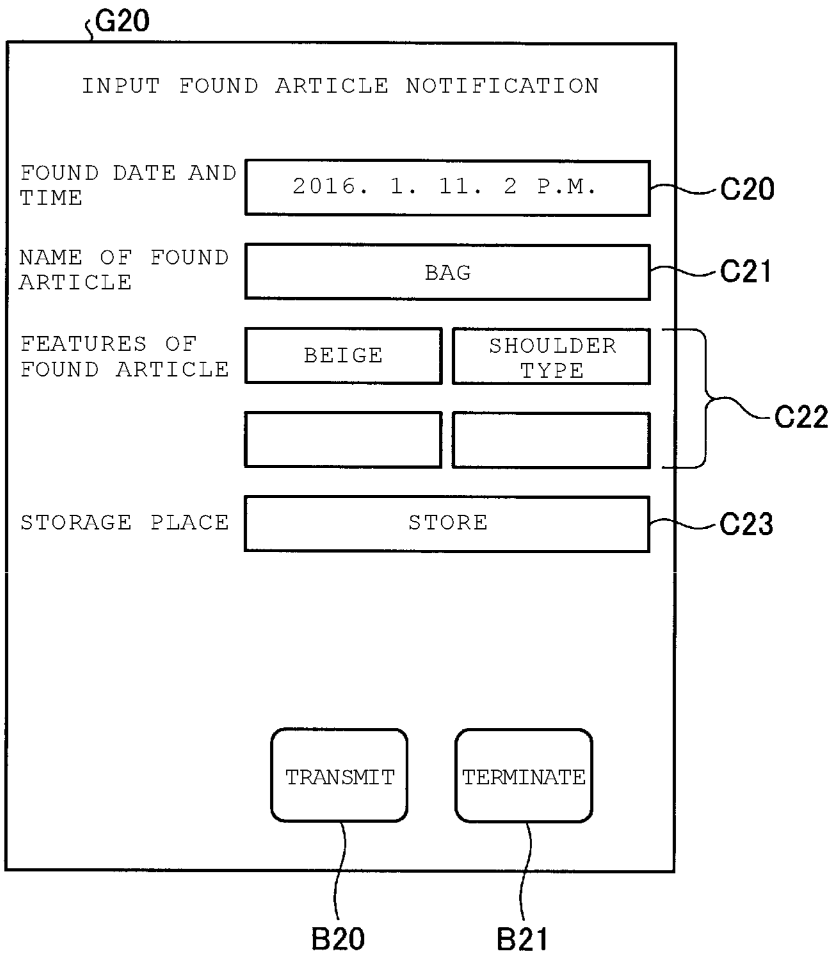
FIG. 48 is a diagram illustrating one example of a found article notification screen.

FIG. 48 is a diagram illustrating one example of the found article notification screen. A found article notification screen G20 illustrated in FIG. 48 has an input box C20, an input box C21, an input box C22, and an input box C23. In addition, the found article notification screen G20 has a “transmit” button B20 and a “terminate” button B21. The input box C20 is for input of information that indicates the found date and time. The input box C21 is for input of the name of the found article. The input box C22 is for input of the features of the found article. The input box C23 is for input of information that indicates the storage place. The “transmit” button B20 is an operation button for declaring transmission of the information input in each of the input boxes C20, C21, C22, and C23. The “terminate” button B21 is an operation button for declaring termination of the found article notification screen.

The CPU 301 of the POS terminal 6-1, if receiving input of an execution instruction for a found article notification program by an input provided on an icon or the like by the salesperson, executes functional units corresponding to the execution instruction and displays the found article notification screen G20 on the display 308. The CPU 301, if receiving input of the found article information and further receiving an input on the “transmit” button B20, generates transmitted data in which the CPU 301 (in particular, the found article information notifying unit 64) stores the found article information, and the CPU 301 (in particular, the communicating unit 60) transmits the data to the server apparatus 5-1.

Sequence of Entire System Related to making Query as to Lost Article

Figure 49:
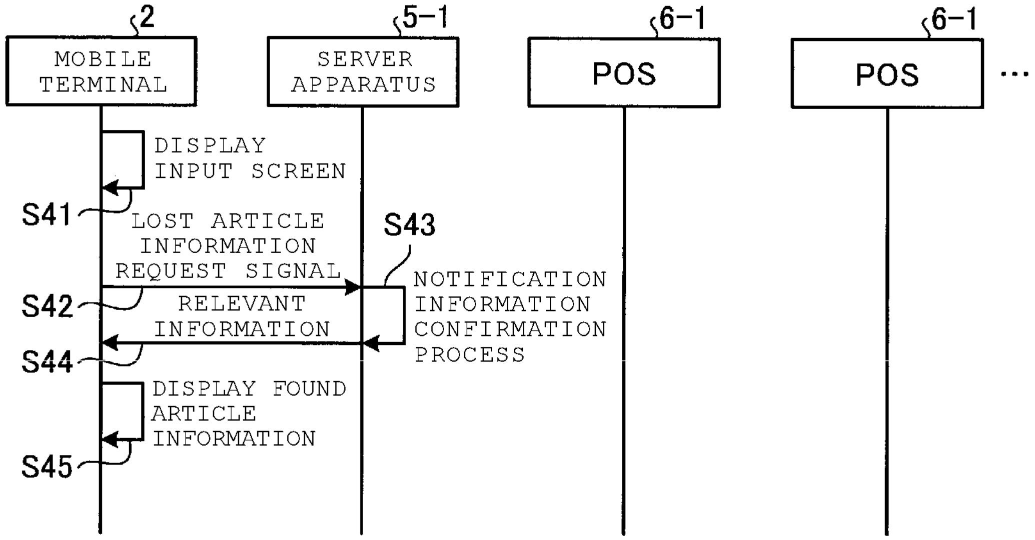
FIGS. 49-50 are sequence diagrams illustrating communication between devices of the lost article guidance system in the case of a mobile terminal making a query as to a lost article to the server apparatus.

FIG. 49 is a sequence diagram (1) illustrating communication between devices of the lost article guidance system 500-1 in the case of the mobile terminal 2 making a query as to the lost article to the server apparatus 5-1.

First, the mobile terminal 2 displays an input screen on the display 250 and receives input of information as to the lost article (S41). In the present embodiment, a lost article search button is disposed on the top screen of the mobile terminal 2, and the mobile terminal 2 displays the lost article input screen on the display 250 by an operational input on the lost article search button.

The mobile terminal 2 transmits a lost article information request signal storing the information as to the lost article to the server apparatus 5-1 (S42).

The server apparatus 5-1, if receiving the lost article information request signal transmitted from the mobile terminal 2, performs an inquiry in the registered information of the found article management table T6 as to whether or not there is a notification of the found article information corresponding to the lost article information request signal (S43).

If there is a notification of the relevant found article information in the registered information of the found article management table T6, the server apparatus 5-1 transmits in response the found article information to the mobile terminal 2 of the query submitter (S44).

The mobile terminal 2 displays, on the display 250, the found article information transmitted from the server apparatus 5-1 (S45).

Figure 50:
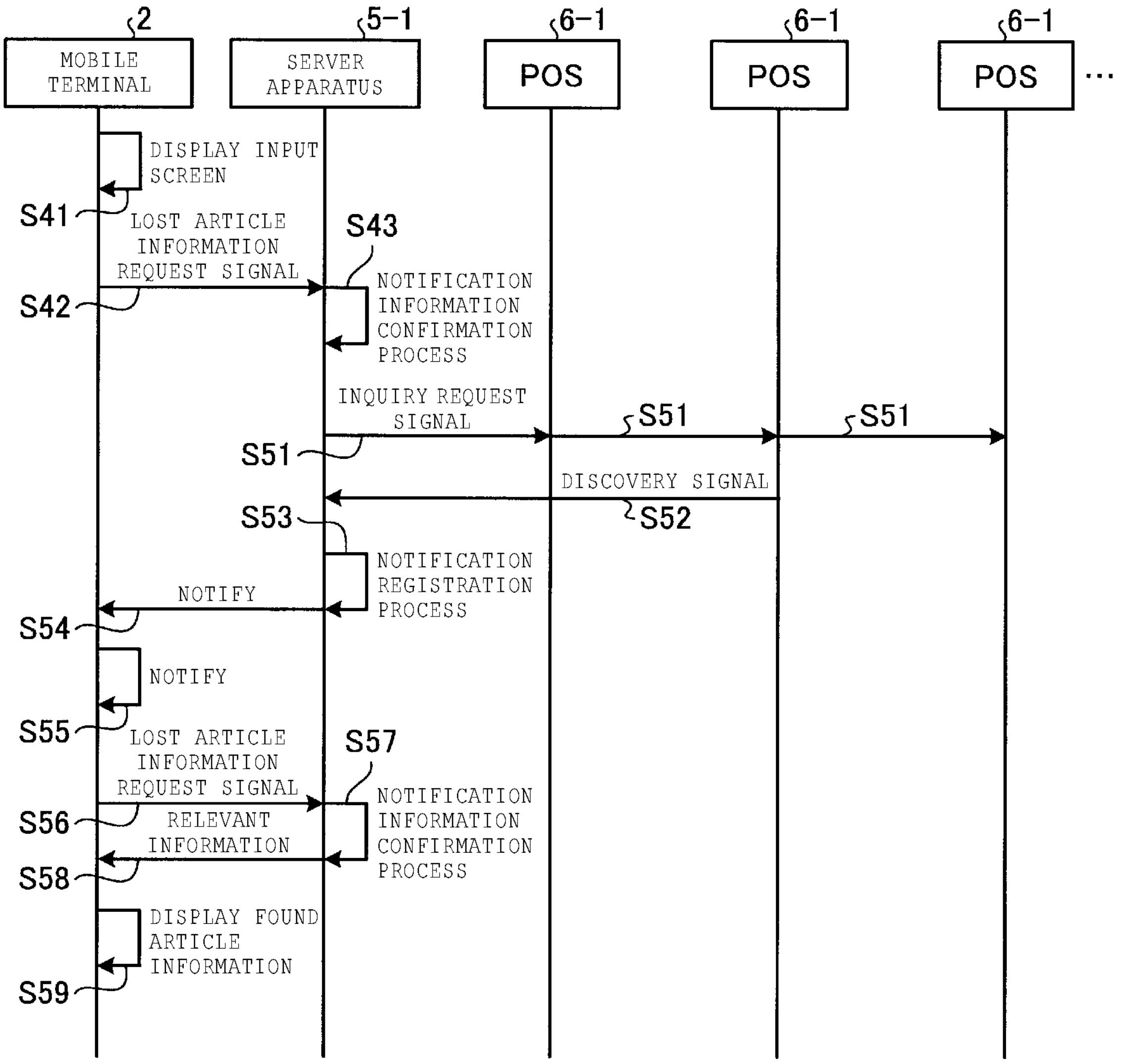

FIG. 50 is a sequence diagram (2) illustrating communication between devices of the lost article guidance system 500-1 in the case of the mobile terminal 2 making a query as to a lost article to the server apparatus 5-1. The same parts as the sequence diagram (1) will not be described.

The server apparatus 5-1, in Step S43 of the sequence diagram (1), performs an inquiry in the registered information of the found article management table T6 as to whether or not there is a notification of the found article information. By this inquiry, in the case of absence of a notification of the relevant found article information, the server apparatus 5-1 transmits a query request signal to the POS terminals 6-1 of each store within the movement range of the mobile terminal 2 of the query submitter (S51).

If the salesperson searches around and discovers a lost article having similar features, the POS terminal 6-1 transmits in response a discovery signal for the found article to the server apparatus 5-1 (S52).

The server apparatus 5-1 performs a notification registration process if receiving the discovery signal from at least any one POS terminal 6-1 making a query (S53).

The server apparatus 5-1 transmits a notification signal to the mobile terminal 2 of the query submitter (S54).

The mobile terminal 2, if receiving the notification signal from the server apparatus 5-1, notifies discovery of the lost article to the service user by, for example, making a notification sound or vibrating a vibrating unit in accordance with settings of the mobile terminal 2 (S55).

Then, the mobile terminal 2 again makes a query as to the lost article to the server apparatus 5-1 through the procedure of Step S56 to Step S59 corresponding to Step S42 to Step S45 in the sequence diagram (1) and acquires the found article information.

Process Flow of Server Apparatus 5-1

Next, a service process of the server apparatus 5-1 will be described. The service process of the server apparatus 5-1 is performed under control of the assignment processing unit 11.

Figure 51:
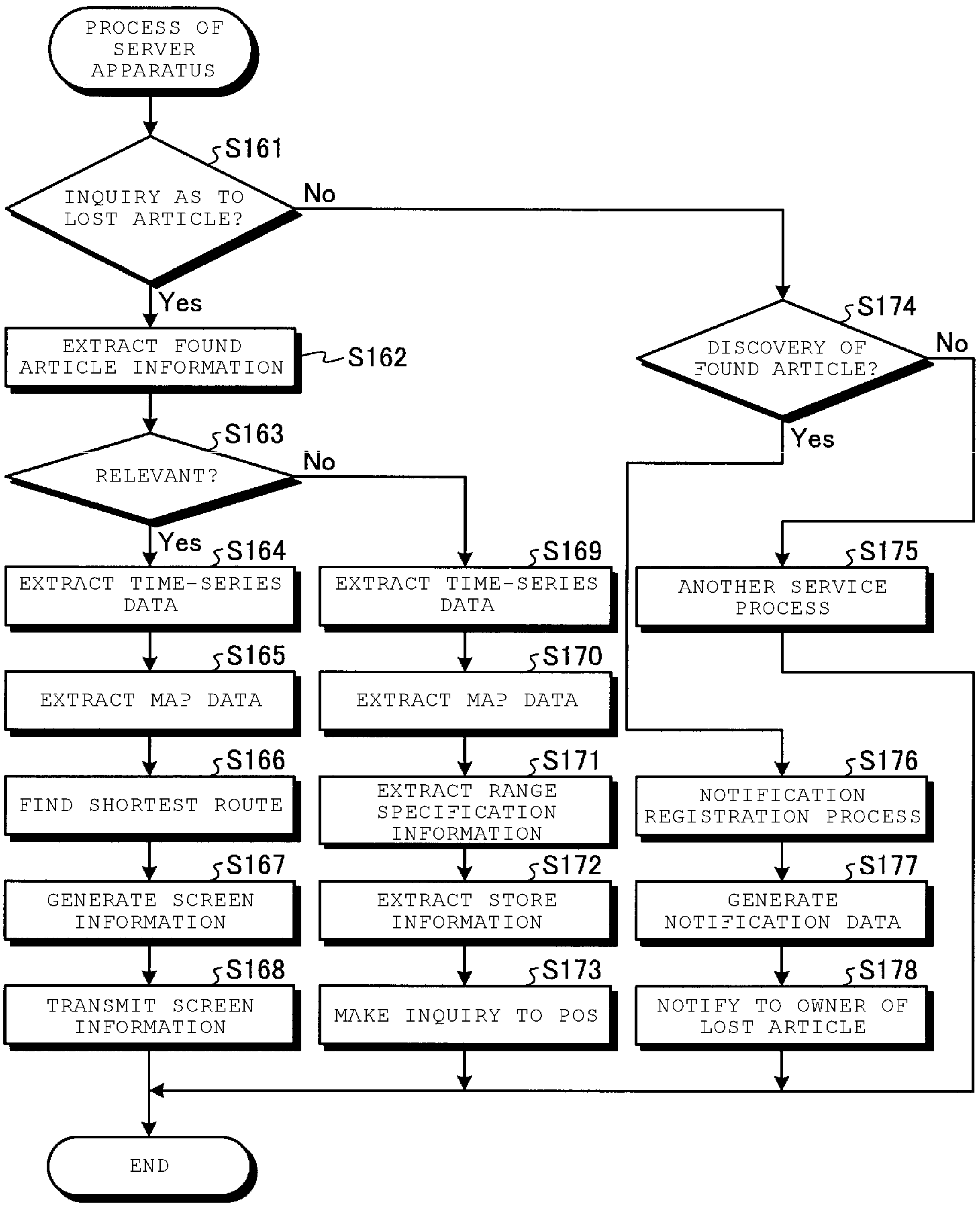
FIG. 51 is a diagram illustrating one example of a process flow of the server apparatus.

FIG. 51 is a diagram illustrating one example of a process flow of the server apparatus 5-1. First, the CPU 101 (in particular, the assignment processing unit 11) confirms request information of received data read by the communicating unit 10 and determines whether or not the request information indicates a query as to a lost article (S161).

In the case of the request content being a request that indicates a query as to a lost article (Step S161: Yes determination), the CPU 101 (in particular, the found article information extracting unit 91), under control of the assignment processing unit 11, sets information as to the lost article stored in a data portion of the received data as a search condition and extracts a relevant record from the found article management table T6 (S162).

For example, assume that information that indicates "the name of the found article" (for example, tag information) as the information as to the lost article and search information are stored in the data portion. In this case, the CPU 101 (in particular, the found article information extracting unit 91) performs an extraction process for a record relevant to the search information with the found article name 1002 of the found article management table T6 as a key. In the case of the data portion storing a set of a plurality of pieces of tag information such as the "found date information", the "name of the found article", and the "features of the found article" as the information as to the lost article and the search information, records that have the search information in fields corresponding to the plurality of pieces of tag information are extracted from the found article management table T6.

Next, the CPU 101 (in particular, the assignment processing unit 11) determines whether or not a relevant record is extracted by the found article information extracting unit 91 (S163).

In the case of a relevant record being extracted by the found article information extracting unit 91 (S163: Yes determination), the CPU 101 (in particular, the time-series data extracting unit 14), under control of the assignment processing unit 11, extracts the time-series data from the movement line data management table T1 of the query submitter (S164). Specifically, the CPU 101 (in particular, the time-series data extracting unit 14) reads an IP address, a MAC address, or the like stored in a header of the received data and specifies the movement line data management table T1 of the query submitter based on the identification information of the query submitter corresponding to the IP address, the MAC address, or the like. The CPU 101 (in particular, the time-series data extracting unit 14) extracts time-series data on the current date from the movement line data management table T1.

Next, under control of the assignment processing unit 11, the CPU 101 (in particular, the map data extracting unit 15) extracts, from the map information table T3 (refer to FIG. 7), map data that includes a position specified by the estimated position information of the time-series data extracted by the time-series data extracting unit 14 (S165).

Next, the CPU 101 (in particular, the shortest route finding unit 19) finds the shortest route to the storage place under control of the assignment processing unit 11 (S166). Specifically, the CPU 101 (in particular, the shortest route finding unit 19) sets a destination to the storage place included in the relevant record extracted by the found article information extracting unit 91. In addition, the CPU 101 (in particular, the shortest route finding unit 19) sets the current place to the estimated position information of the last time-series data extracted by the time-series data extracting unit 14. The CPU 101 (in particular, the shortest route finding unit 19) finds the shortest route from the current place to the storage place based on the map data extracted by the map data extracting unit 15.

Next, the CPU 101 (in particular, the screen information generating unit 12) generates screen information under control of the assignment processing unit 11 (S167). For example, generated is screen information that includes an image in which data indicating the shortest route and the map data are combined, information of the record extracted by the found article information extracting unit 91, and the like.

The CPU 101 (in particular, the assignment processing unit 11) passes the screen information generated by the screen information generating unit 12 to the communicating unit 10 and instructs the communicating unit 10 to transmit in response the screen information to the mobile terminal 2 of the query submitter (S168).

In the case of the request content in Step S161 not being a request that indicates a query as to a lost article (Step S161: No determination), the CPU 101 (in particular, the assignment processing unit 11) determines whether or not the request is a request that indicates discovery of a found article (S174). In the case of the request not being a found article discovery request (Step S174: No determination), processing is performed by assigning processes to functional units corresponding to other service processes (S175). In the case of the request being a found article discovery request (Step S174: Yes determination), the CPU 101 performs processes from Step S176. The processes from Step S176 will be described later.

In the case of a relevant record not being extracted by the found article information extracting unit 91 in Step S163 (S163: No determination), the CPU 101 operates as follows. First, the CPU 101 (in particular, the time-series data extracting unit 14) extracts the time-series data from the movement line data management table T1 of the query submitter under control of the assignment processing unit 11 (S169).

Next, under control of the assignment processing unit 11, the CPU 101 (in particular, the map data extracting unit 15) extracts, from the map information table T3 (refer to FIG. 7), map data that includes a position specified by the estimated position information of the time-series data extracted by the time-series data extracting unit 14 (S170).

Next, under control of the assignment processing unit 11, the CPU 101 (in particular, the movement range specifying unit 17), based on each estimated position information of the time-series data extracted by the time-series data extracting unit 14, calculates the range specification information that sets an area along the path connecting each estimated position as a movement range (S171).

Next, under control of the assignment processing unit 11, the CPU 101 (in particular, the lost article query unit 92) extracts store information of all relevant stores with the range specification information calculated by the movement range specifying unit 17 as a search condition (S172). Specifically, the CPU 101 (in particular, the lost article query unit 92) searches for stores positioned in the area indicated by the range specification information from the store position information 802 of the store information table T4. For example, assume that the range specification information is information that indicates the distance from the estimated position. In this case, a store for which the position information of the store position information 802 is within the distance from the estimated position is regarded as being in the area indicated by the range specification information, and the store information indicating the store is extracted. The store information is assumed to include identification information such as an IP address or a MAC address of the POS terminal 6-1 installed in the store.

Next, the CPU 101 (in particular, the assignment processing unit 11) stores, in a data portion of a query request signal, the information as to the lost article transmitted from the mobile terminal 2 and instructs the communicating unit 10 to transmit the query request signal to the POS terminals 6-1 of each store in the area of the movement range extracted in Step S171 (S173). Accordingly, the CPU 101 (in particular, the communicating unit 10) generates and transmits an inquiry request signal to the IP address of the specified POS terminal 6-1.

Next, the processes from Step S176 in the case of a Yes determination in Step S174 will be described.

First, under control of the assignment processing unit 11, the CPU 101 (in particular, the found article information registering unit 90) performs a notification registration process for the information as to the lost article provided from the mobile terminal 2 (S176). Specifically, the assignment processing unit 11 temporarily manages the identification information of the mobile terminal 2, the information as to the lost article provided from the mobile terminal 2, the store information acquired in Step S172, a query number, and the like in correlation with each other. In the case of the request of the received data being a found article discovery request, the assignment processing unit 11 selects store information of a relevant store from the query number, the IP address of the transmitter, or the like included in the received data. Accordingly, the CPU 101 (in particular, the found article information registering unit 90) receives the information as to the lost article and the selected store information from the assignment processing unit 11 and registers the information as one piece of record information in the found article management table T6.

Next, the CPU 101 (in particular, the notifying unit 93) generates notification data under control of the assignment processing unit 11 (S177). The notifying unit 93 generates notification data by embedding a signal that operates the notification function of the mobile terminal 2.

The CPU 101 (in particular, the assignment processing unit 11) passes the notification data generated by the notifying unit 93 to the communicating unit 10 and instructs the communicating unit 10 to transmit the notification data to the mobile terminal 2 of the query submitter (S178). Accordingly, the notification signal is transmitted toward the mobile terminal 2 of the query submitter by the CPU 101 (in particular, the communicating unit 10) to operate the notification function of the mobile terminal 2.

Process Flow of POS Terminal 6-1

Figure 52:
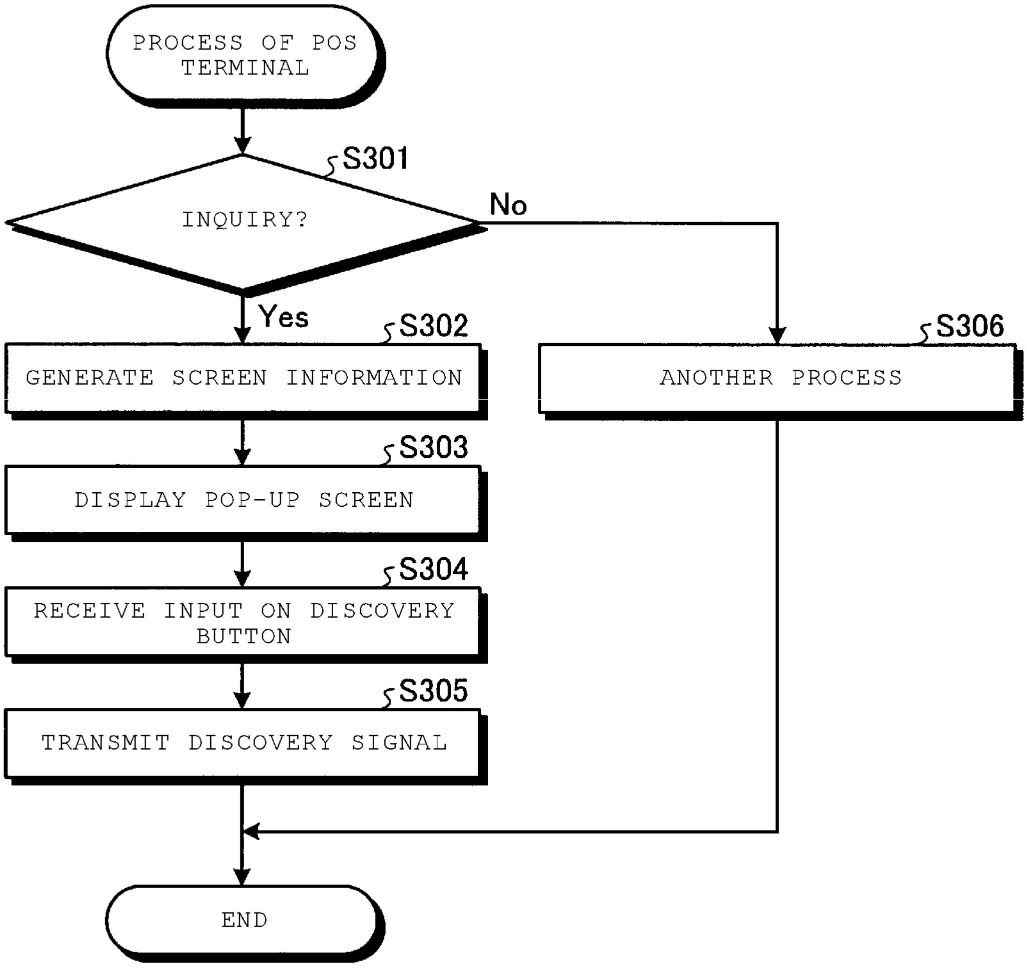
FIG. 52 is a diagram illustrating one example of a process flow of the POS terminal.

FIG. 52 is a process flow diagram of the POS terminal 6-1. First, the CPU 301 (in particular, the communicating unit 60) confirms received data and determines whether or not the received data is a query request signal (S301).

In the case of the received data not being a query request signal (Step S301: No determination), other functional units that perform a requested process of the received data perform the process (S306).

In the case of the received data being a query request signal (Step S301: Yes determination), the CPU 301 (in particular, the lost article notifying unit 65) generates screen information that prompts searching around for the lost article, and outputs the screen information to the screen display unit 63 (S302).

Next, based on the screen information, the CPU 301 (in particular, the screen display unit 63) displays, on the display 308, a screen that prompts searching around for the lost article (S303). As one example, assume that a pop-up screen is displayed.

Next, the CPU 301 (in particular, the input receiving unit 62) receives an input on a discovery button from the pop-up screen (S304).

If the input receiving unit 62 receives an input on the discovery button, the CPU 301 (in particular, the lost article notifying unit 65) instructs the communicating unit 60 to transmit a discovery signal to the server apparatus 5-1 that makes a query request (S305). Accordingly, the POS terminal 6-1 transmits a discovery signal to the server apparatus 5-1.

Screen Prompting Searching

Figure 53:
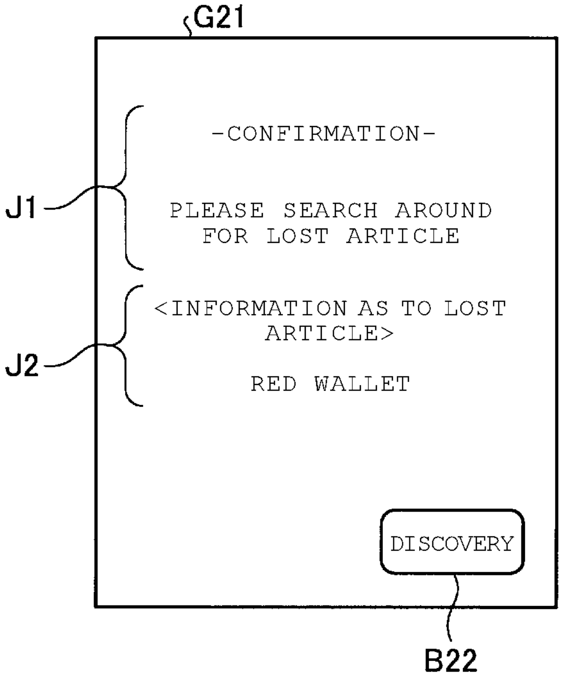
FIG. 53 is a diagram illustrating a pop-up screen of one example of a screen prompting searching that is displayed on the POS terminal.

FIG. 53 is a diagram illustrating a pop-up screen of one example of a screen prompting searching that is displayed on the POS terminal 6-1. A pop-up screen G21 illustrated in FIG. 53 has confirmation information J1, lost article information J2, and a "discovery" button B22. The confirmation information J1 is message information that requests searching for the lost article. The lost article information J2 is information as to the lost article provided from the service user, such as the name and the features of the lost article. The "discovery" button B22 is an operation button that is pushed in the case of the salesperson or the like discovering the lost article. By pushing the "discovery" button B22, the POS terminal 6-1 transmits a discovery signal to the server apparatus 5-1.

Screen Flow of Mobile Terminal 2

Figure 54:
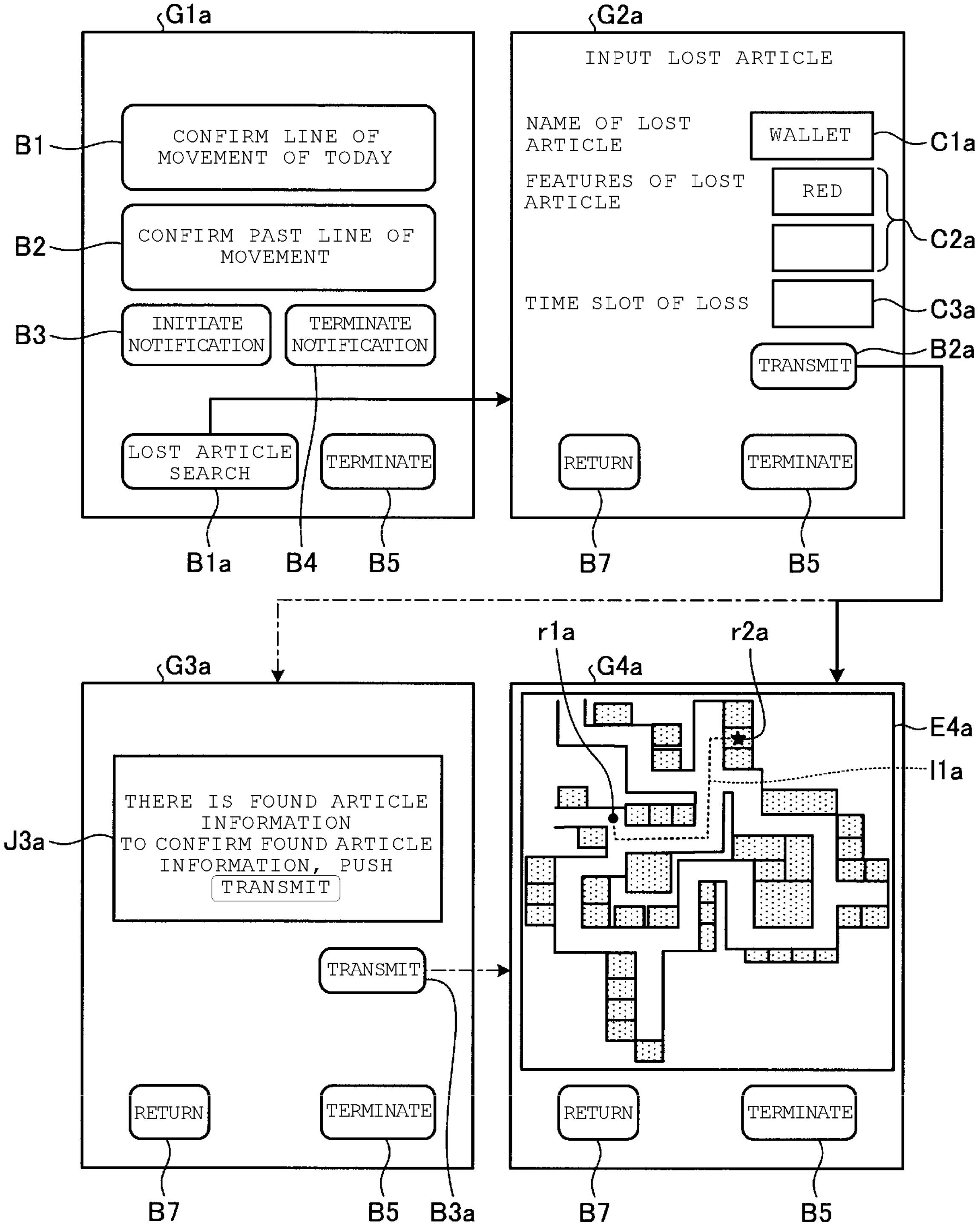
FIG. 54 is a diagram illustrating one example of screen configurations and a screen flow of screens related to lost article guidance used in an application of the mobile terminal.

FIG. 54 is a diagram illustrating one example of screen configurations and a screen flow of screens related to lost article guidance used in the application of the mobile terminal 2.

A top screen G1*a* illustrated in FIG. 54 is acquired by adding a "lost article search button" B1*a* to the top screen G1 illustrated in FIG. 22. The "lost article search button" B1*a* is an operation button for instructing the viewer unit 26 to call an input form screen for causing the server apparatus 5-1 to make a query as to the lost article. If a touch input is provided on the "lost article search button" B1*a*, the viewer unit 26 displays an input form screen G2*a* and receives input of information as to the lost article.

In the input form screen G2*a* illustrated in FIG. 54, disposed are an input box C1*a*, an input box C2*a*, an input box C3*a*, a "transmit" button B2*a*, the "return" button B7, and the "terminate" button B5.

The input box C1*a* is an input box for input of the name of the lost article. The input box C2*a* is an input box for input of the features of the lost article. The input box C3*a* is an input box for input of a found date and time or a time slot.

If a touch input is provided on the "transmit" button B2*a*, the viewer unit 26 adds tag information or the like to each information input in the input box C1*a*, the input box C2*a*, and the input box C3*a* and transmits the information as a lost article information request signal to the server apparatus 5-1.

The "return" button B7 of the input form screen G2*a* is an operation button for instructing the viewer unit 26 to return to the most previous display screen. The "return" button B7 is also appropriately disposed in other screens described later. In addition, the "terminate" button B5 is an operation button for instructing the viewer unit 26 to terminate the application. The "terminate" button B5 is also disposed in each screen described later.

In the case of existence of a found article relevant to the lost article in the server apparatus 5-1, the mobile terminal 2 receives shortest route information indicating the storage place of the found article from the server apparatus 5-1 and displays a shortest route screen.

A shortest route screen G4*a* illustrated in FIG. 54 has a map display area E4*a* that displays map data indicating the shortest route to the storage place, and the like.

The map display area E4*a* is the same as the map display area E4 of the shortest route screen G6 illustrated in FIG. 25. That is, the final position of the service user on the line of movement is denoted by a black circle mark (a mark of a black circle r1*a*), the storage place is denoted by a star mark r2*a*, and the shortest route from the final position to the storage place is denoted by a dotted line 11*a*.

In the case of absence of a found article relevant to the lost article in the server apparatus 5-1 and the server apparatus 5-1 making a query to the POS terminal 6-1, the mobile terminal 2 displays a notification screen by notification from the server apparatus 5-1 and then accesses the server apparatus 5-1 to acquire the shortest route information.

In a notification screen G3*a* illustrated in FIG. 54, disposed are notification information J3, a "transmit" button B3*a*, and the like. By notification from the server apparatus 5-1, the notification function of the mobile terminal 2 is operated, and the notification screen G3*a* is displayed. The notification information J3*a* is message information that indicates discovery of the lost article. The "transmit" button B3*a* is an operation button for acquiring the storage place of the lost article again. If a touch input is provided on the "transmit" button B3*a*, the information as to the lost article that is immediately previously input is transmitted as a lost article information request signal to the server apparatus 5-1.

By the configuration described heretofore, if the mobile terminal 2 requests searching for a lost article, the mobile terminal 2 can acquire, from the server apparatus 5-1, information that indicates a storage place of a found article discovered within the range of movement of the mobile terminal 2. In addition, even in the case of absence of a previously discovered found article that matches the lost article of the user, the server apparatus 5-1 transmits a query signal as to the lost article to the POS terminal or the like of a store within the range of movement of the mobile terminal 2 and receives notification of the lost article from the POS terminal if the lost article is discovered. The server apparatus 5-1 notifies discovery of the lost article to the mobile terminal. Thus, by notification from the server apparatus 5-1 after discovery, the mobile terminal 2 can acquire, from the server apparatus 5-1, information that indicates the storage place of the found article.

Eleventh Embodiment

An embodiment in the case of a multimedia terminal providing the service of the server apparatus 5 related to a lost article illustrated in the tenth embodiment will be illustrated in the present embodiment.

A lost article guidance system according to the present embodiment is acquired by replacing the server apparatus 5-1 with a multimedia terminal M4 (refer to FIG. 55) in the network configuration of the lost article guidance system 500-1 illustrated in the tenth embodiment. The multimedia terminal M4 is installed in a predetermined place in the commercial facility U1 and provides a guidance screen related to a lost article to the service user instead of the operation screen of the mobile terminal 2.

The multimedia terminal M4, by access of the service user, provides service such as lost article searching and guidance for a storage place of a lost article. For example, if a query as to a lost article is input from the service user by an input on the guidance screen, the multimedia terminal M4 displays a storage place of a found article relevant to the lost article on the guidance screen based on provision of information from each POS terminal 6-1.

The POS terminal 6-1, in the case of discovering a found article, notifies information of the found article (e.g., information that indicates the found date and time, the name of the found article, or the features of the found article) to the multimedia terminal M4.

Functional Configuration of Multimedia Terminal M4

Next, a functional configuration of the multimedia terminal M4 will be described. For a hardware configuration of the multimedia terminal M4, refer to FIG. 36. The multimedia terminal M4 implements each functional unit illustrated in FIG. 55 by the CPU 401 reading various programs of the ROM 402 or the HDD 405 into the RAM 403 in order and executing the programs.

Figure 55:
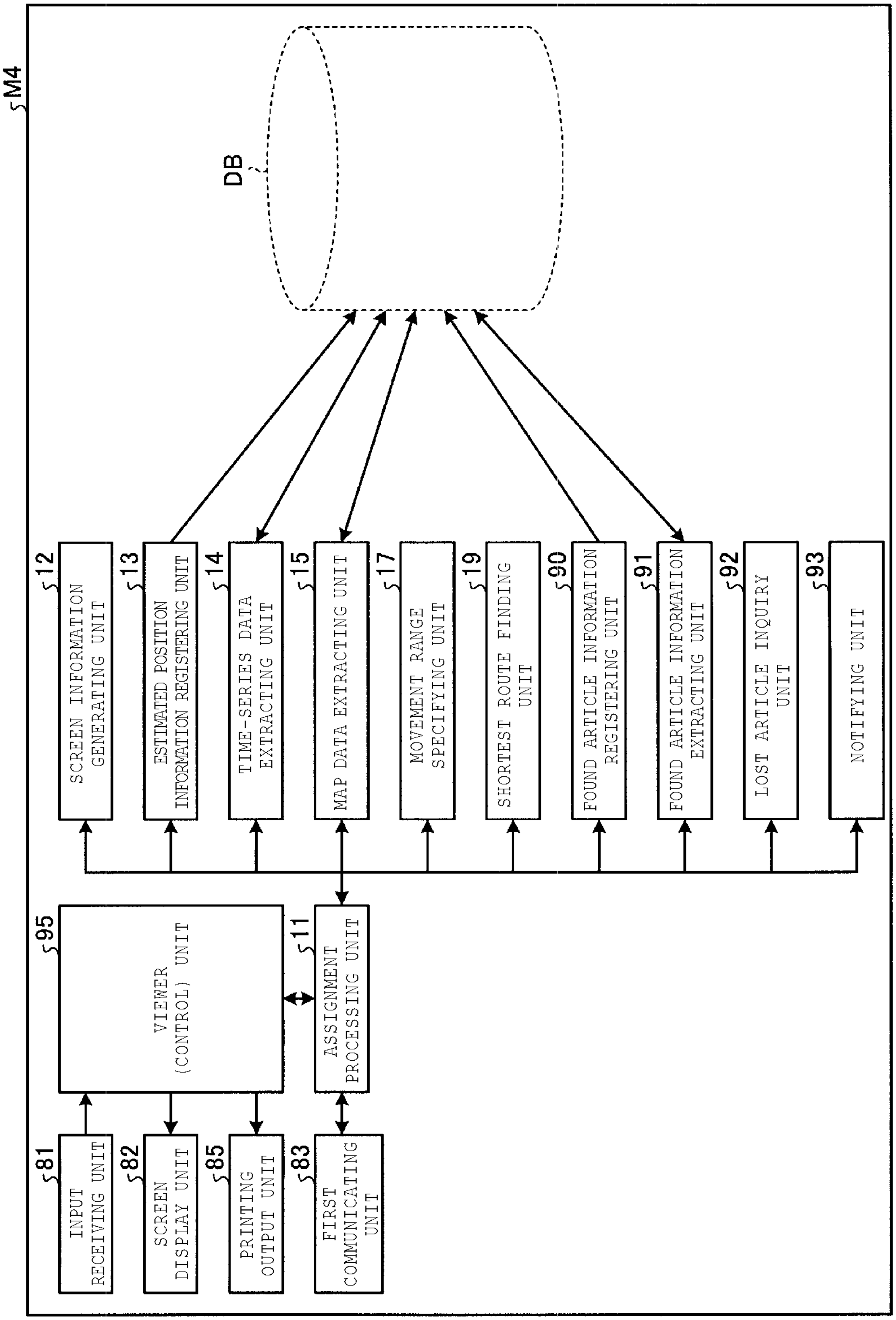
FIG. 55 is a block diagram illustrating one example of functions of a multimedia terminal according to an eleventh embodiment.

FIG. 55 is a block diagram illustrating one example of functions related to lost article guidance service of the multimedia terminal M4. The same functions as the functions provided by the server apparatus 5-1 (refer to FIG. 43) illustrated in the tenth embodiment are designated by the same reference signs. In addition, the same functions as the functions of the multimedia terminal M1 (refer to FIG. 37) illustrated in the fifth embodiment are designated by the same reference signs.

Hereinafter, functions related to an interface with the service user will be mainly described. A viewer unit 95 acquires screen information related to the lost article guidance service from the HDD 405 and outputs the screen information to the screen display unit 82. For example, the viewer unit 95 outputs, to the screen display unit 82, a screen corresponding to a received content of the input receiving unit 81. In addition, the viewer unit 95, in accordance with the received content of the input receiving unit 81, acquires screen information from the assignment processing unit 11 and outputs the screen.

The assignment processing unit 11, by request from the viewer unit 95, controls various service processes in the multimedia terminal M4. In addition, the assignment processing unit 11, in accordance with the request content from the viewer unit 95, makes a query as to a lost article to the POS terminal 6-1 through the first communicating unit 83.

Further description of each unit and description of a communication process and the like are repetition of the previous description in other embodiments such as the fifth embodiment and the tenth embodiment and thus will not be further described here.

Various programs used in the information processing apparatus, the system, and the mobile terminal of the present embodiment may be provided as files in an installable format or an executable format recorded in a computer-readable recording medium such as a CD-ROM, a flexible disk (FD), a CD-R, or a digital versatile disk (DVD) and may be executed after being read into the HDD, the flash ROM, or the like of each device.

The programs may be stored on a computer connected to a network such as the Internet and provided by download via the network.

In the case of using a beacon, cost may be incurred from the necessity of installation of the beacon. In addition, in installation of the beacon, agreement with a person relevant to a building or a land is required, and usage may be limited to a narrow extent. The GPS can be used in a wide range such as an urban area. However, the GPS may not be used in a place where electromagnetic waves hardly arrive, such as a subway. Furthermore, in the case of general use of the GPS, an error of approximately 10 m may be generated. Thus, since geomagnetic data can also be used, the geomagnetic data may also be used.

By using the geomagnetic data, the system having comparatively high positioning accuracy and suitability for walking can be provided. For example, map information of the building and the subway and the geomagnetic data at each point of the building and the subway are registered in advance in a database. In addition, the geomagnetic data at the place of the mobile terminal is collected by using a sensor technology of the mobile terminal. The current place of the mobile terminal is specified by overlaying the geomagnetic data registered in the database with the geomagnetic data of the place of the mobile terminal. Accordingly, the movement line data can be collected by using log data of positioning at each place of movement of the mobile terminal.

A user who does shopping or the like on foot may return to a store that the user sees on the path of movement, and the user may not remember a specific way to the place of the store since the store is not a destination. In this case, by using the movement line data having high accuracy, the store can be accurately found by narrowing stores down to the stores along the path. For example, in the case of the user wanting to see again a bag that the user sees on the path of passage, the user can easily return to the store that the user sees by searching for a bag store from the stores along the path of passage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of related art include JP-A-2009-198409.

What is claimed is:

1. A navigation server comprising:

a network interface controller through which identification information and movement line information of a mobile terminal are received from the mobile terminal, the movement line information including location information and a timestamp associated with the location information;

a storage device in which movement line data of the mobile terminal and location data of different public places are stored; and a processor configured to extract the movement line data from the movement line information and record the extracted movement line data in the storage device, wherein the processor, in response to search criteria received from the mobile terminal through the network interface controller, generates, using the movement line data and the location data of the different public places, a navigation map that shows different public places that are located along a route defined by the movement line data and meet the search criteria, and controls the network interface controller to transmit the generated navigation map to the mobile terminal for display by the mobile terminal, and in response to a request from the mobile terminal, control the network interface controller to transmit a list of the different public places that are located along the route.

2. The navigation server according to claim 1, wherein a time period is specified as part of the search criteria.

3. The navigation server according to claim 2, wherein the processor is further configured to determine a shortest route between a current location of the mobile terminal and one of the public places, and the shortest route is depicted in the navigation map.

4. The navigation server according to claim 1, wherein the storage device further stores location data for a plurality of beacon devices and correlates the location data to a respective beacon device using a beacon identifier, and the location information includes a beacon identifier.

5. The navigation server according to claim 1, wherein the processor is further configured to control the network interface controller to transmit an inquiry request signal to a plurality of point-of-sale terminals, each of which is associated with a different public place, to determine based on responses to the inquiry request signals which of the public places meets the search criteria.

6. The navigation server according to claim 1, wherein the search criteria include a store name or a merchandise name.

7. The navigation server according to claim 1, wherein the search criteria include a name of a lost article.

8. A navigation device comprising:

a display;

a first wireless communication circuit for near field wireless communication;

a second wireless communication circuit;

a processor configured to, upon receipt of beacon signals through the first wireless communication circuit, control the second wireless communication circuit to transmit registration signals to a navigation server to register movement line data therein, each registration signal including location information and a timestamp associated with the registration signal, wherein the processor, responsive to user inputs including search criteria, requests the navigation server for a navigation map that shows different public places that are located along a route defined by the movement line data and meet the search criteria, and upon receipt of the navigation map from the navigation server, control the display to display, and wherein the processor, responsive to further user inputs, controls the second wireless communication circuit to transmit to the navigation server a request for a list of the different public places that are located along the route, and upon receipt of the list, control the display to display the list.

9. The navigation device according to claim 8, wherein one of the user inputs indicates a time period as part of the search criteria.

10. The navigation device according to claim 9, wherein the processor is further configured to request the navigation server to determine a shortest route between a current location of the mobile terminal and one of the public places, and the shortest route is depicted in the navigation map.

11. The navigation device according to claim 10, wherein the registration signal and a request for the navigation map each include identification information of the navigation device.

12. The navigation device according to claim 8, wherein each beacon signal contains an identifier of a wireless device that transmitted the beacon signal, and the location information includes the identifier of the wireless device.

13. The navigation device according to claim 12, wherein upon detection of a change in the identifier of the wireless device contained in the beacon signal, the processor controls the second wireless communication circuit to transmit a registration signal to the navigation server.

14. The navigation device according to claim 8, wherein the search criteria include a store name or a merchandise name.

15. The navigation device according to claim 8, wherein the search criteria include a name of a lost article.

16. A navigation system comprising:

a navigation server;

a first wireless device configured to transmit beacon signals containing a first identifier;

a second wireless device configured to transmit beacon signals containing a second identifier; and a mobile terminal configured to wirelessly communicate with the navigation server and the first and second wireless devices, wherein the navigation server includes a storage device that stores movement line data of the mobile terminal in a first table, location data of different public places in a second table, and location data of wireless devices transmitting beacon signals, including the first and second wireless devices, in a third table, and the mobile terminal is further configured to:

upon receipt of a new beacon signal, transmit a registration signal to the navigation server to register movement line data in the first table, each registration signal including:

identification information of the mobile terminal, identification information of the wireless device that has transmitted the beacon signal, and a timestamp associated with the registration signal, upon receipt of a user input of search criteria, transmit to the navigation server a request for a navigation map that shows different public places that are located along a route defined by the movement line data and meet the search criteria, upon receipt of the navigation map, display the navigation map, upon receipt of a further user input, transmit to the navigation server a request for a list of the different public places that are located along the route, and upon receipt of the list, control the display to display the list.

17. The navigation system according to claim 16, wherein the navigation server is further configured to determine a shortest route between a current location of the mobile terminal and one of the public places, and the shortest route is depicted in the navigation map.

* * * * *